US012216734B2

(12) United States Patent
Adelman et al.

(10) Patent No.: US 12,216,734 B2
(45) Date of Patent: Feb. 4, 2025

(54) APPARATUS AND METHOD FOR CONJUGATE TRANSPOSE AND MULTIPLY

(71) Applicant: Intel Corporation, Santa Clara, CA (US)

(72) Inventors: Menachem Adelman, Haifa (IL); Robert Valentine, Kiryat Tivon (IL); Daniel Towner, Bath (GB); Amit Gradstein, Binyamina (IL); Mark Jay Charney, Lexington, MA (US)

(73) Assignee: Intel Corporation, Santa Clara, CA (US)

( * ) Notice: Subject to any disclaimer, the term of this patent is extended or adjusted under 35 U.S.C. 154(b) by 760 days.

(21) Appl. No.: 17/133,456

(22) Filed: Dec. 23, 2020

(65) Prior Publication Data

US 2022/0197975 A1    Jun. 23, 2022

(51) Int. Cl.
*G06F 17/16* (2006.01)
*G06F 7/523* (2006.01)
(Continued)

(52) U.S. Cl.
CPC .............. *G06F 17/16* (2013.01); *G06F 7/523* (2013.01); *G06F 7/78* (2013.01); *G06F 9/3001* (2013.01);
(Continued)

(58) Field of Classification Search
CPC ....... G06F 9/3885–3897; G06F 9/3001; G06F 9/30014; G06F 9/30036; G06F 9/30032;
(Continued)

(56) References Cited

U.S. PATENT DOCUMENTS 4,972,361 A    11/1990 Rader
8,473,540 B1    6/2013 Rao et al.
(Continued)

FOREIGN PATENT DOCUMENTS

EP    3716047 A1    9/2020

OTHER PUBLICATIONS

Hennessy, John L., et al. Computer Architecture : A Quantitative Approach, Elsevier Science & Technology, 2014. ProQuest Ebook Central, http://ebookcentral.proquest.com/lib/uspto-ebooks/detail.action?docID=404052. (Year: 2014).*
(Continued)

*Primary Examiner* — Emily E Larocque
*Assistant Examiner* — Huy Duong
(74) *Attorney, Agent, or Firm* — Nicholson De Vos Webster & Elliott, LLP

(57) ABSTRACT

An apparatus and method for complex matrix conjugation and multiplication. For example, one embodiment of a processor comprises: a decoder to decode a complex matrix conjugation and multiplication instruction including a first source operand to identify a first complex source matrix comprising a first plurality of complex values, a second source operand to identify a second complex source matrix comprising a second plurality of complex values, and a first destination operand to identify a result matrix; execution circuitry to execute the complex matrix conjugation and multiplication instruction, the execution circuitry comprising: matrix conjugation hardware logic to determine a plurality of complex conjugate values corresponding to the first plurality of complex values; transpose hardware logic to transpose the plurality of complex conjugate values to generate a conjugate transpose matrix comprising the complex conjugate values; parallel multiplication circuitry to: multiply real values from the plurality of complex conjugate
(Continued)

values of the conjugate transpose matrix with corresponding imaginary values from the second plurality of complex values to generate a first plurality of imaginary products, and multiply imaginary values from the plurality of complex conjugate values of the conjugate transpose matrix with corresponding real values from the second plurality of complex values to generate a second plurality of imaginary products; and addition/subtraction circuitry to add each imaginary product in the first plurality of imaginary products to a corresponding imaginary product in the second plurality of imaginary products to produce a corresponding imaginary component in the result matrix.

19 Claims, 32 Drawing Sheets

(51) Int. Cl.
  *G06F 7/78* (2006.01)
  *G06F 9/30* (2018.01)
(52) U.S. Cl.
  CPC ...... *G06F 9/30036* (2013.01); *G06F 9/30038* (2023.08); *G06F 9/30145* (2013.01)
(58) Field of Classification Search
  CPC ...... G06F 9/30145; G06F 17/16; G06F 7/523; G06F 7/78; G06F 7/4806; G06F 7/4812
  See application file for complete search history.

(56) References Cited

U.S. PATENT DOCUMENTS

| | | | |
|---|---|---|---|
| 9,231,608 B1 | 1/2016 | Pupalaikis et al. | |
| 9,280,382 B1 | 3/2016 | Stefansson | |
| 9,456,276 B1 | 9/2016 | Chhetri | |
| 2002/0169813 A1* | 11/2002 | Pechanek | G06F 17/16 708/622 |
| 2004/0117422 A1* | 6/2004 | Debes | G06F 9/3885 712/E9.034 |
| 2004/0230632 A1* | 11/2004 | Buchert | G06F 17/16 708/622 |
| 2006/0085497 A1 | 4/2006 | Sehitoglu | |
| 2006/0271764 A1 | 11/2006 | Nilsson et al. | |
| 2010/0017450 A1 | 1/2010 | Sun et al. | |
| 2011/0040822 A1 | 2/2011 | Eichenberger et al. | |
| 2013/0114664 A1* | 5/2013 | Chen | H04L 27/01 375/232 |
| 2013/0275731 A1* | 10/2013 | Sair | G06F 9/3001 712/222 |
| 2017/0139710 A1 | 5/2017 | Zbiciak | |
| 2017/0153959 A1 | 6/2017 | Zbiciak | |
| 2017/0371018 A1* | 12/2017 | Siddiqui | G01R 33/5608 |
| 2018/0095758 A1 | 4/2018 | Dubtsov et al. | |
| 2019/0042248 A1* | 2/2019 | Bradford | G06F 9/30109 |
| 2019/0102191 A1 | 4/2019 | Madduri et al. | |
| 2019/0303142 A1* | 10/2019 | Sade | G06F 7/5443 |

OTHER PUBLICATIONS

Wikipedia. "Conjugate Transpose." Wikipedia, Wikimedia Foundation, Jan. 25, 2019, en.wikipedia.org/w/index.php?title=Conjugate_transpose&oldid=880193115. (Year: 2019).*
Office Action, EP App. No. 21197515.6, Jan. 17, 2023, 7 pages.
European Search Report and Search Opinion, EP App. No. 21198492.7, Mar. 28, 2022, 9 pages.
European Search Report and Search Opinion, EP App. No. 21197937.2, Feb. 24, 2022, 10 pages.
Final Office Action, U.S. Appl. No. 17/133,400, Jul. 25, 2024, 38 pages.
Notice of Allowance, U.S. Appl. No. 17/133,363, Aug. 1, 2024, 5 pages.
Notice of Allowance, U.S. Appl. No. 17/133,363, Aug. 8, 2024, 2 pages.
Notice of Allowance, U.S. Appl. No. 17/133,473, Aug. 13, 2024, 6 pages.
Notice of Allowance, U.S. Appl. No. 17/133,473, Aug. 27, 2024, 3 pages.
Weisstein, Eric W. "Complex Conjugate." From MathWorld—A Wolfram Web Resource, http://mathworld.wolfram.com/ComplexConjugate.html Apr. 13, 2015, 2 pages at https://web.archive.org/web/20150413210626/https://mathworld.wolfram.com/ComplexConjugate.html (Year: 2015).
Weisstein, EricW. "Transpose." From MathWorld—A Wolfram Web Resource. http://mathworld.wolfram.com/Transpose.html May 21, 2015, 2 pages. Accessed on Jul. 18, 2024, at https://web.archive.Org/web/20150521041854/https://mathworld.wolfram.com/Transpose.html (Year: 2015).
European search report and Search Opinion, EP App. No. 21197515.6, Feb. 23, 2022, 11 pages.
Final Office Action, U.S. Appl. No. 17/133,363, May 10, 2024, 9 pages.
Non-Final Office Action, U.S. Appl. No. 17/133,363, Jan. 29, 2024, 16 pages.
Non-Final Office Action, U.S. Appl. No. 17/133,400, Feb. 2, 2024, 36 pages.
Non-Final Office Action, U.S. Appl. No. 17/133,473, Mar. 21, 2024, 13 pages.
Weisstein, Eric. W "Conjugate Transpose." From MathWorld—A Wolfram Web Resource, http://mathworld.wolfram.com/ConjugateTranspose.html , Jun. 26, 2015, 1 page (Year: 2015).
Office Action, EP App. No. 21197515.6, Aug. 26, 2024, 6 pages.

* cited by examiner

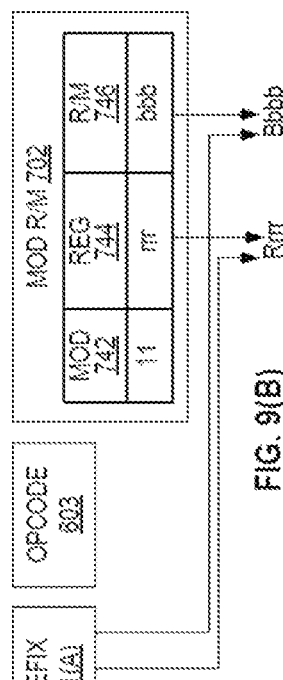
FIG. 8
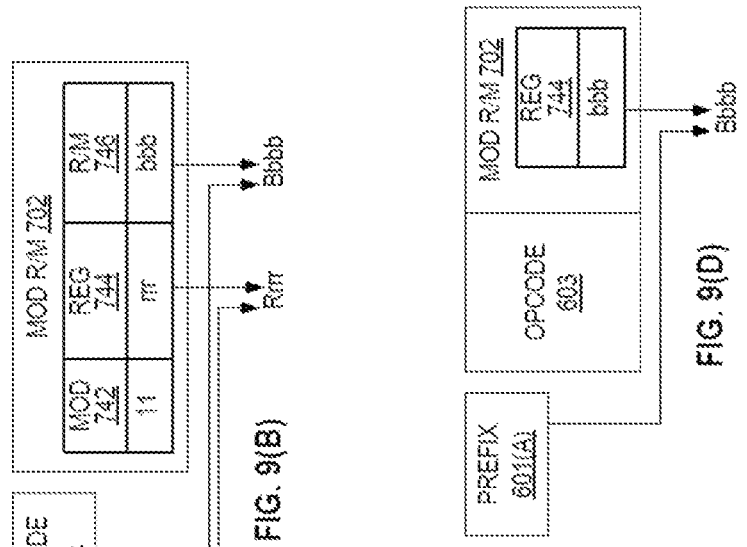
FIG. 9(B)
FIG. 9(D)
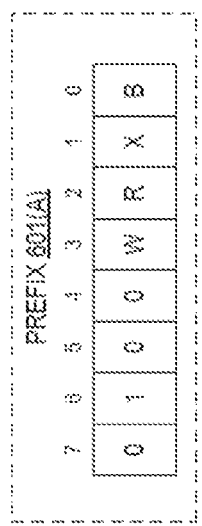
FIG. 9(A)
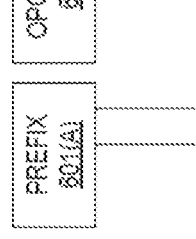
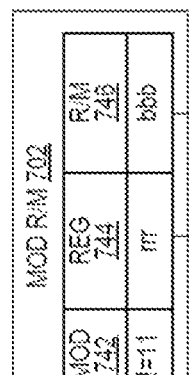
FIG. 9(C)

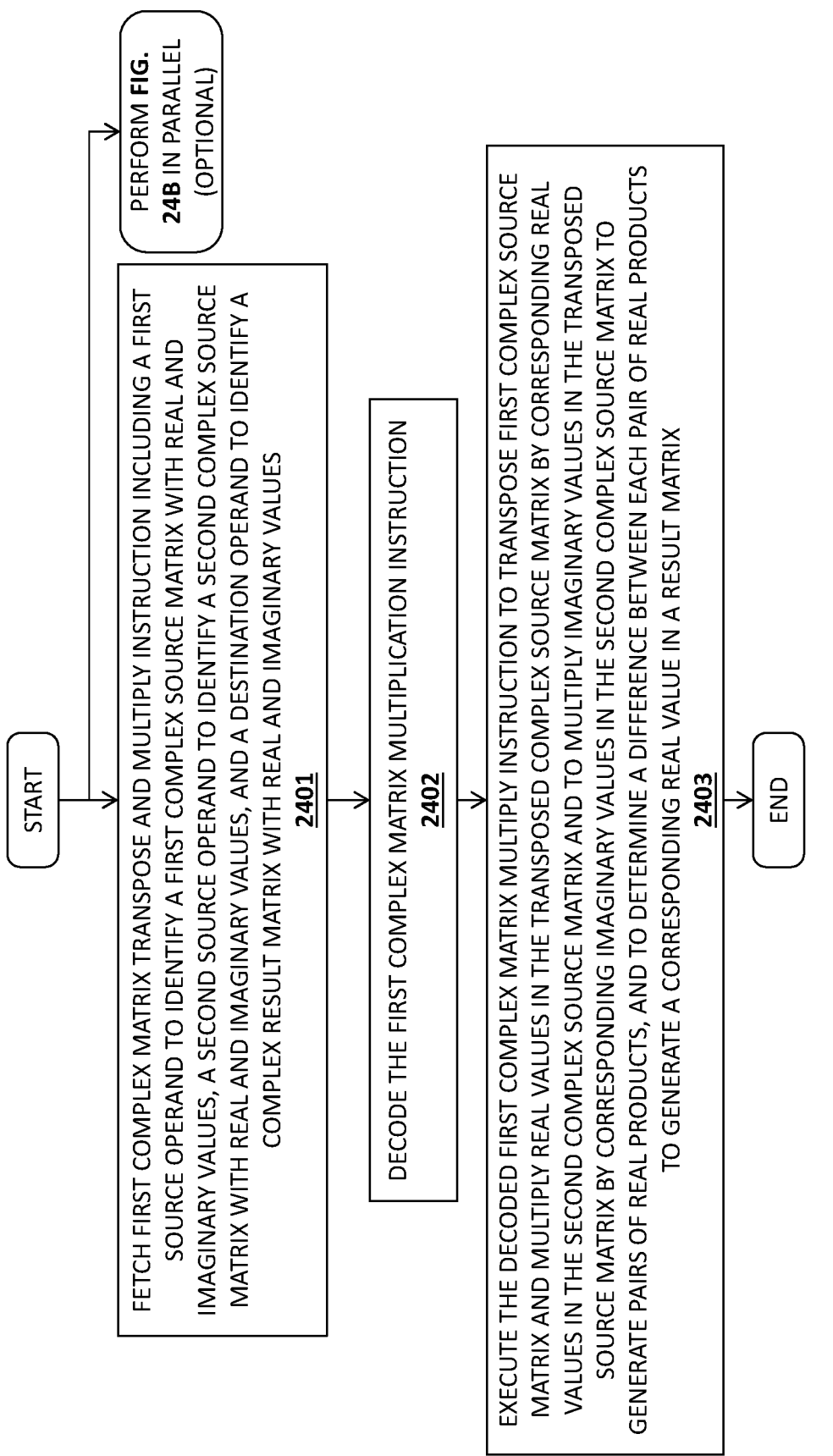

APPARATUS AND METHOD FOR CONJUGATE TRANSPOSE AND MULTIPLY

BACKGROUND

Field of the Invention

The embodiments of the invention relate generally to the field of computer processors. More particularly, the embodiments relate to an apparatus and method complex matrix conjugate transpose and multiply.

Description of the Related Art

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is instructions that are provided to the processor for execution—as opposed to micro-instructions or micro-ops—that is the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale CA implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

BRIEF DESCRIPTION OF THE DRAWINGS

A better understanding of the present invention can be obtained from the following detailed description in conjunction with the following drawings, in which:

FIG. 8 illustrates one embodiment of an instruction prefix;

FIGS. 9A-D illustrate embodiments of how the R, X, and B fields of the prefix are used;

FIGS. 24A-B illustrate methods for performing a complex matrix transpose and multiplication;

DETAILED DESCRIPTION

Exemplary Computer Architectures

Detailed below are describes of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 1:
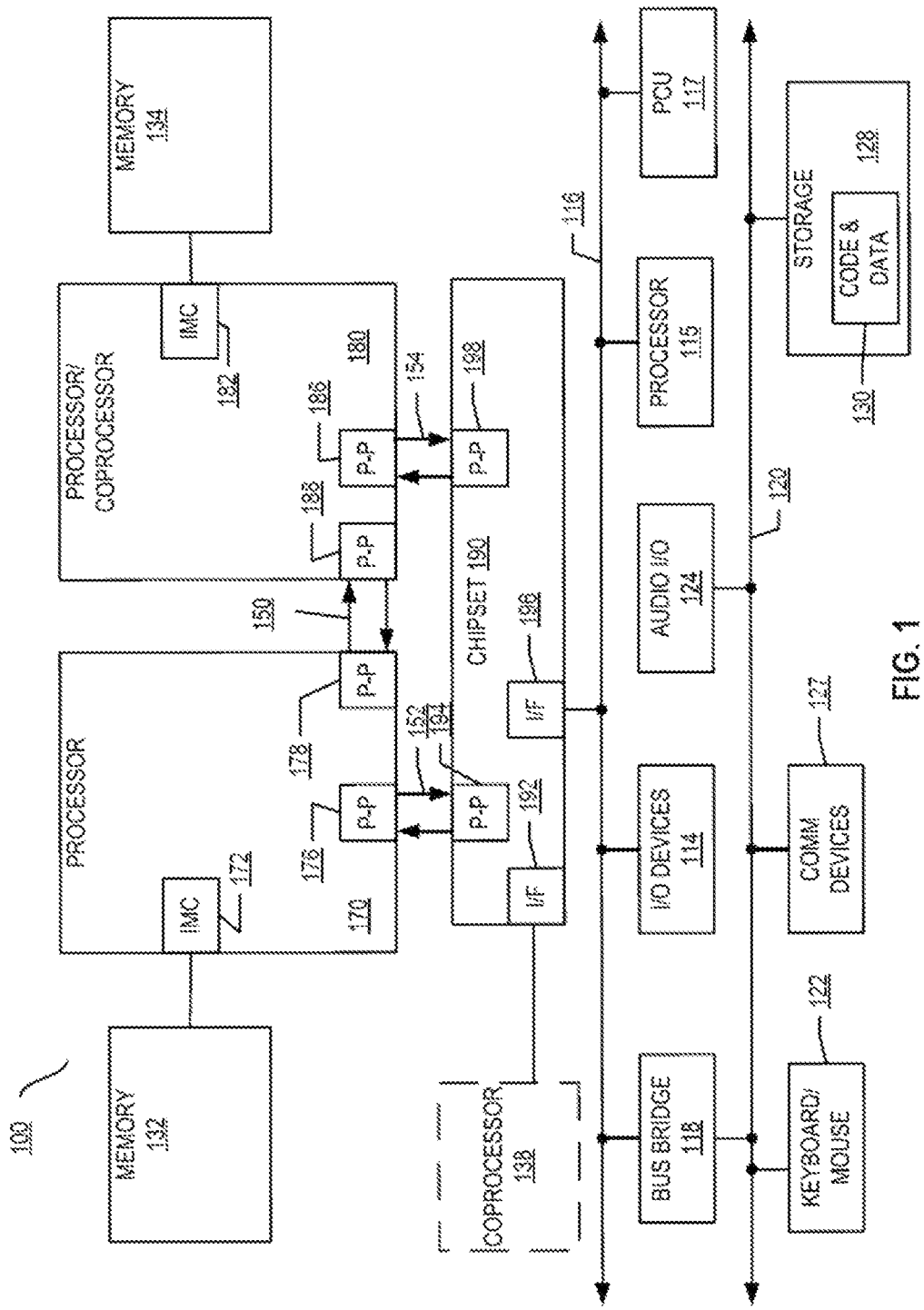
FIG. 1 illustrates an example computer system architecture.

FIG. 1 illustrates embodiments of an exemplary system. Multiprocessor system 100 is a point-to-point interconnect system and includes a plurality of processors including a first processor 170 and a second processor 180 coupled via a point-to-point interconnect 150. In some embodiments, the first processor 170 and the second processor 180 are homogeneous. In some embodiments, first processor 170 and the second processor 180 are heterogenous.

Processors 170 and 180 are shown including integrated memory controller (IMC) units circuitry 172 and 182, respectively. Processor 170 also includes as part of its interconnect controller units point-to-point (P-P) interfaces 176 and 178; similarly, second processor 180 includes P-P interfaces 186 and 188. Processors 170, 180 may exchange information via the point-to-point (P-P) interconnect 150 using P-P interface circuits 178, 188. IMCs 172 and 182 couple the processors 170, 180 to respective memories, namely a memory 132 and a memory 134, which may be portions of main memory locally attached to the respective processors.

Processors 170, 180 may each exchange information with a chipset 190 via individual P-P interconnects 152, 154 using point to point interface circuits 176, 194, 186, 198. Chipset 190 may optionally exchange information with a coprocessor 138 via a high-performance interface 192. In some embodiments, the coprocessor 138 is a special-purpose processor, such as, for example, a high-throughput MIC processor, a network or communication processor, compression engine, graphics processor, GPGPU, embedded processor, or the like.

A shared cache (not shown) may be included in either processor 170, 180 or outside of both processors, yet connected with the processors via P-P interconnect, such that either or both processors' local cache information may be stored in the shared cache if a processor is placed into a low power mode.

Chipset 190 may be coupled to a first interconnect 116 via an interface 196. In some embodiments, first interconnect 116 may be a Peripheral Component Interconnect (PCI) interconnect, or an interconnect such as a PCI Express interconnect or another I/O interconnect. In some embodiments, one of the interconnects couples to a power control unit (PCU) 117, which may include circuitry, software, and/or firmware to perform power management operations with regard to the processors 170, 180 and/or co-processor 138. PCU 117 provides control information to a voltage regulator to cause the voltage regulator to generate the appropriate regulated voltage. PCU 117 also provides control information to control the operating voltage generated. In various embodiments, PCU 117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 117 is illustrated as being present as logic separate from the processor 170 and/or processor 180. In other cases, PCU 117 may execute on a given one or more of cores (not shown) of processor 170 or 180. In some cases, PCU 117 may be implemented as a microcontroller (dedicated or general-purpose) or other control logic configured to execute its own dedicated power management code, sometimes referred to as P-code. In yet other embodiments, power management operations to be performed by PCU 117 may be implemented externally to a processor, such as by way of a separate power management integrated circuit (PMIC) or another component external to the processor. In yet other embodiments, power management operations to be performed by PCU 117 may be implemented within BIOS or other system software.

Various I/O devices 114 may be coupled to first interconnect 116, along with an interconnect (bus) bridge 118 which couples first interconnect 116 to a second interconnect 120. In some embodiments, one or more additional processor(s) 115, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 116. In some embodiments, second interconnect 120 may be a low pin count (LPC) interconnect. Various devices may be coupled to second interconnect 120 including, for example, a keyboard and/or mouse 122, communication devices 127 and a storage unit circuitry 128. Storage unit circuitry 128 may be a disk drive or other mass storage device which may include instructions/code and data 130, in some embodiments. Further, an audio I/O 124 may be coupled to second interconnect 120. Note that other architectures than the point-to-point architecture described above are possible. For example, instead of the point-to-point architecture, a system such as multiprocessor system 100 may implement a multi-drop interconnect or other such architecture.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 2:
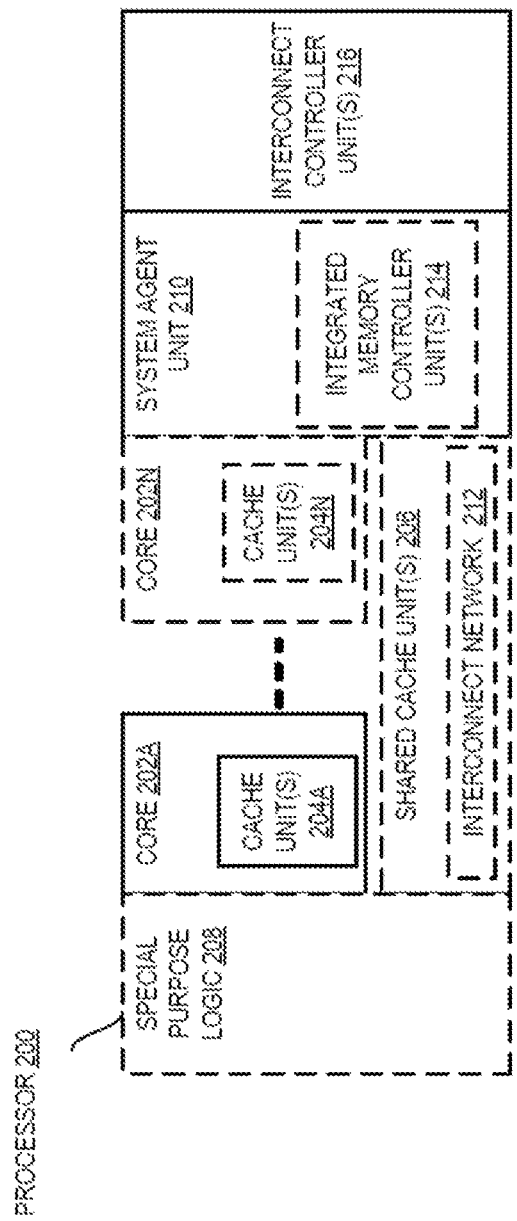
FIG. 2 illustrates a processor comprising a plurality of cores.

FIG. 2 illustrates a block diagram of embodiments of a processor 200 that may have more than one core, may have an integrated memory controller, and may have integrated graphics. The solid lined boxes illustrate a processor 200 with a single core 202A, a system agent 210, a set of one or more interconnect controller units circuitry 216, while the optional addition of the dashed lined boxes illustrates an alternative processor 200 with multiple cores 202(A)-(N), a set of one or more integrated memory controller unit(s) circuitry 214 in the system agent unit circuitry 210, and special purpose logic 208, as well as a set of one or more interconnect controller units circuitry 216. Note that the processor 200 may be one of the processors 170 or 180, or co-processor 138 or 115 of FIG. 1.

Thus, different implementations of the processor 200 may include: 1) a CPU with the special purpose logic 208 being integrated graphics and/or scientific (throughput) logic (which may include one or more cores, not shown), and the cores 202(A)-(N) being one or more general purpose cores (e.g., general purpose in-order cores, general purpose out-of-order cores, or a combination of the two); 2) a coprocessor with the cores 202(A)-(N) being a large number of special purpose cores intended primarily for graphics and/or scientific (throughput); and 3) a coprocessor with the cores 202(A)-(N) being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

A memory hierarchy includes one or more levels of cache unit(s) circuitry 204(A)-(N) within the cores 202(A)-(N), a set of one or more shared cache units circuitry 206, and external memory (not shown) coupled to the set of integrated memory controller units circuitry 214. The set of one or more shared cache units circuitry 206 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 212 interconnects the special purpose logic 208 (e.g., integrated graphics logic), the set of shared cache units circuitry 206, and the system agent unit circuitry 210, alternative embodiments use any number of well-known techniques for interconnecting such units. In some embodiments, coherency is maintained between one or more of the shared cache units circuitry 206 and cores 202(A)-(N).

In some embodiments, one or more of the cores 202(A)-(N) are capable of multi-threading. The system agent unit circuitry 210 includes those components coordinating and operating cores 202(A)-(N). The system agent unit circuitry 210 may include, for example, power control unit (PCU) circuitry and/or display unit circuitry (not shown). The PCU may be or may include logic and components needed for regulating the power state of the cores 202(A)-(N) and/or the special purpose logic 208 (e.g., integrated graphics logic). The display unit circuitry is for driving one or more externally connected displays.

The cores 202(A)-(N) may be homogenous or heterogeneous in terms of architecture instruction set; that is, two or more of the cores 202(A)-(N) may be capable of executing the same instruction set, while other cores may be capable of executing only a subset of that instruction set or a different instruction set.

Exemplary Core Architectures
In-Order and Out-Of-Order Core Block Diagram

Figure 3A:
FIG. 3A illustrates a plurality of stages of a processing pipeline.
Figure 3B:
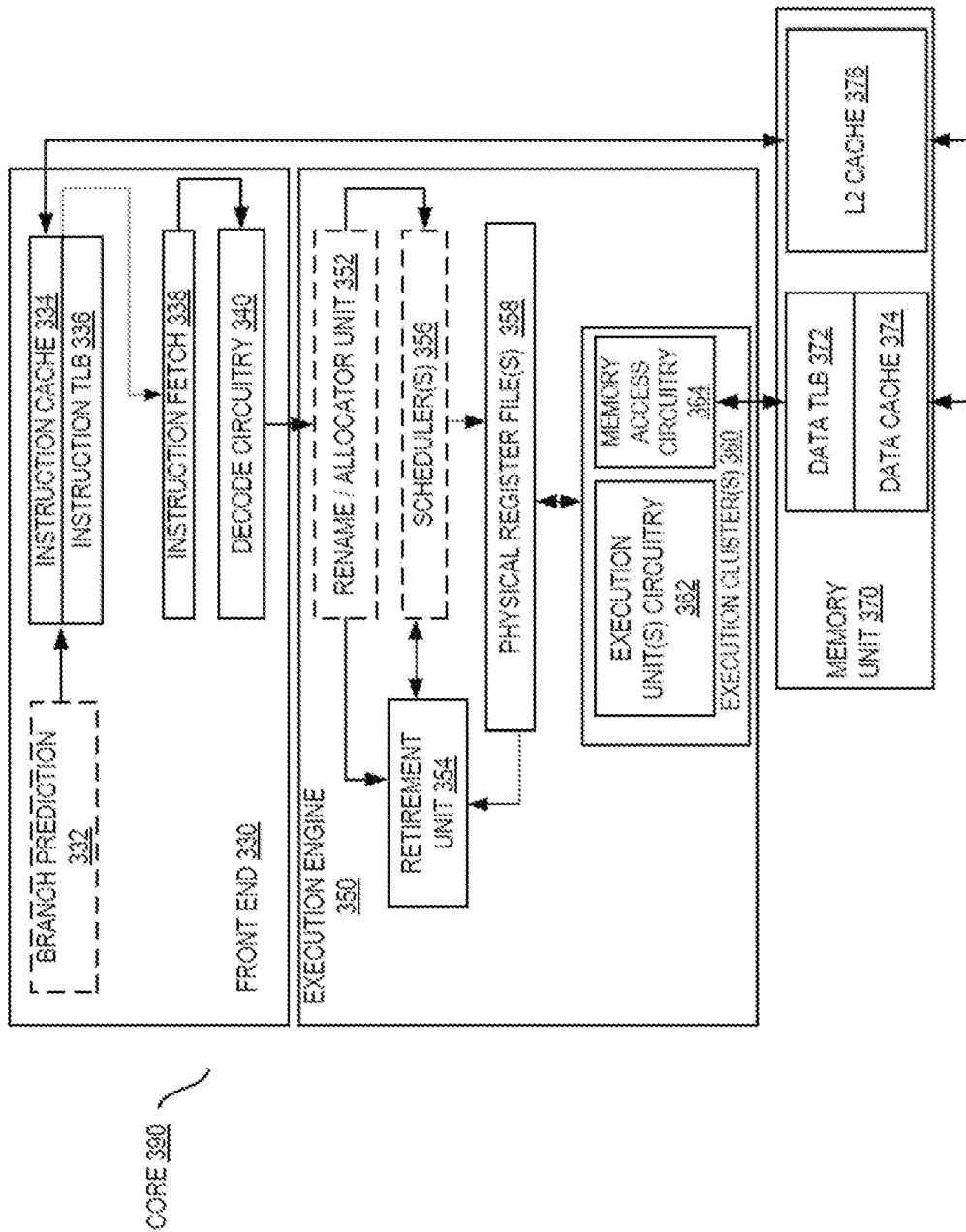
FIG. 3B illustrates details of one embodiment of a core.

FIG. 3(A) is a block diagram illustrating both an exemplary in-order pipeline and an exemplary register renaming, out-of-order issue/execution pipeline according to embodiments of the invention. FIG. 3(B) is a block diagram illustrating both an exemplary embodiment of an in-order architecture core and an exemplary register renaming, out-of-order issue/execution architecture core to be included in a processor according to embodiments of the invention. The solid lined boxes in FIGS. 3(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 3(A), a processor pipeline 300 includes a fetch stage 302, an optional length decode stage 304, a decode stage 306, an optional allocation stage 308, an optional renaming stage 310, a scheduling (also known as a dispatch or issue) stage 312, an optional register read/memory read stage 314, an execute stage 316, a write back/memory write stage 318, an optional exception handling stage 322, and an optional commit stage 324. One or more operations can be performed in each of these processor pipeline stages. For example, during the fetch stage 302, one or more instructions are fetched from instruction memory, during the decode stage 306, the one or more fetched instructions may be decoded, addresses (e.g., load store unit (LSU) addresses) using forwarded register ports may be generated, and branch forwarding (e.g., immediate offset or an link register (LR)) may be performed. In one embodiment, the decode stage 306 and the register read/memory read stage 314 may be combined into one pipeline stage. In one embodiment, during the execute stage 316, the decoded instructions may be executed, LSU address/data pipelining to an Advanced Microcontroller Bus (AHB) interface may be performed, multiply and add operations may be performed, arithmetic operations with branch results may be performed, etc.

By way of example, the exemplary register renaming, out-of-order issue/execution core architecture may implement the pipeline 300 as follows: 1) the instruction fetch 338 performs the fetch and length decoding stages 302 and 304; 2) the decode unit circuitry 340 performs the decode stage 306; 3) the rename/allocator unit circuitry 352 performs the allocation stage 308 and renaming stage 310; 4) the scheduler unit(s) circuitry 356 performs the schedule stage 312; 5) the physical register file(s) unit(s) circuitry 358 and the memory unit circuitry 370 perform the register read/memory read stage 314; the execution cluster 360 perform the execute stage 316; 6) the memory unit circuitry 370 and the physical register file(s) unit(s) circuitry 358 perform the write back/memory write stage 318; 7) various units (unit circuitry) may be involved in the exception handling stage 322; and 8) the retirement unit circuitry 354 and the physical register file(s) unit(s) circuitry 358 perform the commit stage 324.

FIG. 3(B) shows processor core 390 including front-end unit circuitry 330 coupled to an execution engine unit circuitry 350, and both are coupled to a memory unit circuitry 370. The core 390 may be a reduced instruction set computing (RISC) core, a complex instruction set computing (CISC) core, a very long instruction word (VLIW) core, or a hybrid or alternative core type. As yet another option, the core 390 may be a special-purpose core, such as, for example, a network or communication core, compression engine, coprocessor core, general purpose computing graphics processing unit (GPGPU) core, graphics core, or the like.

The front end unit circuitry 330 may include branch prediction unit circuitry 332 coupled to an instruction cache unit circuitry 334, which is coupled to an instruction translation lookaside buffer (TLB) 336, which is coupled to instruction fetch unit circuitry 338, which is coupled to decode unit circuitry 340. In one embodiment, the instruction cache unit circuitry 334 is included in the memory unit circuitry 370 rather than the front-end unit circuitry 330. The decode unit circuitry 340 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 340 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 390 includes a microcode ROM (not shown) or other medium that stores microcode for certain macroinstructions (e.g., in decode unit circuitry 340 or otherwise within the front end unit circuitry 330). In one embodiment, the decode unit circuitry 340 includes a micro-operation (micro-op) or operation cache (not shown) to hold/cache decoded operations, micro-tags, or micro-operations generated during the decode or other stages of the processor pipeline 300. The decode unit circuitry 340 may be coupled to rename/allocator unit circuitry 352 in the execution engine unit circuitry 350.

The execution engine circuitry 350 includes the rename/allocator unit circuitry 352 coupled to a retirement unit circuitry 354 and a set of one or more scheduler(s) circuitry 356. The scheduler(s) circuitry 356 represents any number of different schedulers, including reservations stations, central instruction window, etc. In some embodiments, the scheduler(s) circuitry 356 can include arithmetic logic unit (ALU) scheduler/scheduling circuitry, ALU queues, arithmetic generation unit (AGU) scheduler/scheduling circuitry, AGU queues, etc. The scheduler(s) circuitry 356 is coupled to the physical register file(s) circuitry 358. Each of the physical register file(s) circuitry 358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit circuitry 358 includes vector registers unit circuitry, writemask registers unit circuitry, and scalar register unit circuitry. These register units may provide architectural vector registers, vector mask registers, general-purpose registers, etc. The physical register file(s) unit(s) circuitry 358 is overlapped by the retirement unit circuitry 354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 354 and the physical register file(s) circuitry 358 are coupled to the execution cluster(s) 360. The execution cluster(s) 360 includes a set of one or more execution units circuitry 362 and a set of one or more memory access circuitry 364. The execution units circuitry 362 may perform various arithmetic, logic, floating-point or other types of operations (e.g., shifts, addition, subtraction, multiplication) and on various types of data (e.g., scalar floating-point, packed integer, packed floating-point, vector integer, vector floating-point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 356, physical register file(s) unit(s) circuitry 358, and execution cluster(s) 360 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 364). It should also be understood that where separate pipelines are used, one or more of these pipelines may be out-of-order issue/execution and the rest in-order.

In some embodiments, the execution engine unit circuitry 350 may perform load store unit (LSU) address/data pipelining to an Advanced Microcontroller Bus (AHB) interface (not shown), and address phase and writeback, data phase load, store, and branches.

The set of memory access circuitry 364 is coupled to the memory unit circuitry 370, which includes data TLB unit circuitry 372 coupled to a data cache circuitry 374 coupled to a level 2 (L2) cache circuitry 376. In one exemplary embodiment, the memory access units circuitry 364 may include a load unit circuitry, a store address unit circuit, and a store data unit circuitry, each of which is coupled to the data TLB circuitry 372 in the memory unit circuitry 370. The instruction cache circuitry 334 is further coupled to a level 2 (L2) cache unit circuitry 376 in the memory unit circuitry 370. In one embodiment, the instruction cache 334 and the data cache 374 are combined into a single instruction and data cache (not shown) in L2 cache unit circuitry 376, a level 3 (L3) cache unit circuitry (not shown), and/or main memory. The L2 cache unit circuitry 376 is coupled to one or more other levels of cache and eventually to a main memory.

The core 390 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 390 includes logic to support a packed data instruction set extension (e.g., AVX1, AVX2), thereby allowing the operations used by many multimedia applications to be performed using packed data.

Exemplary Execution Unit(s) Circuitry

Figure 4:
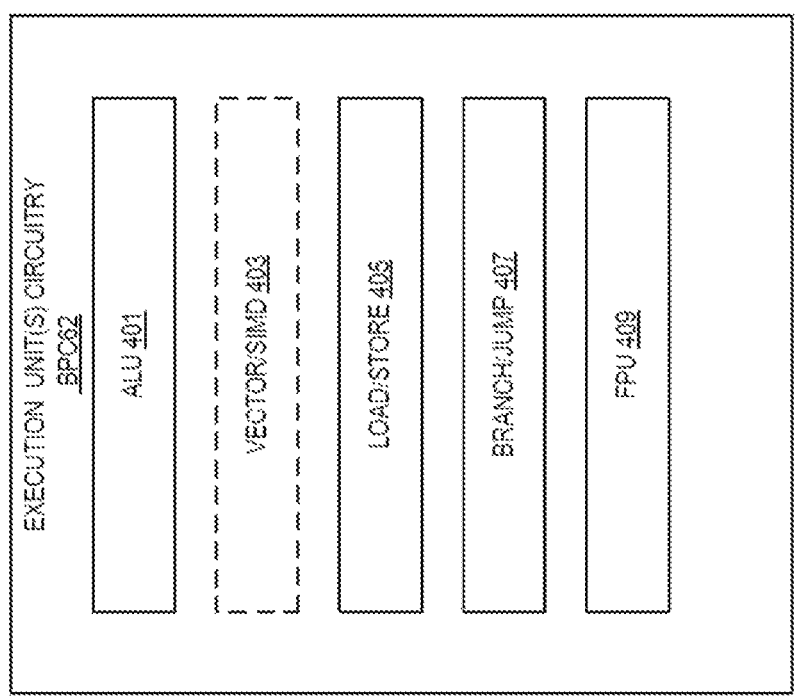
FIG. 4 illustrates execution circuitry in accordance with one embodiment.

FIG. 4 illustrates embodiments of execution unit(s) circuitry, such as execution unit(s) circuitry 362 of FIG. 3(B). As illustrated, execution unit(s) circuity 362 may include one or more ALU circuits 401, vector/SIMD unit circuits 403, load/store unit circuits 405, and/or branch/jump unit circuits 407. ALU circuits 401 perform integer arithmetic and/or Boolean operations. Vector/SIMD unit circuits 403 perform vector/SIMD operations on packed data (such as SIMD/vector registers). Load/store unit circuits 405 execute load and store instructions to load data from memory into registers or store from registers to memory. Load/store unit circuits 405 may also generate addresses. Branch/jump unit circuits 407 cause a branch or jump to a memory address depending on the instruction. Floating-point unit (FPU)

circuits 409 perform floating-point arithmetic. The width of the execution unit(s) circuitry 362 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Exemplary Register Architecture

Figure 5:
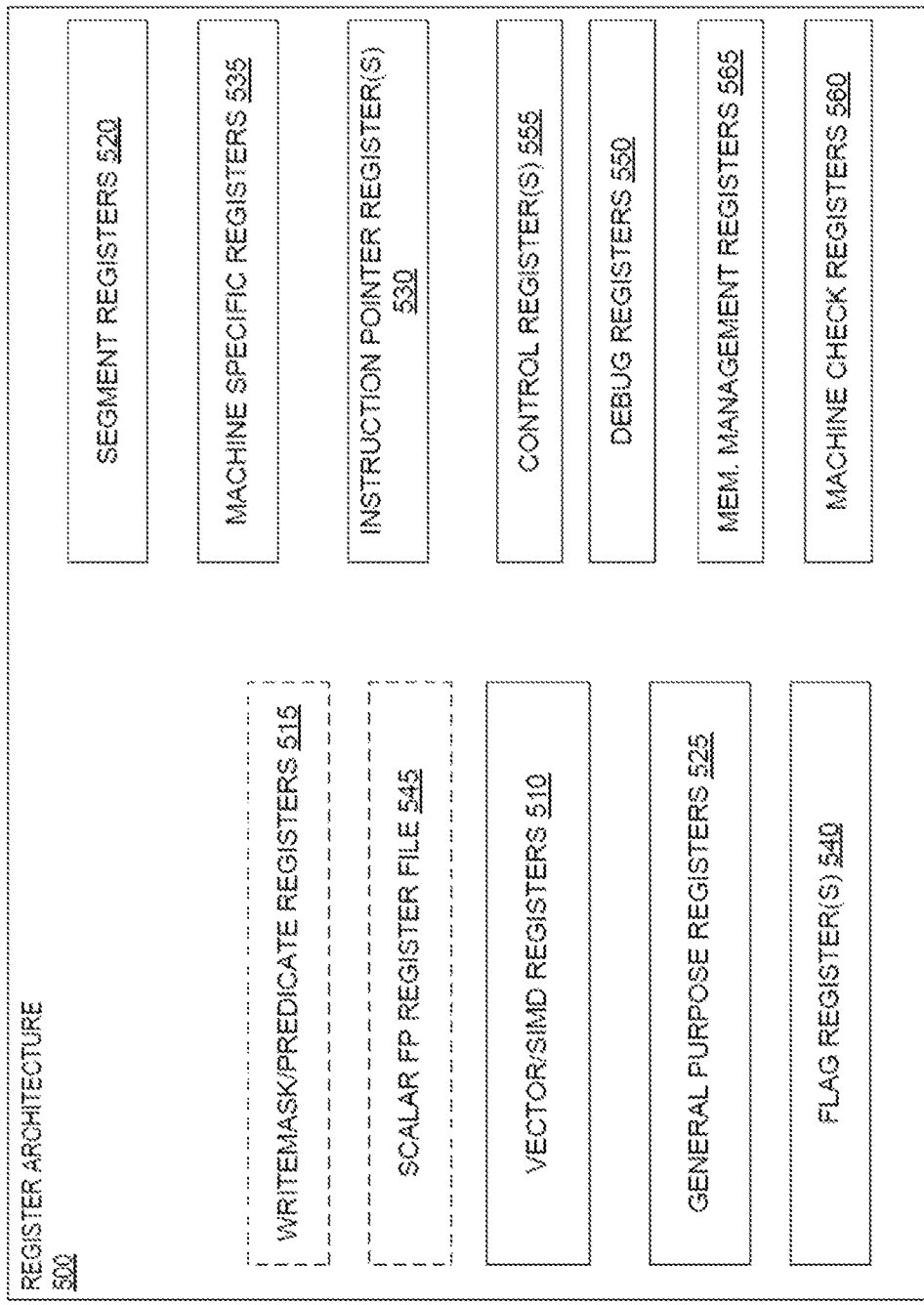
FIG. 5 illustrates one embodiment of a register architecture.

FIG. 5 is a block diagram of a register architecture 500 according to some embodiments. As illustrated, there are vector/SIMD registers 510 that vary from 128-bit to 1,024 bits width. In some embodiments, the vector/SIMD registers 510 are physically 512-bits and, depending upon the mapping, only some of the lower bits are used. For example, in some embodiments, the vector/SIMD registers 510 are ZMM registers which are 512 bits: the lower 256 bits are used for YMM registers and the lower 128 bits are used for XMM registers. As such, there is an overlay of registers. In some embodiments, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the embodiment.

In some embodiments, the register architecture 500 includes writemask/predicate registers 515. For example, in some embodiments, there are 8 writemask/predicate registers (sometimes called k0 through k7) that are each 16-bit, 32-bit, 64-bit, or 128-bit in size. Writemask/predicate registers 515 may allow for merging (e.g., allowing any set of elements in the destination to be protected from updates during the execution of any operation) and/or zeroing (e.g., zeroing vector masks allow any set of elements in the destination to be zeroed during the execution of any operation). In some embodiments, each data element position in a given writemask/predicate register 515 corresponds to a data element position of the destination. In other embodiments, the writemask/predicate registers 515 are scalable and consists of a set number of enable bits for a given vector element (e.g., 8 enable bits per 64-bit vector element).

The register architecture 500 includes a plurality of general-purpose registers 525. These registers may be 16-bit, 32-bit, 64-bit, etc. and can be used for scalar operations. In some embodiments, these registers are referenced by the names RAX, RBX, RCX, RDX, RBP, RSI, RDI, RSP, and R8 through R15.

In some embodiments, the register architecture 500 includes scalar floating-point register 545 which is used for scalar floating-point operations on 32/64/80-bit floating-point data using the x87 instruction set extension or as MMX registers to perform operations on 64-bit packed integer data, as well as to hold operands for some operations performed between the MMX and XMM registers.

One or more flag registers 540 (e.g., EFLAGS, RFLAGS, etc.) store status and control information for arithmetic, compare, and system operations. For example, the one or more flag registers 540 may store condition code information such as carry, parity, auxiliary carry, zero, sign, and overflow. In some embodiments, the one or more flag registers 540 are called program status and control registers.

Segment registers 520 contain segment points for use in accessing memory. In some embodiments, these registers are referenced by the names CS, DS, SS, ES, FS, and GS.

Machine specific registers (MSRs) 535 control and report on processor performance. Most MSRs 535 handle system-related functions and are not accessible to an application program. Machine check registers 560 consist of control, status, and error reporting MSRs that are used to detect and report on hardware errors.

One or more instruction pointer register(s) 530 store an instruction pointer value. Control register(s) 555 (e.g., CR0-CR4) determine the operating mode of a processor (e.g., processor 170, 180, 138, 115, and/or 200) and the characteristics of a currently executing task. Debug registers 550 control and allow for the monitoring of a processor or core's debugging operations.

Memory management registers 565 specify the locations of data structures used in protected mode memory management. These registers may include a GDTR, IDRT, task register, and a LDTR register.

Alternative embodiments of the invention may use wider or narrower registers. Additionally, alternative embodiments of the invention may use more, less, or different register files and registers.

Instruction Sets

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Figure 6:
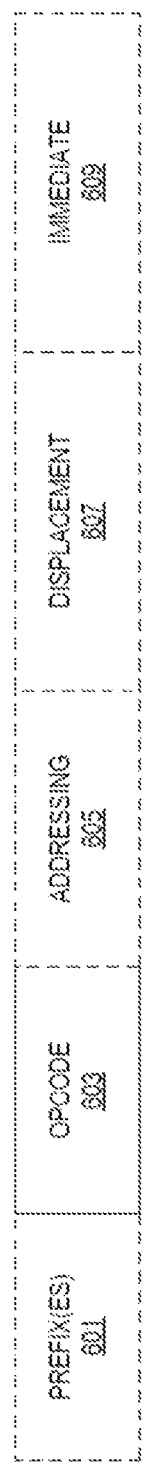
FIG. 6 illustrates one example of an instruction format.

FIG. 6 illustrates embodiments of an instruction format. As illustrated, an instruction may include multiple components including, but not limited to, one or more fields for: one or more prefixes 601, an opcode 603, addressing information 605 (e.g., register identifiers, memory addressing information, etc.), a displacement value 607, and/or an immediate 609. Note that some instructions utilize some or all of the fields of the format whereas others may only use the field for the opcode 603. In some embodiments, the order illustrated is the order in which these fields are to be encoded, however, it should be appreciated that in other embodiments these fields may be encoded in a different order, combined, etc.

The prefix(es) field(s) 601, when used, modifies an instruction. In some embodiments, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 603 is used to at least partially define the operation to be performed upon a decoding of the instruction. In some embodiments, a primary opcode encoded in the opcode field 603 is 1, 2, or 3 bytes in length. In other embodiments, a primary opcode can be a different length. An additional 3-bit opcode field is sometimes encoded in another field.

Figure 7:
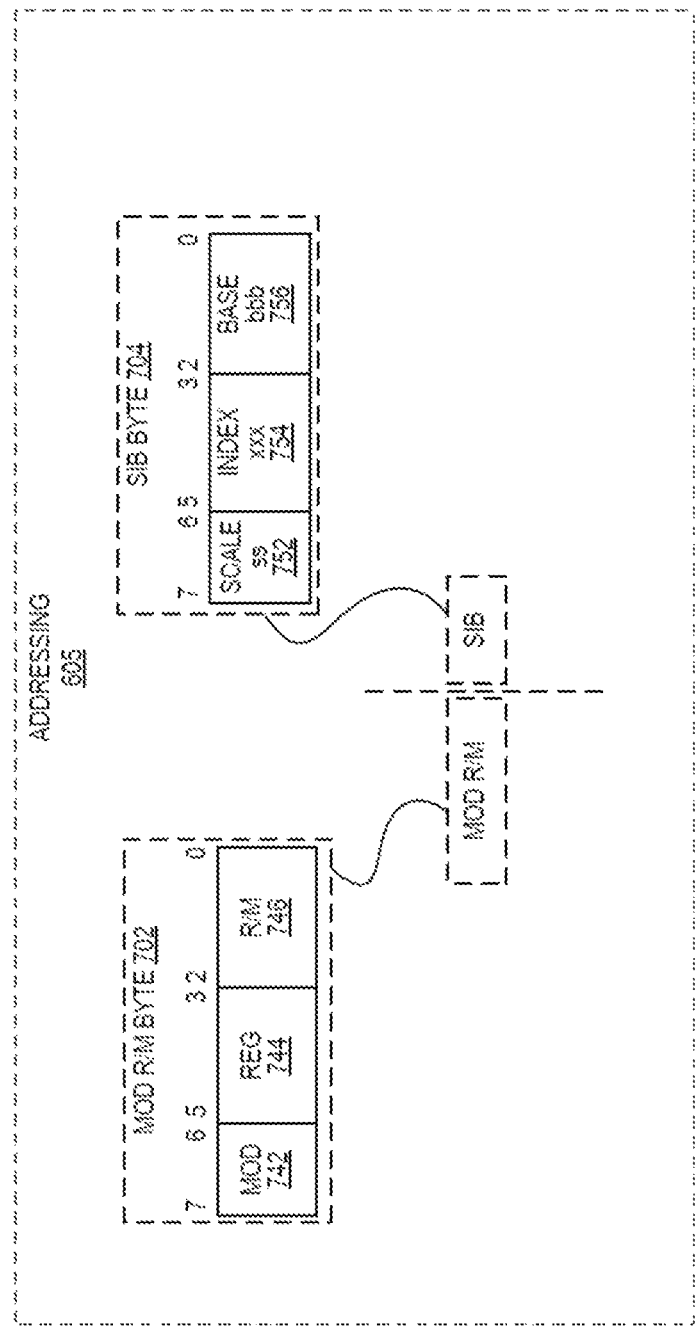
FIG. 7 illustrates addressing techniques in accordance with one embodiment.

The addressing field 605 is used to address one or more operands of the instruction, such as a location in memory or one or more registers. FIG. 7 illustrates embodiments of the addressing field 605. In this illustration, an optional ModR/M byte 702 and an optional Scale, Index, Base (SIB) byte 704 are shown. The ModR/M byte 702 and the SIB byte 704 are used to encode up to two operands of an instruction, each of which is a direct register or effective memory address. Note that each of these fields are optional in that not all instructions include one or more of these fields. The MOD R/M byte 702 includes a MOD field 742, a register field 744, and R/M field 746.

The content of the MOD field 742 distinguishes between memory access and non-memory access modes. In some embodiments, when the MOD field 742 has a value of b11, a register-direct addressing mode is utilized, and otherwise register-indirect addressing is used.

The register field 744 may encode either the destination register operand or a source register operand, or may encode an opcode extension and not be used to encode any instruction operand. The content of register index field 744, directly or through address generation, specifies the locations of a source or destination operand (either in a register or in memory). In some embodiments, the register field 744 is supplemented with an additional bit from a prefix (e.g., prefix 601) to allow for greater addressing.

The R/M field 746 may be used to encode an instruction operand that references a memory address, or may be used to encode either the destination register operand or a source register operand. Note the R/M field 746 may be combined with the MOD field 742 to dictate an addressing mode in some embodiments.

The SIB byte 704 includes a scale field 752, an index field 754, and a base field 756 to be used in the generation of an address. The scale field 752 indicates scaling factor. The index field 754 specifies an index register to use. In some embodiments, the index field 754 is supplemented with an additional bit from a prefix (e.g., prefix 601) to allow for greater addressing. The base field 756 specifies a base register to use. In some embodiments, the base field 756 is supplemented with an additional bit from a prefix (e.g., prefix 601) to allow for greater addressing. In practice, the content of the scale field 752 allows for the scaling of the content of the index field 754 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some embodiments, a displacement field 607 provides this value. Additionally, in some embodiments, a displacement factor usage is encoded in the MOD field of the addressing field 605 that indicates a compressed displacement scheme for which a displacement value is calculated by multiplying disp8 in conjunction with a scaling factor N that is determined based on the vector length, the value of a b bit, and the input element size of the instruction. The displacement value is stored in the displacement field 607.

In some embodiments, an immediate field 609 specifies an immediate for the instruction. An immediate may be encoded as a 1-byte value, a 2-byte value, a 4-byte value, etc.

FIG. 8 illustrates embodiments of a first prefix 601(A). In some embodiments, the first prefix 601(A) is an embodiment of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 601(A) may specify up to three registers using 3-bit fields depending on the format: 1) using the reg field 744 and the R/M field 746 of the Mod R/M byte 702; 2) using the Mod R/M byte 702 with the SIB byte 704 including using the reg field 744 and the base field 756 and index field 754; or 3) using the register field of an opcode.

In the first prefix 601(A), bit positions 7:4 are set as 0100. Bit position 3 (W) can be used to determine the operand size, but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 744 and MOD R/M R/M field 746 alone can each only address 8 registers.

In the first prefix 601(A), bit position 2 (R) may an extension of the MOD R/M reg field 744 and may be used to modify the ModR/M reg field 744 when that field encodes a general purpose register, a 64-bit packed data register (e.g., a SSE register), or a control or debug register. R is ignored when Mod R/M byte 702 specifies other registers or defines an extended opcode.

Bit position 1 (X) X bit may modify the SIB byte index field 754.

Bit position B (B) B may modify the base in the Mod R/M R/M field 746 or the SIB byte base field 756; or it may modify the opcode register field used for accessing general purpose registers (e.g., general purpose registers 525).

FIGS. 9(A)-(D) illustrate embodiments of how the R, X, and B fields of the first prefix 601(A) are used. FIG. 9(A) illustrates R and B from the first prefix 601(A) being used to extend the reg field 744 and R/M field 746 of the MOD R/M byte 702 when the SIB byte 7 04 is not used for memory addressing. FIG. 9(B) illustrates R and B from the first prefix 601(A) being used to extend the reg field 744 and R/M field 746 of the MOD R/M byte 702 when the SIB byte 7 04 is not used (register-register addressing). FIG. 9(C) illustrates R, X, and B from the first prefix 601(A) being used to extend the reg field 744 of the MOD R/M byte 702 and the index field 754 and base field 756 when the SIB byte 7 04 being used for memory addressing. FIG. 9(D) illustrates B from the first prefix 601(A) being used to extend the reg field 744 of the MOD R/M byte 702 when a register is encoded in the opcode 603.

Figure 10A:
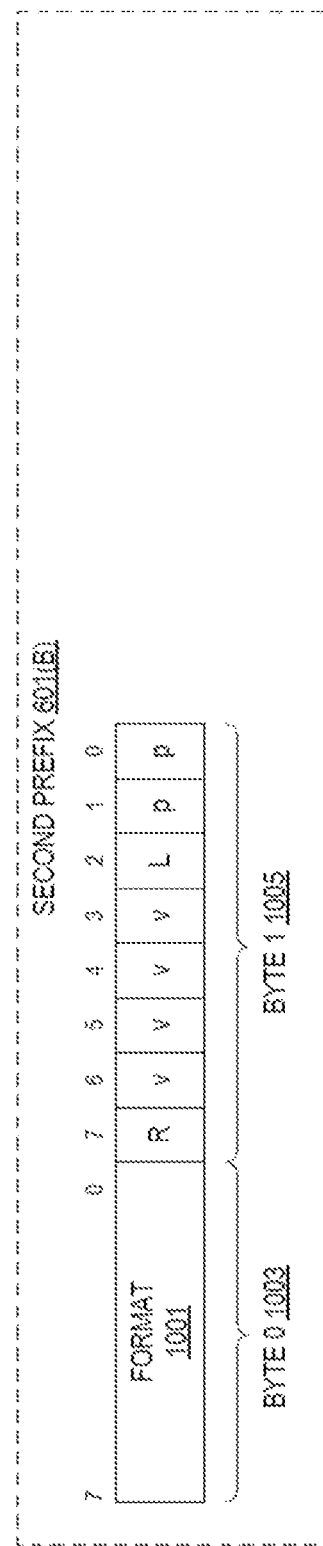
FIGS. 10A-B illustrate examples of a second instruction prefix.
Figure 10B:
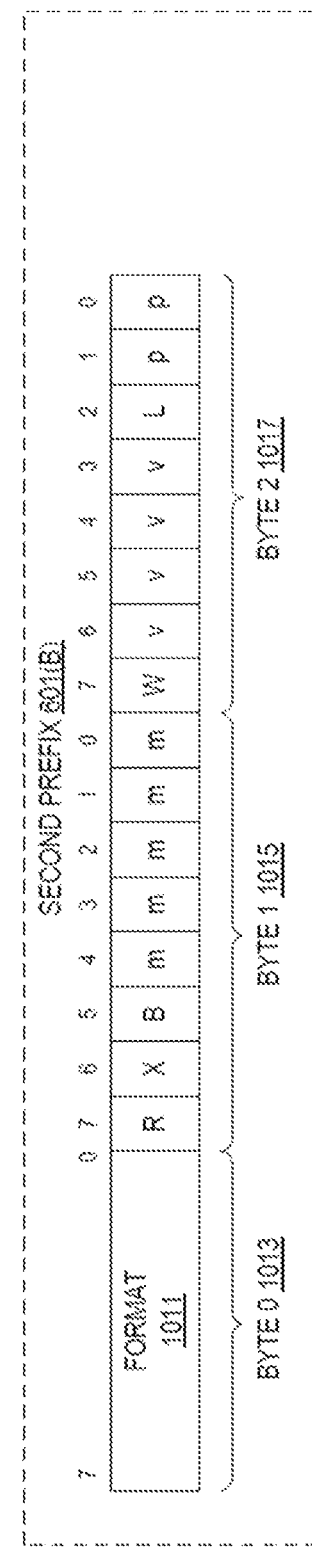

FIGS. 10(A)-(B) illustrate embodiments of a second prefix 601(B). In some embodiments, the second prefix 601(B) is an embodiment of a VEX prefix. The second prefix 601(B) encoding allows instructions to have more than two operands, and allows SIMD vector registers (e.g., vector/SIMD registers 510) to be longer than 64-bits (e.g., 128-bit and 256-bit). The use of the second prefix 601(B) provides for three-operand (or more) syntax. For example, previous two-operand instructions performed operations such as A=A+B, which overwrites a source operand. The use of the second prefix 601(B) enables operands to perform nondestructive operations such as A=B+C.

In some embodiments, the second prefix 601(B) comes in two forms—a two-byte form and a three-byte form. The two-byte second prefix 601(B) is used mainly for 128-bit, scalar, and some 256-bit instructions; while the three-byte second prefix 601(B) provides a compact replacement of the first prefix 601(A) and 3-byte opcode instructions.

FIG. 10(A) illustrates embodiments of a two-byte form of the second prefix 601(B). In one example, a format field 1001 (byte 0 1003) contains the value C5H. In one example, byte 1 1005 includes a "R" value in bit[7]. This value is the complement of the same value of the first prefix 601(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746 and the Mod R/M reg field 744 encode three of the four operands. Bits[7:4] of the immediate 609 are then used to encode the third source register operand.

FIG. 10(B) illustrates embodiments of a three-byte form of the second prefix 601(B). in one example, a format field 1011 (byte 0 1013) contains the value C4H. Byte 1 1015 includes in bits[7:5] "R," "X," and "B" which are the complements of the same values of the first prefix 601(A). Bits[4:0] of byte 1 1015 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 1017 is used similar to W of the first prefix 601(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the Mod R/M R/M field 746 to encode the instruction operand that references a memory address or encode either the destination register operand or a source register operand.

Instructions that use this prefix may use the Mod R/M reg field 744 to encode either the destination register operand or a source register operand, be treated as an opcode extension and not used to encode any instruction operand.

For instruction syntax that support four operands, vvvv, the Mod R/M R/M field 746, and the Mod R/M reg field 744 encode three of the four operands. Bits[7:4] of the immediate 609 are then used to encode the third source register operand.

Figure 11:
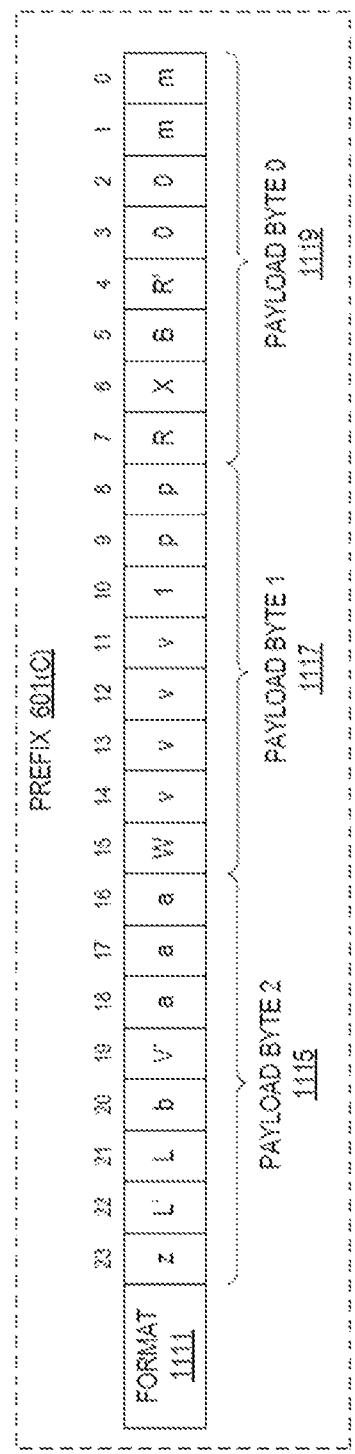
FIG. 11 illustrates payload bytes of one embodiment of an instruction prefix.

FIG. 11 illustrates embodiments of a third prefix 601(C). In some embodiments, the first prefix 601(A) is an embodiment of an EVEX prefix. The third prefix 601(C) is a four-byte prefix.

The third prefix 601(C) can encode 32 vector registers (e.g., 128-bit, 256-bit, and 512-bit registers) in 64-bit mode. In some embodiments, instructions that utilize a writemask/opmask (see discussion of registers in a previous figure, such as FIG. 5) or predication utilize this prefix. Opmask register allow for conditional processing or selection control. Opmask instructions, whose source/destination operands are opmask registers and treat the content of an opmask register as a single value, are encoded using the second prefix 601(B).

The third prefix 601(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 601(C) is a format field 1111 that has a value, in one example, of 62H. Subsequent bytes are referred to as payload bytes 1115-1119 and collectively form a 24-bit value of P[23:0] providing specific capability in the form of one or more fields (detailed herein).

In some embodiments, P[1:0] of payload byte 1119 are identical to the low two mmmmm bits. P[3:2] are reserved in some embodiments. Bit P[4] (R') allows access to the high 16 vector register set when combined with P[7] and the ModR/M reg field 744. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 744 and ModR/M R/M field 746. P[9:8] provide opcode extensionality equivalent to some legacy prefixes (e.g., 00=no prefix, 01=66H, 10=F3H, and 11=F2H). P[10] in some embodiments is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 601(A) and second prefix 611(B) and may serve as an opcode extension bit or operand size promotion.

P[18:16] specify the index of a register in the opmask (writemask) registers (e.g., writemask/predicate registers 515). In one embodiment of the invention, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While embodiments of the invention are described in which the opmask field's content selects one of a number of opmask registers that contains the opmask to be used (and thus the opmask field's content indirectly identifies that masking to be performed), alternative embodiments instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary embodiments of encoding of registers in instructions using the third prefix 601(C) are detailed in the following tables.

TABLE 1

32-Register Support in 64-bit Mode

|       | 4  | 3 | [2:0]      | REG. TYPE   | COMMON USAGES           |
|-------|----|---|------------|-------------|-------------------------|
| REG   | R' | R | ModR/M reg | GPR, Vector | Destination or Source   |
| VVVV  | V' |   | vvvv       | GPR, Vector | 2nd Source or Destination |
| RM    | X  | B | ModR/M R/M | GPR, Vector | 1st Source or Destination |
| BASE  | 0  | B | ModR/M R/M | GPR         | Memory addressing       |
| INDEX | 0  | X | SIB.index  | GPR         | Memory addressing       |
| VIDX  | V' | X | SIB.index  | Vector      | VSIB memory addressing  |

TABLE 2

Encoding Register Specifiers in 32-bit Mode

|       | [2:0]      | REG. TYPE   | COMMON USAGES             |
|-------|------------|-------------|---------------------------|
| REG   | ModR/M reg | GPR, Vector | Destination or Source     |
| VVVV  | vvvv       | GPR, Vector | $2^{nd}$ Source or Destination |
| RM    | ModR/M R/M | GPR, Vector | $1^{st}$ Source or Destination |
| BASE  | ModR/M R/M | GPR         | Memory addressing         |
| INDEX | SIB.index  | GPR         | Memory addressing         |
| VIDX  | SIB.index  | Vector      | VSIB memory addressing    |

TABLE 3

Opmask Register Specifier Encoding

|       | [2:0]      | REG. TYPE | COMMON USAGES |
|-------|------------|-----------|---------------|
| REG   | ModR/M Reg | k0-k7     | Source        |
| VVVV  | vvvv       | k0-k7     | $2^{nd}$ Source  |
| RM    | ModR/M R/M | k0-7      | $1^{st}$ Source  |
| {k1}  | aaa        | $k0^1$-k7 | Opmask        |

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
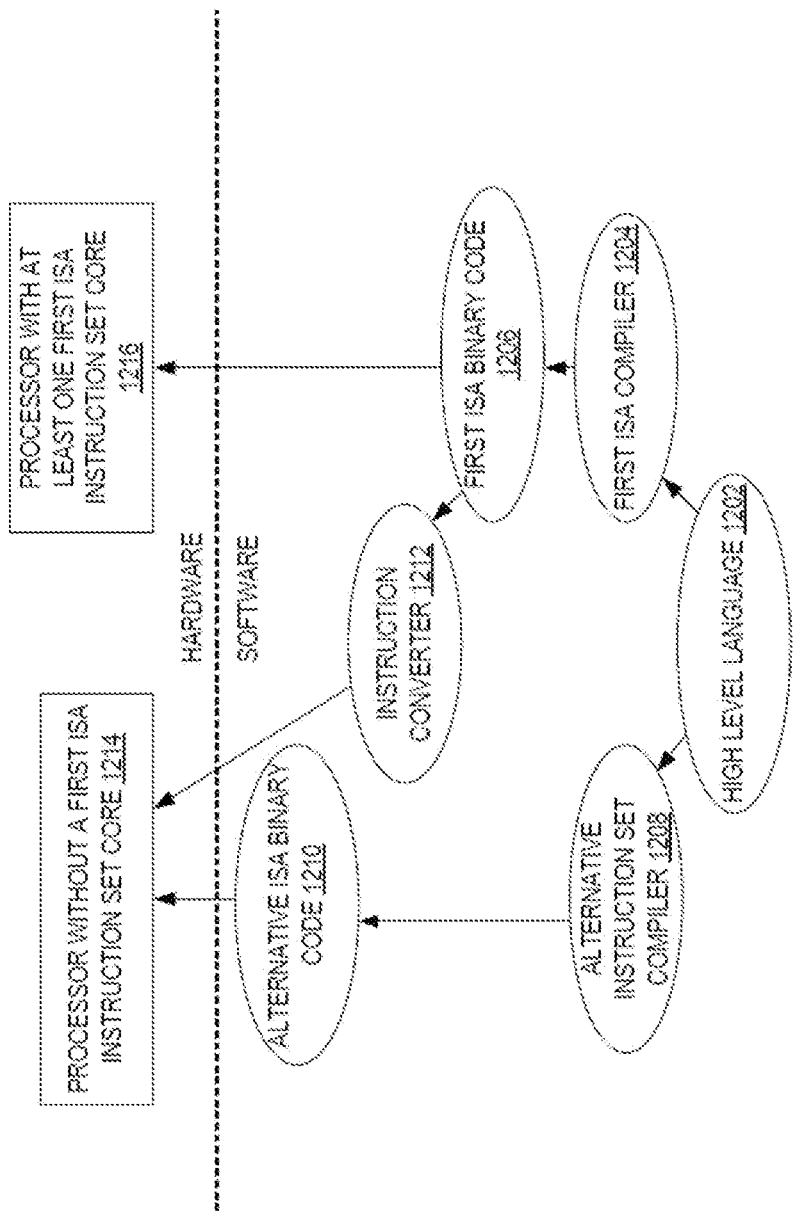
FIG. 12 illustrates techniques for executing different instruction set architectures.

FIG. 12 illustrates a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using a first ISA compiler 1204 to generate first ISA binary code 1206 that may be natively executed by a processor with at least one first instruction set core 1216. The processor with at least one first ISA instruction set core 1216 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 1204 represents a compiler that is operable to generate first ISA binary code 1206 (e.g., object code) that can, with or without additional linkage processing, be executed on the processor with at least one first ISA instruction set core 1216.

Similarly, FIG. 12 shows the program in the high level language 1202 may be compiled using an alternative instruction set compiler 1208 to generate alternative instruction set binary code 1210 that may be natively executed by a processor without a first ISA instruction set core 1214. The instruction converter 1212 is used to convert the first ISA binary code 1206 into code that may be natively executed by the processor without a first ISA instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have a first ISA instruction set processor or core to execute the first ISA binary code 1206.

Exemplary Tile/Matrix Operations and Hardware

Figure 13A:
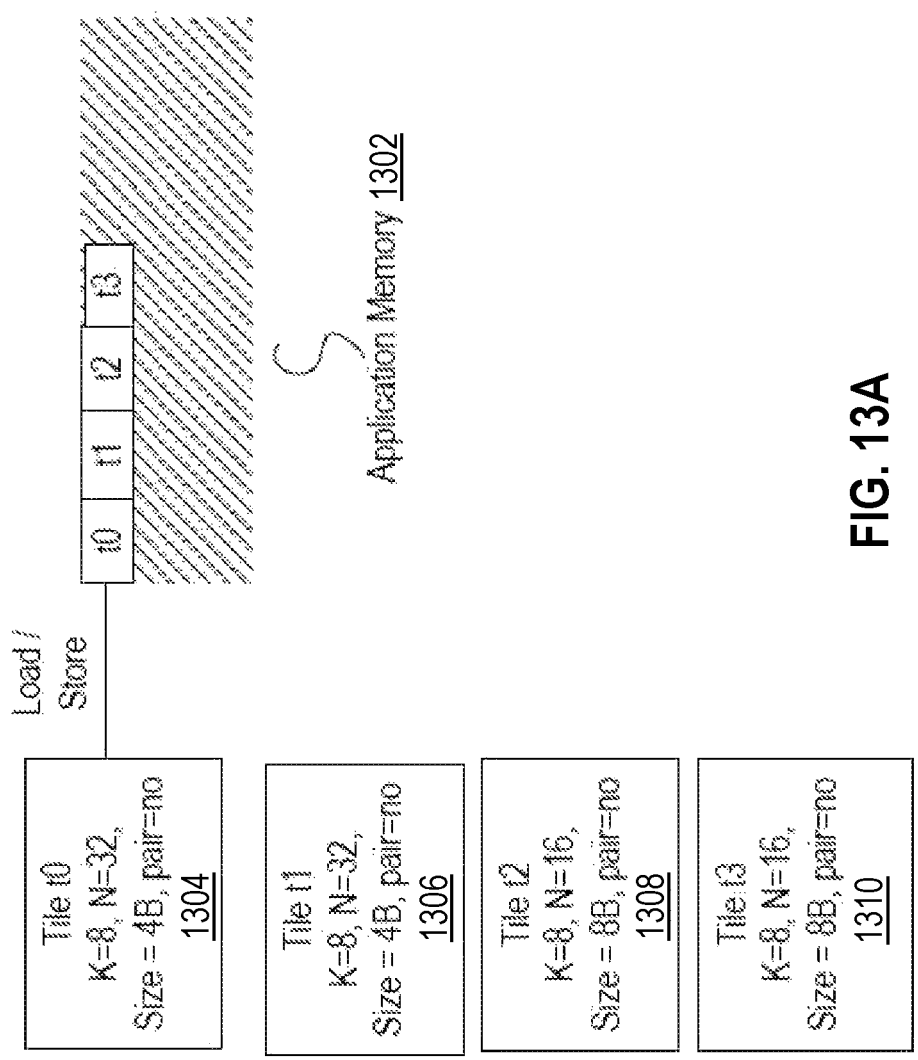
FIGS. 13A-B illustrate embodiments of configured tiles and associated registers/storage.

FIG. 13A illustrates an embodiment of configured tiles. As shown, there are four tiles 1304, 1306, 1308, and 1310 that are loaded from application memory 1302. In this example, tiles T0 1304 and T1 1306 have K rows and N columns with 4 element bytes (e.g., single precision data). Tiles T2 1308 and T3 1310 have M rows and N/2 columns with 8 element bytes (e.g., double precision data). As the double precision operands are twice the width of single precision, this configuration is consistent with a palette, used to provide tile options, supplying at least 4 names with total storage of 16*N*M bytes. Depending upon the instruction encoding scheme used, the number of tiles available varies.

In some embodiments, tile parameters are definable. For example, a "palette" is used to provide tile options. Exemplary options include, but are not limited to: the number of tile names, the number of bytes in a row of storage, the number of rows and columns in a tile, etc. For example, a maximum "height" (number of rows) of a tile may be defined as: Tile Max Rows=Architected Storage/(The Number of Palette Names*The Number of Bytes per row)

As such, an application can be written such that a fixed usage of names will be able to take advantage of different storage sizes across implementations.

Configuration of tiles is done using a tile configuration instruction ("TILECONFIG"), where a particular tile usage is defined in a selected palette. This declaration includes the number of tile names to be used, the requested number of rows and columns per name (tile), and, in some embodiments, the requested datatype of each tile. In some embodiments, consistency checks are performed during the execution of a TILECONFIG instruction to determine that it matches the restrictions of the palette entry.

Figure 13B:
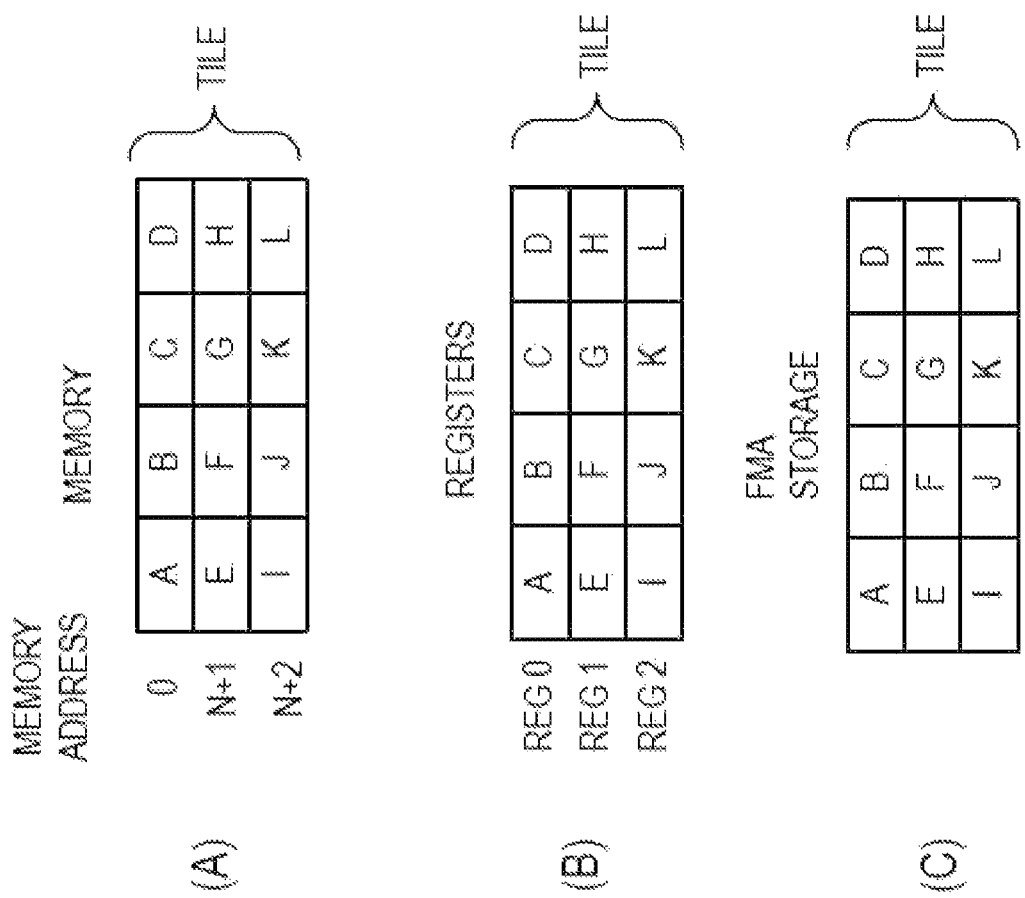

FIG. 13B illustrates several examples of matrix storage. In (A), a tile is stored in memory. As shown, each "row" consists of four packed data elements. To get to the next "row," a stride value is used. Note that rows may be consecutively stored in memory. Strided memory accesses allows for access of one row to then next when the tile storage does not map the underlying memory array row width.

Tile loads from memory and stores to memory are typically strided accesses from the application memory to packed rows of data. Exemplary TILELOAD and TILESTORE instructions, or other instruction references to application memory as a TILE operand in load-op instructions, are, in some embodiments, restartable to handle (up to) 2*rows of page faults, unmasked floating point exceptions, and/or interrupts per instruction.

In (B), a matrix is stored in a tile comprised of a plurality of registers such as packed data registers (single instruction, multiple data (SIMD) or vector registers). In this example, the tile is overlaid on three physical registers. Typically, consecutive registers are used, however, this need not be the case.

In (C), a matrix is stored in a tile in non-register storage accessible to a fused multiple accumulate (FMA) circuit used in tile operations. This storage may be inside of a FMA, or adjacent to it. Additionally, in some embodiments, discussed below, the storage may be for a data element and not an entire row or tile.

The supported parameters for the TMMA architecture are reported via CPUID. In some embodiments, the list of information includes a maximum height and a maximum SIMD dimension. Configuring the TMMA architecture requires specifying the dimensions for each tile, the element size for each tile and the palette identifier. This configuration is done by executing the TILECONFIG instruction.

Successful execution of a TILECONFIG instruction enables subsequent TILE operators. A TILERELEASEALL instruction clears the tile configuration and disables the TILE operations (until the next TILECONFIG instructions executes). In some embodiments, XSAVE, XSTORE, etc. are used in context switching using tiles. In some embodiments, 2 XCRO bits are used in XSAVE, one for TILE-CONFIF metadata and one bit corresponding to actual tile payload data.

TILECONFIG not only configures the tile usage, but also sets a state variable indicating that the program is in a region of code with tiles configured. An implementation may enumerate restrictions on other instructions that can be used with a tile region such as no usage of an existing register set, etc.

Exiting a tile region is typically done with the TILERELEASEALL instruction. It takes no parameters and swiftly invalidates all tiles (indicating that the data no longer needs any saving or restoring) and clears the internal state corresponding to being in a tile region.

In some embodiments, tile operations will zero any rows and any columns beyond the dimensions specified by the tile configuration. For example, tile operations will zero the data beyond the configured number of columns (factoring in the size of the elements) as each row is written. For example, with 64-byte rows and a tile configured with 10 rows and 12 columns, an operation writing FP32 elements would write each of the first 10 rows with 12*4 bytes with output/result data and zero the remaining 4*4 bytes in each row. Tile operations also fully zero any rows after the first 10 configured rows. When using 1K tile with 64-byte rows, there would be 16 rows, so in this example, the last 6 rows would also be zeroed.

In some embodiments, a context restore (e.g., XRSTOR), when loading data, enforces that the data beyond the configured rows for a tile will be maintained as zero. If there is no valid configuration, all rows are zeroed. XRSTOR of tile data can load garbage in the columns beyond those configured. It should not be possible for XRSTOR to clear beyond the number of columns configured because there is not an element width associated with the tile configuration.

Context save (e.g., XSAVE) exposes the entire TILE storage area when writing it to memory. If XRSTOR loaded garbage data in to the rightmost part of a tile, that data will be saved by XSAVE. XSAVE will write zeros for rows beyond the number specified for each tile.

In some embodiments, tile instructions are restartable. The operations that access memory allow restart after page faults. The computational instructions that deal with floating point operations also allow for unmasked floating-point exceptions, with the masking of the exceptions controlled by a control and/or status register.

To support restarting instructions after these events, the instructions store information in the start registers detailed below.

Figure 14:
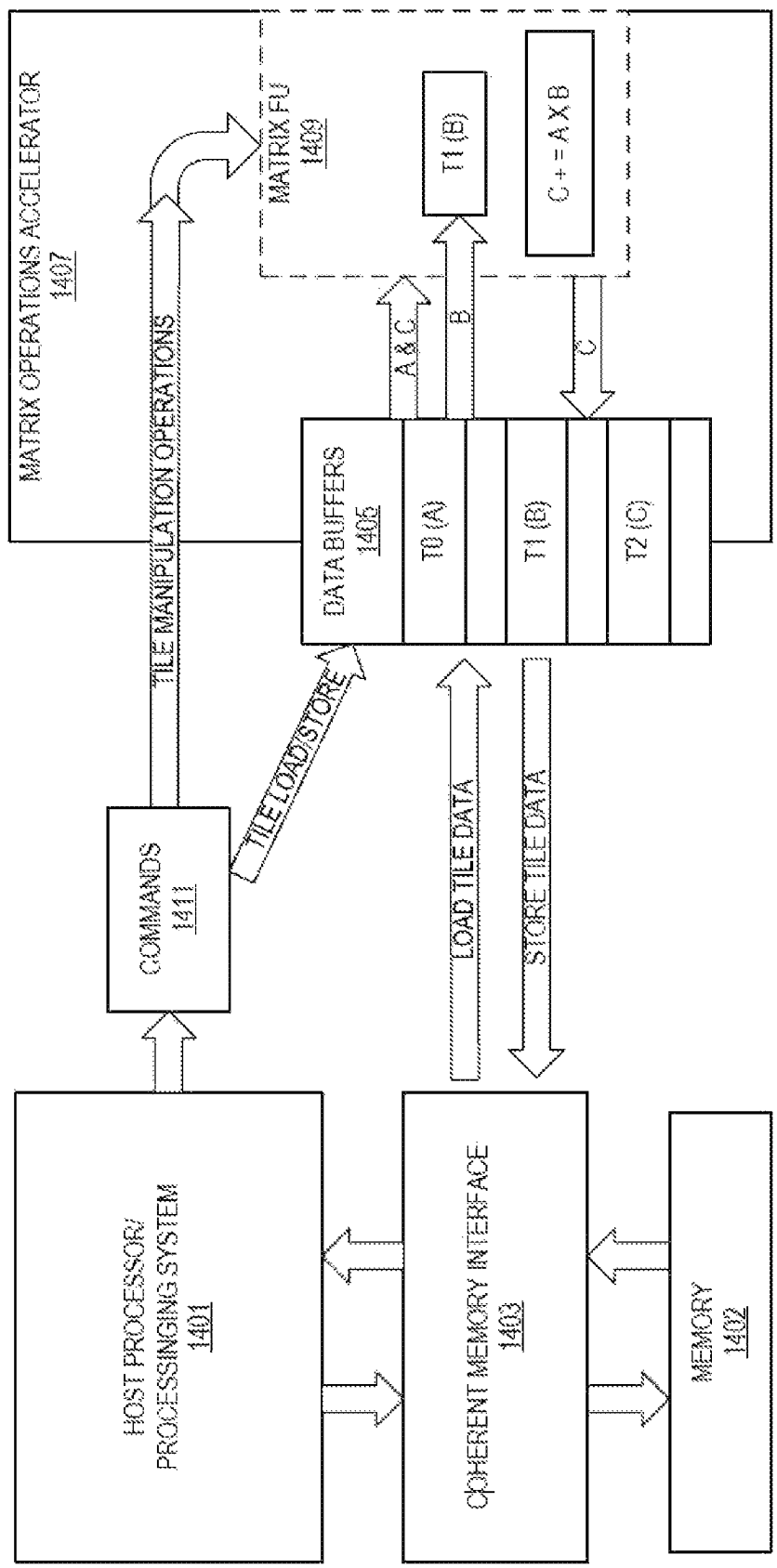
FIG. 14 illustrates an embodiment of a system utilizing a matrix operations accelerator.

FIG. 14 illustrates an embodiment of a system utilizing a matrix (tile) operations accelerator. In this illustration, a host processor/processing system 1401 communicates commands 1411 (e.g., matrix manipulation operations such as arithmetic or matrix manipulation operations, or load and store operations) to a matrix operations accelerator 1407. However, this is shown this way for discussion purposes only. As detailed later, this accelerator 1407 may be a part of a processing core. Typically, commands 1411 that are tile manipulation operator instructions will refer to tiles as register-register ("reg-reg") or register-memory ("reg-mem") format. Other commands such as TILESTORE, TILELOAD, TILECONFIG, etc., do not perform data operations on a tile. Commands may be decoded instructions (e.g., micro-ops) or macro-instructions for the accelerator 1407 to handle.

In this example, a coherent memory interface 1403 is coupled to the host processor/processing system 1401 and matrix operations accelerator 1407 such that they can share memory.

Figure 16:
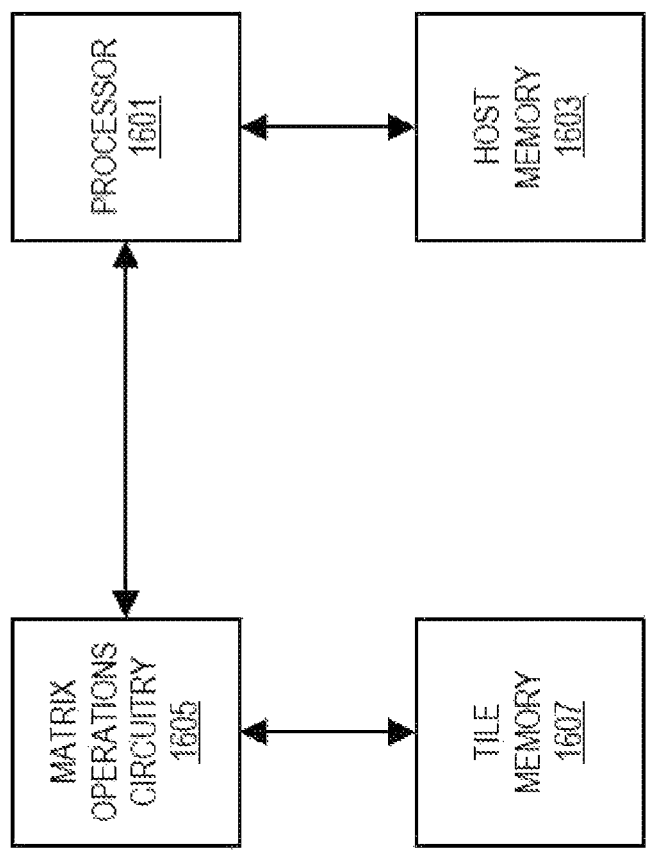
FIGS. 15 and 16 show different embodiments of how memory is shared using a matrix operations accelerator.
Figure 15:
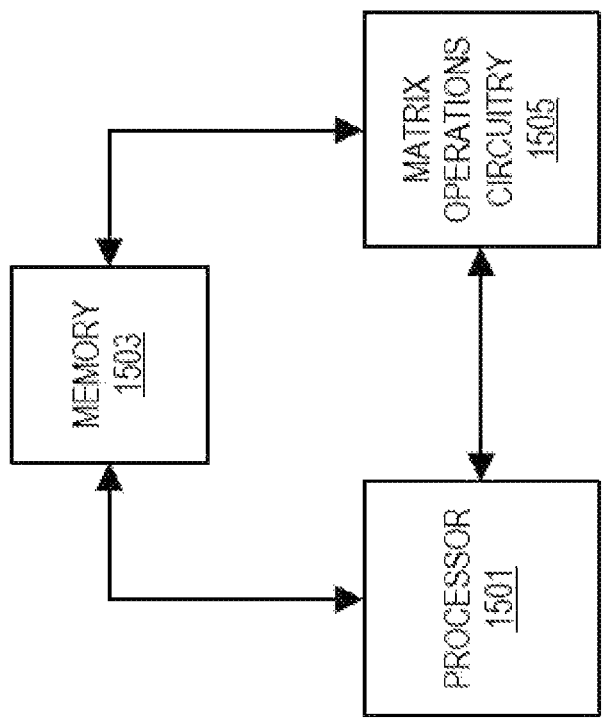

FIGS. 15 and 16 show different embodiments of how memory is shared using a matrix operations accelerator. As shown in FIG. 15, the host processor 1501 and matrix operations accelerator circuitry 1505 share the same memory 1503. FIG. 16 illustrates an embodiment where the host processor 1601 and matrix operations accelerator 1605 do not share memory, but can access each other's memory. For example, processor 1601 can access tile memory 1607 and utilize its host memory 1603 as normal. Similarly, the matrix operations accelerator 1605 can access host memory 1603, but more typically uses its own memory 1607. Note these memories may be of different types.

The matrix operations accelerator 1407 includes a plurality of FMAs 1409 coupled to data buffers 1405 (in some implementations, one or more of these buffers 1405 are stored in the FMAs of the grid as shown). The data buffers 1405 buffer tiles loaded from memory and/or tiles to be stored to memory (e.g., using a tileload or tilestore instruction). Data buffers may be, for example, a plurality of registers. Typically, these FMAs are arranged as a grid of chained FMAs 1409 which are able to read and write tiles. In this example, the matrix operations accelerator 1407 is to perform a matrix multiply operation using tiles T0, T1, and T2. At least one of tiles is housed in the FMA grid 1409. In some embodiments, all tiles in an operation are stored in the FMA grid 1409. In other embodiments, only a subset are stored in the FMA grid 1409. As shown, T1 is housed and T0 and T2 are not. Note that A, B, and C refer to the matrices of these tiles which may or may not take up the entire space of the tile.

Figure 17:
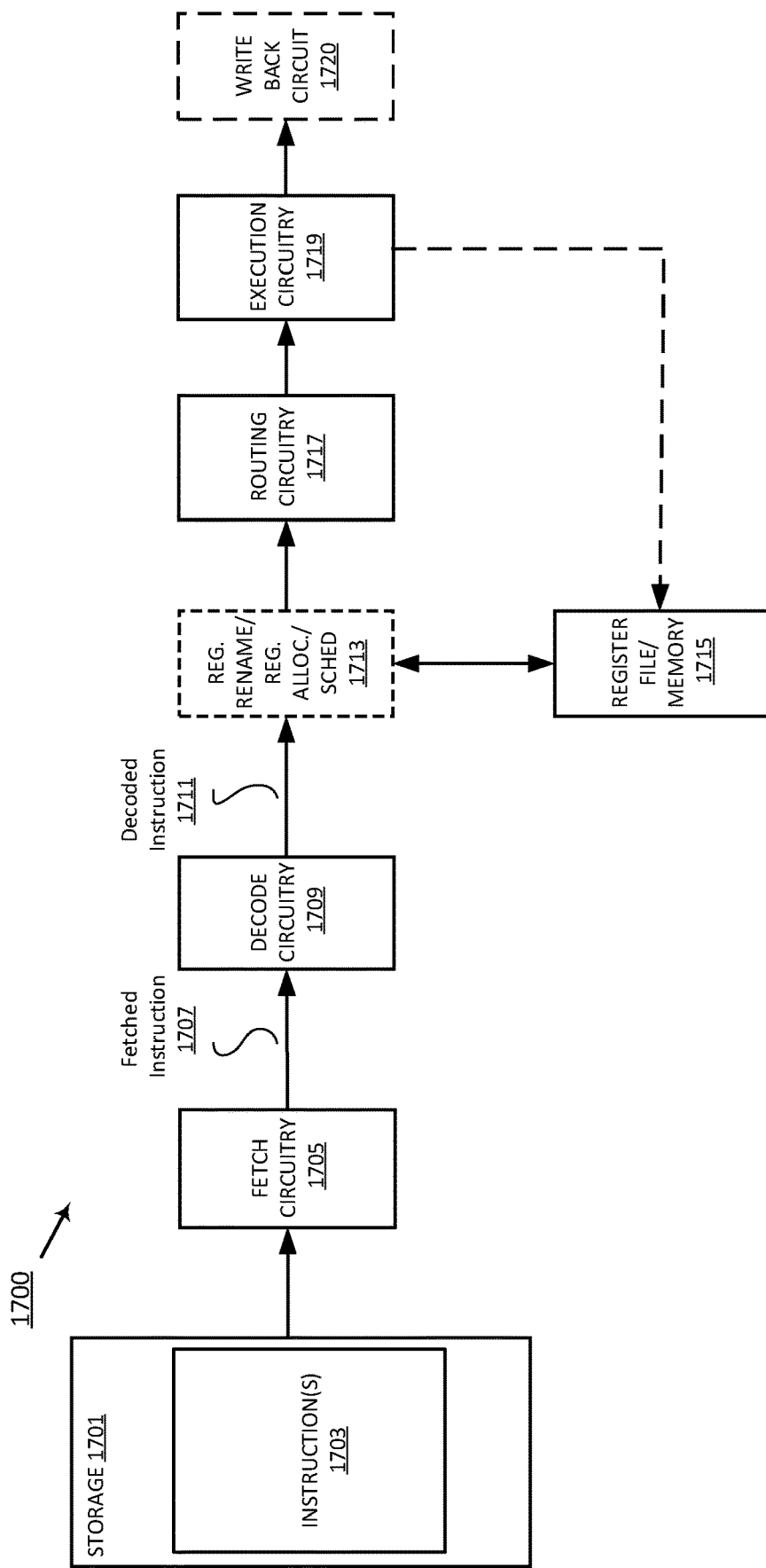
FIG. 17 illustrates an example pipeline for executing a matrix multiplication operation.

FIG. 17 is a block diagram illustrating processing components for executing variable-format, matrix multiplication instruction(s) 1703, according to some embodiments. As illustrated, storage 1701 stores instruction(s) 1703 to be executed. As described further below, in some embodiments, computing system 1700 is a single instruction, multiple data (SIMD) processor to concurrently process multiple data elements based on a single instruction.

In operation, the instruction 1703 is to be fetched from storage 1701 by fetch circuitry 1705. The fetched instruction 1707 is to be decoded by decode circuitry 1709. The instruction format, which is further illustrated and described herein, has fields (not shown here) to specify an opcode, and destination, multiplier, multiplicand, and summand complex vectors. Decode circuitry 1709 decodes the fetched instruction 1707 into one or more operations. In some embodiments, this decoding includes generating a plurality of micro-operations to be performed by execution circuitry (such as execution circuitry 1719) in conjunction with routing circuitry 1718. The decode circuitry 1709 also decodes instruction suffixes and prefixes (if used). Execution circuitry 1719, operating in conjunction with routing circuitry 1717 executes the decoded instruction.

In some embodiments, register renaming, register allocation, and/or scheduling circuit 1713 provides functionality for one or more of: 1) renaming logical operand values to physical operand values (e.g., a register alias table in some embodiments), 2) allocating status bits and flags to the decoded instruction, and 3) scheduling the decoded VFVSMM instruction 1711 for execution on execution circuitry 1719 out of an instruction pool (e.g., using a reservation station in some embodiments).

Registers (register file) and/or memory 1715 store data as operands of decoded VFVSMM instruction 1711 to be operated on by execution circuitry 1719. Exemplary register types include writemask registers, packed data registers, general purpose registers, and floating point registers, as further described herein. In some embodiments, write back circuit 1720 commits the result of the execution of the decoded instruction 1711.

Figure 18:
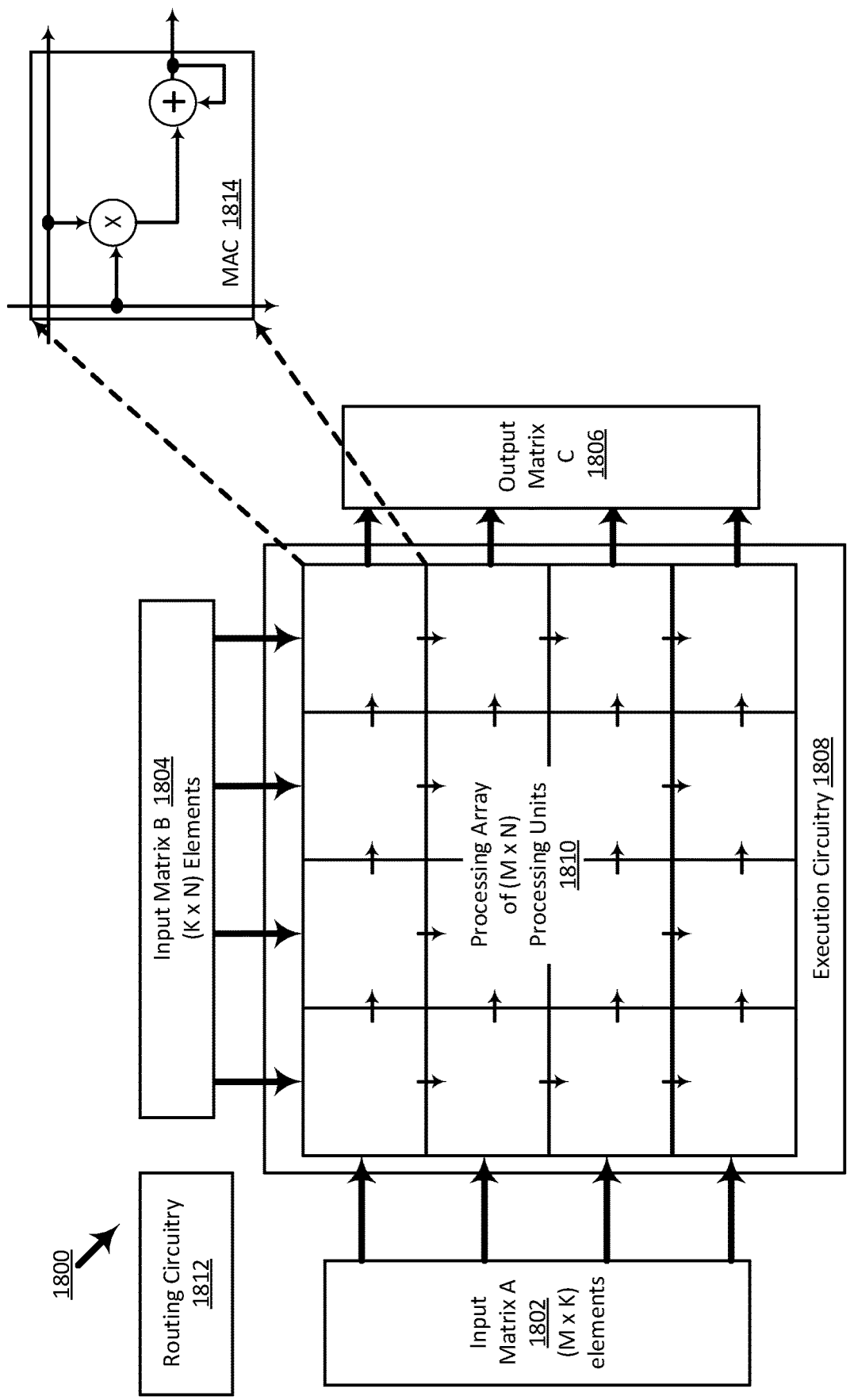
FIG. 18 illustrates execution circuitry including a processing array.

FIG. 18 is a block diagram of a processing array 1810 to execute a matrix multiply instruction (or sequence of instructions) to perform parallel multiply accumulate operations to multiply a first matrix 1802 (Matrix A with M×K elements) by a second matrix 1804 (Matrix B with K×N elements) to generate an output matrix (Matrix C). In one embodiment, the matrix multiplication instruction is a variable-sparsity matrix multiplication (VFVSMM) instruction, which performs dense-dense, sparse-dense, and sparse-sparse matrix multiplications. However, the underlying principles of the invention are not limited to any specific matrix types.

In one embodiment, the processing array 1810 includes (M×N) processing units 1814 each of which multiplies one or more data elements from the first matrix 1802 and one or more data elements from the second matrix 1804, and accumulates the resulting products (e.g., adding the products and an accumulated value). In some embodiments, each of the processing units in the processing array 1810 is a multiply-accumulate circuit, one example of which is shown as MAC 1814. While the illustrated MAC 1814 shows a single multiplier, each MAC 1814 may include a plurality of parallel multipliers to perform parallel multiplications. In one embodiment, the number of parallel multiplications is based on the size of the input operands. For example, each MAC unit 1814 may be capable of performing one 16-bit integer multiplication, two 8-bit integer multiplications, or four 4-bit integer multiplications, all of which may be accumulated to a 32-bit integer value. Similarly, each MAC unit 1814 may be capable of multiplying one 32-bit floating point, two 16-bit floating point values (e.g., FP16 or Bfloat16), and accumulating the result into 32-bit or 64-bit floating point value.

In some embodiments, for example when processing 8-bit integer data, execution circuitry throughput is quadrupled by configuring each processing unit to perform a 2×2 matrix multiplication.

As described herein, a processing unit is sometimes referred to as a processing element and is sometimes referred to as a processing circuit and may sometimes be referred to as a processing node. Regardless of the wording, the processing unit is intended to comprise circuitry to perform data path computations and provide control logic.

Complex Matrix Processing Embodiments

One embodiment of the invention includes dedicated tile matrix multiplication hardware logic to perform matrix multiplication with complex data types. For example, different embodiments may include dedicated tensor cores to perform the complex matrix multiplication operations herein. Alternatively, or in addition, the execution circuitry of an existing core is modified with matrix processing circuitry to perform the matrix multiplications described herein. Different example implementations are described below with respect to FIGS. 22A-C.

One embodiment of the invention includes two instructions to perform complex matrix multiplication of two tile sources (e.g., Matrices A and B in the examples below). In this implementation, one instruction calculates the real part of the result and another instruction calculates the imaginary part. Another pair of instructions first transposes one of the two matrices (e.g., Matrix A in examples below) prior performing the complex matrix multiplication. The first instructions determines the real part of the result and the second instruction determines the imaginary part. Another instruction performs complex matrix conjugation using one or multiple source matrix values and another instruction performs a complex matrix conjugate and multiplication of two tile/matrix sources.

While some implementations described below include a first instruction for determining a real part and a second instruction for determining an imaginary part, one embodiment includes a single instruction compute both the real and imaginary parts of the matrix operations. In one implementation, an instruction field (e.g., an immediate) of the single instruction may indicate the type of operation being performed (e.g., real or imaginary). Upon decoding the instruction, a different sequence of microoperations are generated based on the instruction field.

Figure 19:
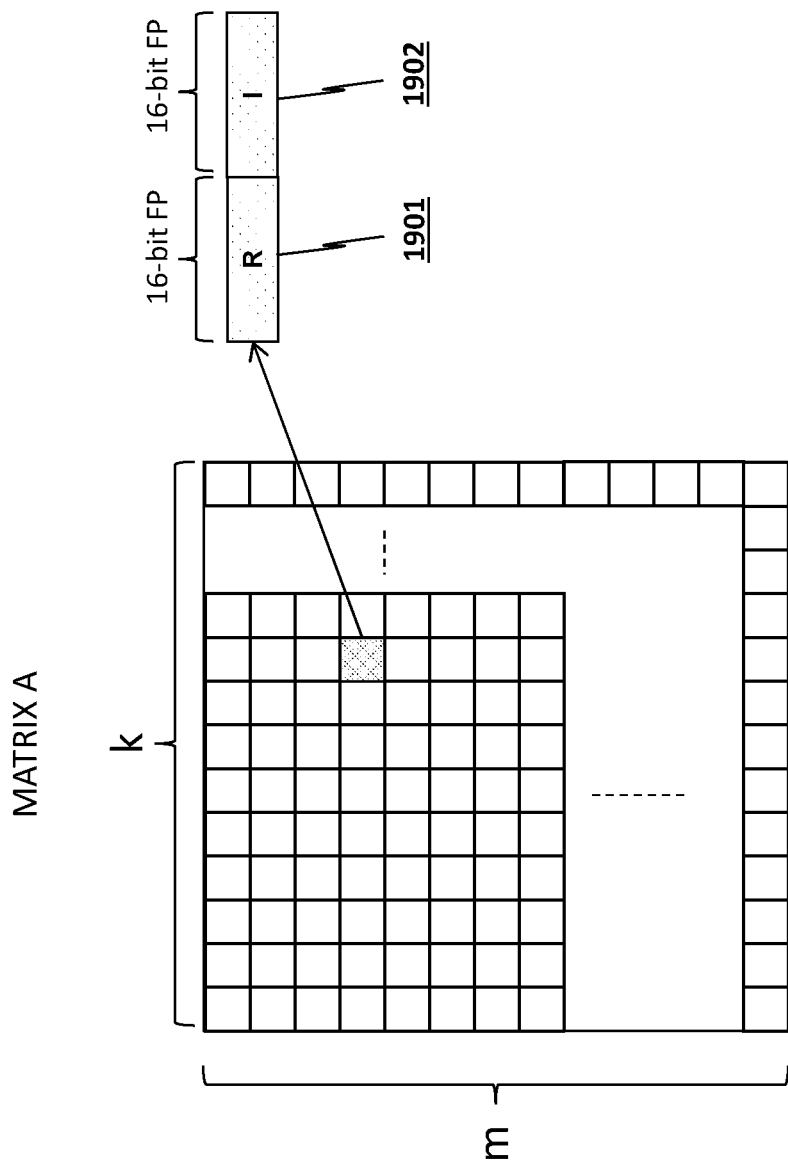
FIG. 19 illustrates an example of a matrix containing complex values.

In one embodiment, the tile/matrix sources contain complex numbers in the format of 16-bit floating point (FP16) pairs of real and imaginary parts: each element in the source tile is 32-bit wide complex number where the lower 16 bits represent the real part in FP16 format and the higher 16 bits represent the imaginary part in FP16 format. FIG. 19 illustrates an example matrix—Matrix A—with m rows and k columns of complex data elements, where each data element includes a FP16 real component 1901 and a FP16 imaginary component 1902.

In one embodiment, the result matrix C may include 32-bit real values (Matrix $C_R$) or 32-bit imaginary values (Matrix $C_I$), depending on the instruction being executed. In other embodiments, the real and imaginary values may be combined into a single result matrix (Matrix C).

While certain specific data element sizes are described herein, It should be noted that the underlying principles of the invention may be implemented using various other data types for the source/result real and imaginary values including, but not limited to, 8-bit integer, 16-bit integer, 32-bit integer, Bfloat16, TensorFloat (TF)-32, 32-bit floating-point, and 64-bit floating point (FP), to name a few.

A. Apparatus and Method for Complex Matrix Multiplication

One embodiment of the matrix multiply instruction accumulates the 16FP*16FP products into a FP32 value. However, other accumulation values may be used including any of the data types listed above as well as larger data types (e.g., 128-bit, 256-bit, etc).

Figure 20A:
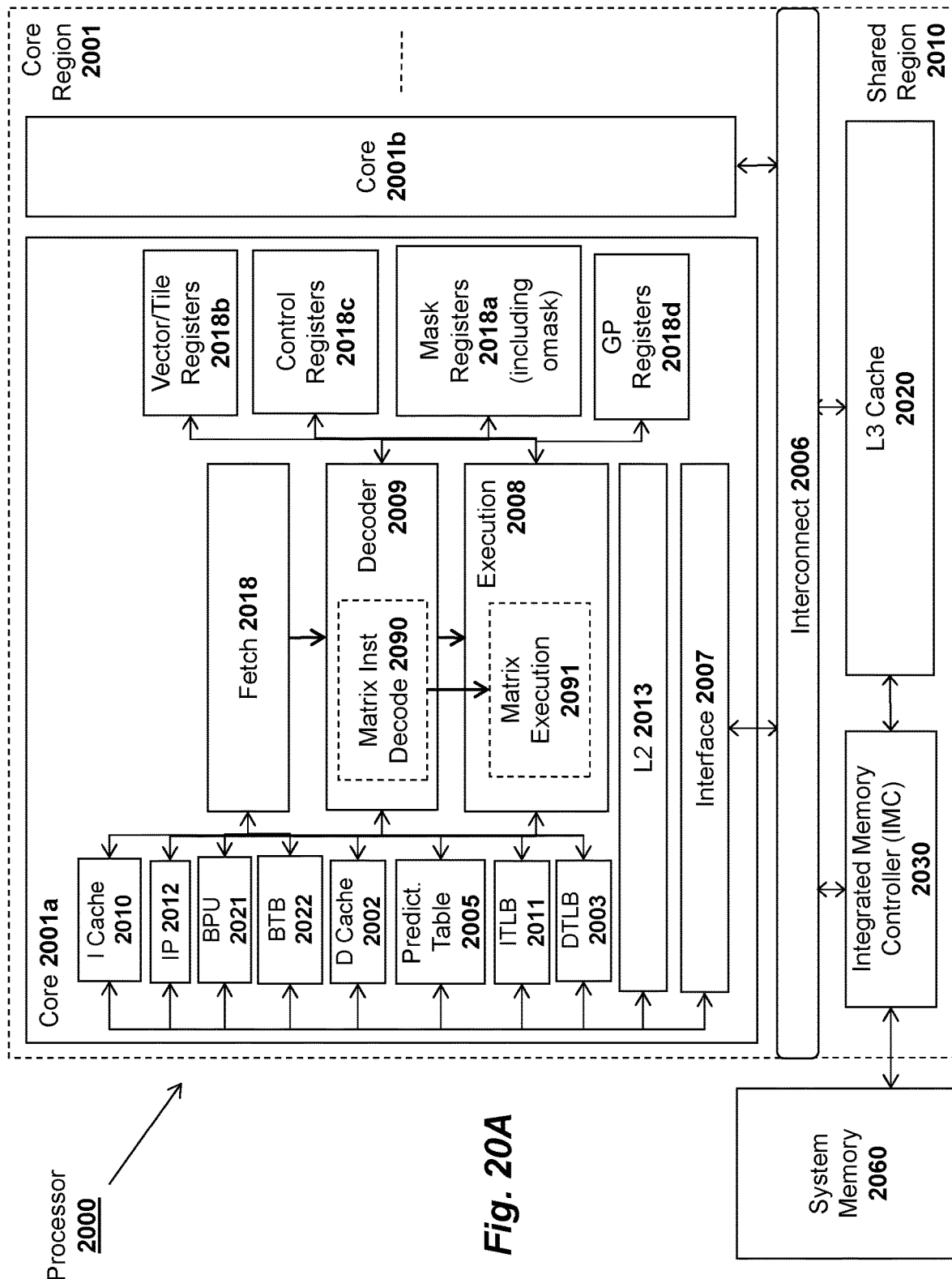
FIGS. 20A-C illustrate different implementations of matrix processing circuitry.
Figure 20B:
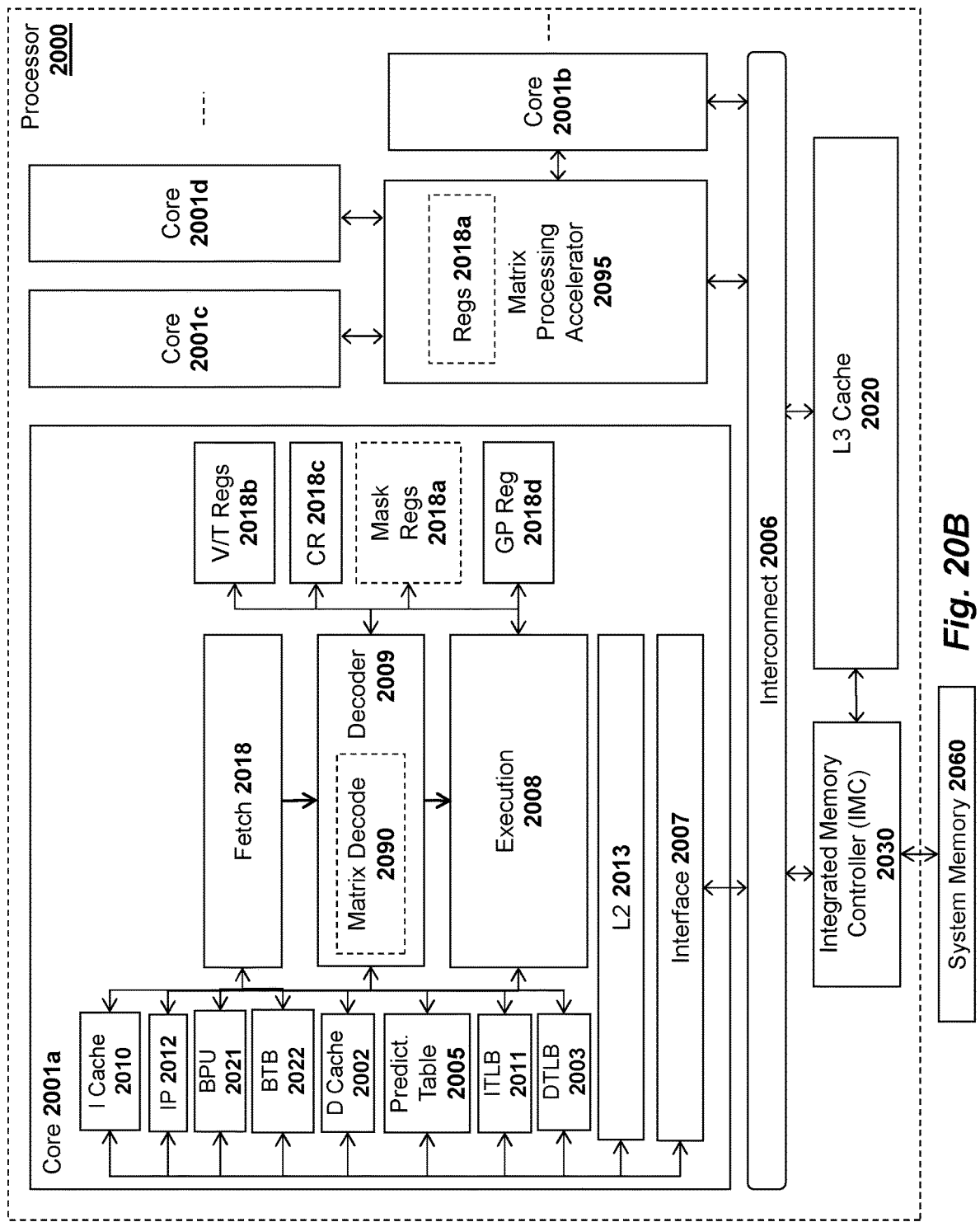
Figure 20C:
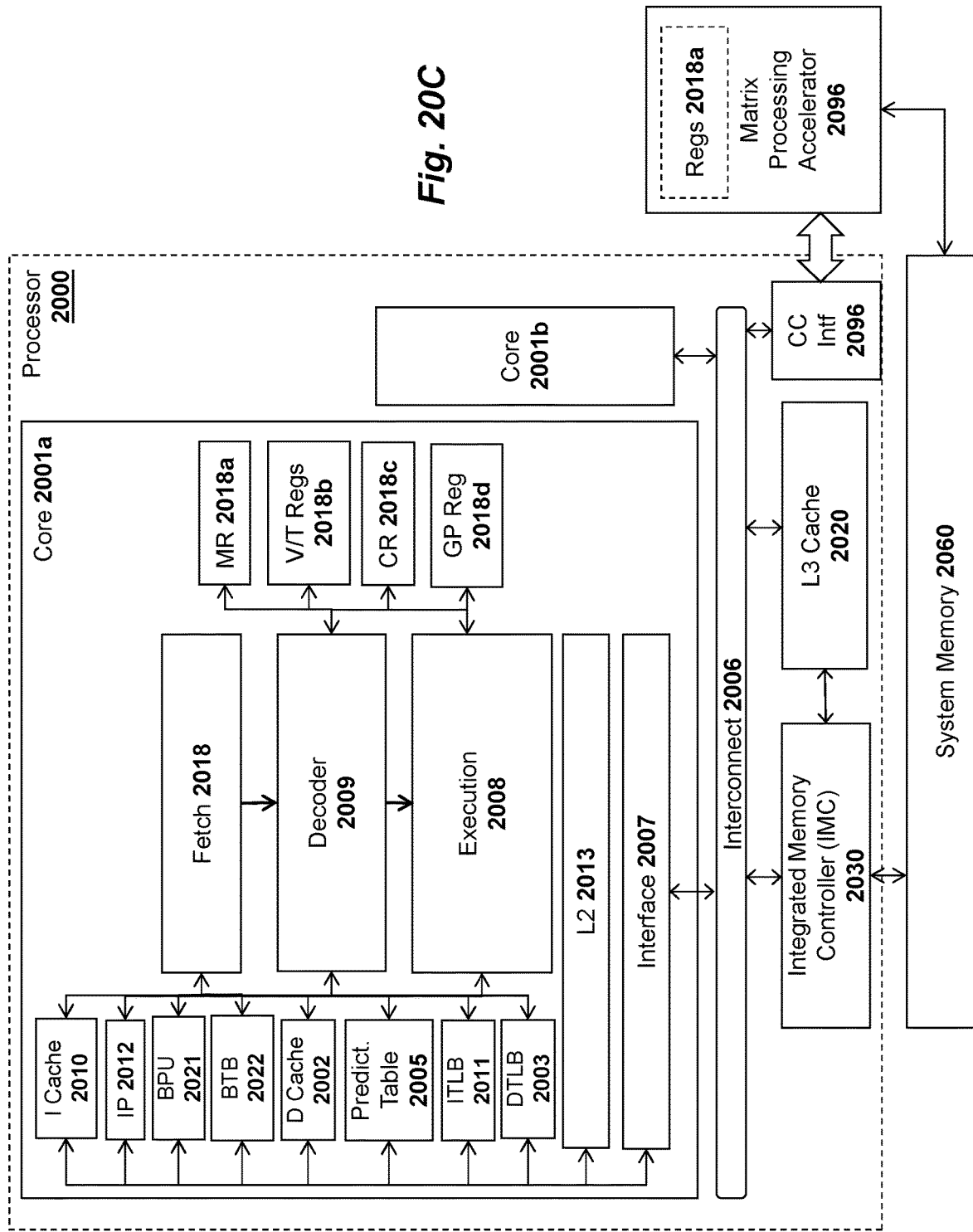

FIGS. 20A-C illustrate different architectures in which the embodiments described herein may be implemented. In FIG. 20A, matrix decode circuitry 2090 within each core 2001a decodes the matrix multiply instruction and matrix execution circuitry 2091 executes the matrix multiply instruction (e.g., as described in greater detail below with respect to FIG. 21). In this embodiment, the matrix processing circuitry 2090-2091 is integral to the pipeline of each core 2001a. Alternatively, in FIG. 20B, a matrix processing accelerator 2095 is on the same chip and shared by a plurality of cores 2001*a-d*. In FIG. 20C, the matrix processing accelerator 2096 is on a different chip (but potentially in the same package) as the cores 2001*a-b*. In each implementation, the underlying principles of the invention operate as described herein.

Turning first to FIG. 20A, the illustrated architectures include a core region 2001 and a shared, or "uncore" region 2010. The shared region 2010 includes data structures and circuitry shared by all or a subset of the cores 2001*a-b*. In the illustrated embodiment, the plurality of cores 2001*a-b* are simultaneous multithreaded cores capable of concurrently executing multiple instruction streams or threads. Although only two cores 2001*a-b* are illustrated in FIG. 20A for simplicity, it will be appreciated that the core region 2001 may include any number of cores, each of which may include the same architecture as shown for core 2001*a*. Another embodiment includes heterogeneous cores which may have different instruction set architectures and/or different power and performance characteristics (e.g., low power cores combined with high power/performance cores).

The various components illustrated in FIG. 20A may be implemented in the same manner as corresponding components described above. For example, the core 2001 a may execute the matrix multiply instructions using one of the instruction formats and register architectures described herein. In addition, the cores 2001 a may include the components of core 390 shown in FIG. 3B, and may include any of the other processor/core components described herein (e.g., FIGS. 2, 4, etc).

Each of the cores 2001*a-b* includes instruction pipeline components for performing simultaneous execution of instruction streams including instruction fetch circuitry 2018 which fetches instructions from system memory 2060 or the L1 instruction cache 2010 and decoder 2009 to decode the instructions. Execution circuitry 2008 executes the decoded instructions to perform the underlying operations, as specified by the instruction operands, opcodes, and any immediate values.

In the illustrated embodiment, the decoder 2009 includes matrix decode circuitry 2090 to decode certain instructions into cops for execution by the matrix execution circuitry 2091 (integrated within the execution circuitry 2008 in this embodiment). Although illustrated as separate blocks in FIG. 20A, the matrix decode circuitry 2090 and matrix execution circuitry 2091 may be distributed as functional circuits spread throughout the decoder 2009 and execution circuitry 2008 (e.g., multipliers, multiplexers, etc).

In the embodiment illustrated in FIG. 20B the matrix processing accelerator 2095 is tightly coupled to the processor cores 2001*a-b* over a cache coherent interconnect 2006. The matrix processing accelerator 2095 of this embodiment is configured as a peer of the cores, participating in the same set of cache coherent memory transactions as the cores. As illustrated, the matrix processing accelerator 2095 may include its own set of registers 2018*a* (e.g., tile registers, vector registers, mask registers, etc) to perform the operations described herein. In this embodiment, the decoder 2009 decodes the instructions which are to be executed by the matrix processing accelerator 2095 and the resulting microoperations are passed for execution to the matrix processing accelerator 2095 over the interconnect 2006. In another embodiment, the matrix processing accelerator 2095 includes its own fetch and decode circuitry to fetch and decode instructions, respectively, from a particular region of system memory 2060. In either implementation, after executing the instructions, the matrix accelerator 2091 may store the results to the region in system memory 2060 (which may be accessed by the cores 2001*a-b*).

FIG. 20C illustrates another embodiment in which the matrix processing accelerator 2096 is on a different chip from the cores 2001*a-b* but coupled to the cores over a cache coherent interface 2096. In one embodiment, the cache coherent interface 2096 uses packet-based transactions to ensure that data accessed/cached by the matrix processing accelerator 2096 is kept coherent with the cache hierarchy of the cores 2001*a-c*.

Also illustrated in FIGS. 20A-C are general purpose registers (GPRs) 2018*d*, a set of vector/tile registers 2018*b*, a set of mask registers 2018*a* (which may include tile mask registers as described below), and a set of control registers 2018*c*. In one embodiment, multiple vector data elements are packed into each vector register which may have a 512-bit width for storing two 256-bit values, four 128-bit values, eight 64-bit values, sixteen 32-bit values, etc. Groups of vector registers may be combined to form the tile registers described herein. Alternatively, a separate set of 2-D tile/tensor registers may be used. However, the underlying principles of the invention are not limited to any particular size/type of vector/tile data. In one embodiment, the mask registers 2018*a* include eight 64-bit operand mask registers used for performing bit masking operations on the values stored in the vector registers 2006 (e.g., implemented as mask registers k0-k7 described above). However, the underlying principles of the invention are not limited to any particular mask register size/type.

The control registers 2018*c* store various types of control bits or "flags" which are used by executing instructions to determine the current state of the processor core 2001*a*. By way of example, and not limitation, in an x86 architecture, the control registers include the EFLAGS register.

An interconnect 2006 such as an in-die interconnect (IDI) or memory fabric implementing an IDI/coherence protocol communicatively couples the cores 2001*a-b* (and potentially the matrix accelerator 2095) to one another and to various components. For example, the interconnect 2006 couples core 2001*a* via interface 2007 to a level 3 (L3) cache 2020 and an integrated memory controller 2030. In addition, in some embodiments, the interconnect 2006 may be used to couple the cores 2001*a-b* to the matrix processing accelerator 2095.

The integrated memory controller 2030 provides access to a system memory 2060. One or more input/output (I/O) circuits (not shown) such as PCI express circuitry may also be included in the shared region 2010.

An instruction pointer register 2012 stores an instruction pointer address identifying the next instruction to be fetched, decoded, and executed. Instructions may be fetched or prefetched from system memory 2060 and/or one or more shared cache levels such as an L2 cache 2013, the shared L3 cache 2020, or the L1 instruction cache 2010. In addition, an L1 data cache 2002 stores data loaded from system memory 2060 and/or retrieved from one of the other cache levels 2013, 2020 which cache both instructions and data. An instruction TLB (ITLB) 2011 stores virtual address to physical address translations for the instructions fetched by the fetch circuitry 2018 and a data TLB (DTLB) 2003 stores virtual-to-physical address translations for the data processed by the decode circuitry 2009 and execution circuitry 2008.

A branch prediction unit 2021 speculatively predicts instruction branch addresses and branch target buffers (BTBs) 2022 for storing branch addresses and target addresses. In one embodiment, a branch history table (not shown) or other data structure is maintained and updated for each branch prediction/misprediction and is used by the branch prediction unit 2002 to make subsequent branch predictions.

Note that FIGS. 20A-C are not intended to provide an exhaustive view of all circuitry and interconnects employed within an example processor. Rather, various components which are not pertinent to the embodiments of the invention are not shown. Conversely, some components are shown merely for the purpose of providing an example architecture in which embodiments of the invention may be implemented, but are not necessarily required for complying with the underlying principles of the invention.

In an embodiment in which a first instruction is executed to determine the real component of the complex number, and a second instruction is executed to determine the imaginary component, the first instruction performs the operation: real(C)+=real(A)*real(B)−imag(A)*imag(B), for source Matrices A and B and destination Matrix $C_R$. In addition, a second instruction performs the operation: imag(C)+=real(A)*imag(B)+imag(A)*real(B) for source Matrices A and B and destination Matrix $C_I$.

Example pseudocode is provided below showing details of one embodiment to determine the real and imaginary components.

Example Pseudocode for Determining Real Components:

```
// C = m × n (tsrcdest), A = m × k (tsrc1), B = k × n (tsrc2)
# src1 and src2 elements are pairs of fp16
elements_src1 := tsrc1.colsb / 4
elements_src2 := tsrc2.colsb / 4
elements_dest := tsrcdest.colsb / 4
elements_temp := tsrcdest.colsb / 2 // Count is in fp16 prior to horizontal
for m in 0 . . . tsrcdest.rows-1:
    temp1[ 0 . . . elements_temp-1 ] := 0
    for k in 0 . . . elements_src1-1:
        for n in 0 . . . elements_dest-1:
            // For this operation:
            // DAZ16=0 (We are *not* forcing input FP16 denorms
                to 0).
            // FP32 FMA with DAZ=FTZ=1, RNE rounding.
            // MXCSR is neither consulted nor updated.
            // No exceptions raised or denoted.
            temp1.fp32[2*n+0] +=
                cvt_fp16_to_fp32(tsrc1.row [m].fp16[2*k+0]) *
                cvt_fp16_to_fp32(tsrc2.row [k].fp16 (2*n+0])
            temp1.fp32[2 n+1] +=
                cvt_fp16_to_fp32(tsrc1.row [m] .fp16[2*k+1]) *
                cvt_fp16_to_fp32(tsrc2.row [k] .fp16 [2*n+1])
        for n in 0 . . . elements_dest-1:
            // DAZ-FTZ=1, RNE rounding.
            // MXCSR is neither consulted nor updated.
            // No exceptions raised or denoted.
            tmpf32 := temp1.fp32[2*n] − temp1.fp32 [2*n+1]
            srcdest.row[m] .fp32[n] := srcdest.row[m] .fp32[n] + tmpf32
    write_row_and_zero(tsrcdest, m, tmp, tsrcdest.colsb)
zero_upper_rows(tsrcdest, tsrcdest.rows)
zero_tileconfig_start( )
```

Example Pseudocode for Determining Imag Components:

```
// C = m × n (tsrcdest), A = m × k (tsrc1), B = k × n (tsrc2)
# src1 and src2 elements are pairs of fp16
elements_src1 := tsrc1.colsb / 4
elements_src2 := tsrc2.colsb / 4
elements_dest := tsrcdest.colsb / 4
elements_temp := tsrcdest.colsb / 2 // Count is in fp16 prior to horizontal
for m in 0 . . . tsrcdest.rows-1:
    temp1[ 0 . . . elements_temp-1 ] := 0
    for k in 0 . . . elements_src1-1:
        for n in 0 . . . elements_dest-1:
            // For this operation:
            // DAZ16=0 (We are *not* forcing input FP16 denorms
                to 0).
            // FP32 FMA with DAZ=FTZ=1, RNE rounding.
            // MXCSR is neither consulted nor updated.
            // No exceptions raised or denoted.
            temp1.fp32[2*n+0] +=
                cvt_fp16_to_fp32(tsrc1.row[m].fp16[2*k+0]) *
                cvt_fp16_to_fp32(tsrc2.row[k].fp16 (2*n+1])
            temp1.fp32[2 n+1] +=
                cvt_fp16_to_fp32(tsrc1.row[m] .fp16[2*k+1]) *
                cvt_fp16_to_fp32(tsrc2.row[k] .fp16 [2*n+0])
        for n in 0 . . . elements_dest-1:
            // DAZ-FTZ=1, RNE rounding.
            // MXCSR is neither consulted nor updated.
            // No exceptions raised or denoted.
            tmpf32 := temp1.fp32[2*n] + temp1.fp32 [2*n+1]
            srcdest.row[m] .fp32[n] := srcdest.row[m] .fp32[n] + tmpf32
    write_row_and_zero(tsrcdest, m, tmp, tsrcdest.colsb)
zero_upper_rows(tsrcdest, tsrcdest.rows)
zero_tileconfig_start( )
```

In the embodiment specified in the above pseudocode, embodiment, real and imaginary data elements from specified rows are multiplied to generate products (i.e., real product in the first pseudocode sequence and imaginary products in the second pseudocode sequence). The products are then accumulated to generate the real components and imaginary components stored in real result matrix $C_R$ and imaginary result matrix $C_I$ Alternatively, a single result Matrix C may be genberated to store both the real and imaginary components. In the pseudocode, row[m] is traversed for the first source matrix with each selected value being multiplied by a value from row[k] of the second source matrix. Note, however, that this manner of identifying corresponding elements to multiply is not required for complying with the underlying principles of the invention.

Figure 21:
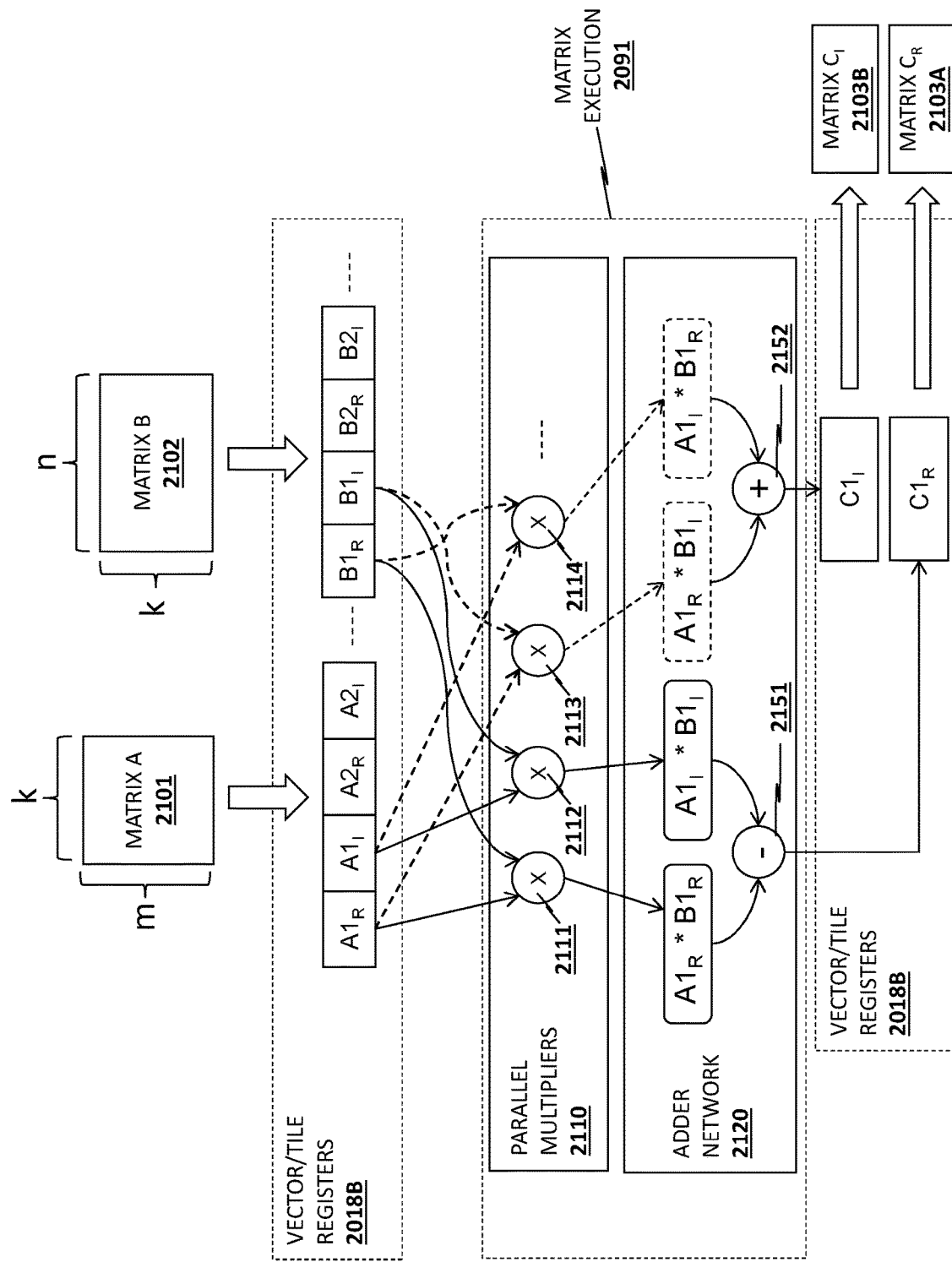
FIG. 21 illustrates an architecture for executing complex matrix multiplication instructions.

As illustrated in FIG. 21, one embodiment of the matrix execution circuitry 2091 comprises parallel multiplication circuitry 2110 (e.g., a plurality of parallel multipliers) and adder circuitry 2020 to perform parallel multiplications and additions/subtractions using complex data elements from source matrix A 2101 and source matrix B 2102 to generate the complex data elements of real result matrix $C_R$ 2103A and imaginary result matrix $C_I$ 2103B. Only a small portion of the complex data elements from Matrix A 2101 and Matrix B 2102 are shown for the purpose of illustration. It should be noted, however, that the operations performed on these complex data elements may be performed in parallel on other complex data elements from each respective matrix. Moreover, although not illustrated, a single result matrix C may be generated with both the real and imaginary components (e.g., with 32-bit or 64-bit complex data elements).

The illustrated operation involves complex data element A1 comprising real component $A1_R$ and imaginary component $A1_I$ and complex data element B1 comprising real component $B1_R$ and imaginary component $B1_I$. A first multiplier 2111 multiplies the real component of A1 and the real component of B1 (i.e., $A1_R*B1_R$) while a second multiplier 2112 multiplies the imaginary component of A1 and the imaginary component of B1 (i.e., $A1_I*B1_I$) to generate first and second real products $A1_R*B1_R$ and $A1_I*B1_I$, respectively. Similarly, a third multiplier 2113 multiplies the real component of A1 and the imaginary component of B1 (i.e., $A1_R*B1_I$) while a fourth multiplier 2114 multiplies the imaginary component of A1 and the real component of B1 (i.e., $A1_I*B1_R$) to generate first and second imaginary products $A1_R*B1_I$ and $A1_I*B1_R$, respectively.

A first addition/subtraction unit 2151 of adder circuitry 2120 subtracts the second real product $A1_I*B1_I$ from the first real product $A1_R*B1_R$ to generate the real result value $C1_R=A1_R*B1_R-A1_I*B1_I$. Similarly, a second addition/subtraction unit 2152 of adder circuitry 2120 adds the first imaginary product $A1_R*B1_I$ and the second imaginary product $A1_I*B1_R$ to generate the imaginary result value $C1_I=A1_I*B1_R+A1_R*B1_I$. The real and imaginary components may then be combined to form the complex value C1 in the result matrix, Matrix C 2103.

In summary, the execution circuitry performs the operations $C1_R=A1_R*B1_R-A1_I*B1_I$ and $C1_I=A1_R*B1_I+A1_I*B1_R$ to generate the real and complex components, which are stored in result matrices $C_R$ 2103A and $C_I$ 2103B, respectively. In one embodiment, a first instruction is executed to generate the real components and a second instruction is executed to generate the imaginary components. In this embodiment, both the first and second instructions include first and second source operand fields to identify the individual real and imaginary components of the complex source values in Matrices A and B (e.g., $A1_R$, $B1_R$, $A1_I$, and $B1_I$ for the first result data element) and a destination operand field to indicate the location of the resulting real and imaginary result matrices $C_R$ 2103A and $C_I$ 2103B, respectively.

The first and second instructions may perform the described operations in parallel for matrices of various sizes, depending on the parallel processing capabilities of the matrix execution circuitry 2091. For example, the same set of operations as described above may be performed in parallel using additional multipliers of the parallel multiplication circuitry 2110 and additional adders within the adder network 2120 to generate all of the complex values in Matrix C (or a specified subset thereof), resulting in a multiplication of Matrix A and Matrix B.

In an alternate implementation, both the real and complex result values may be generated in response to a single complex matrix multiply instruction (e.g., performing the operations shown in FIG. 21 in response to a single instruction). In this embodiment, the decoder generates two sets of microoperations in response to the single instruction—one set for determining the real values and one set for determining the imaginary values.

As mentioned, in one embodiment, each real and imaginary component is encoded as a 16-bit floating point value (FP16, Bfloat16, etc). However, various other data formats may be used (e.g., 8-bit integer, 16-bit integer, 32-bit integer, TensorFloat (TF)-32, 32-bit floating-point, and 64-bit floating point (FP)).

Figure 22A:
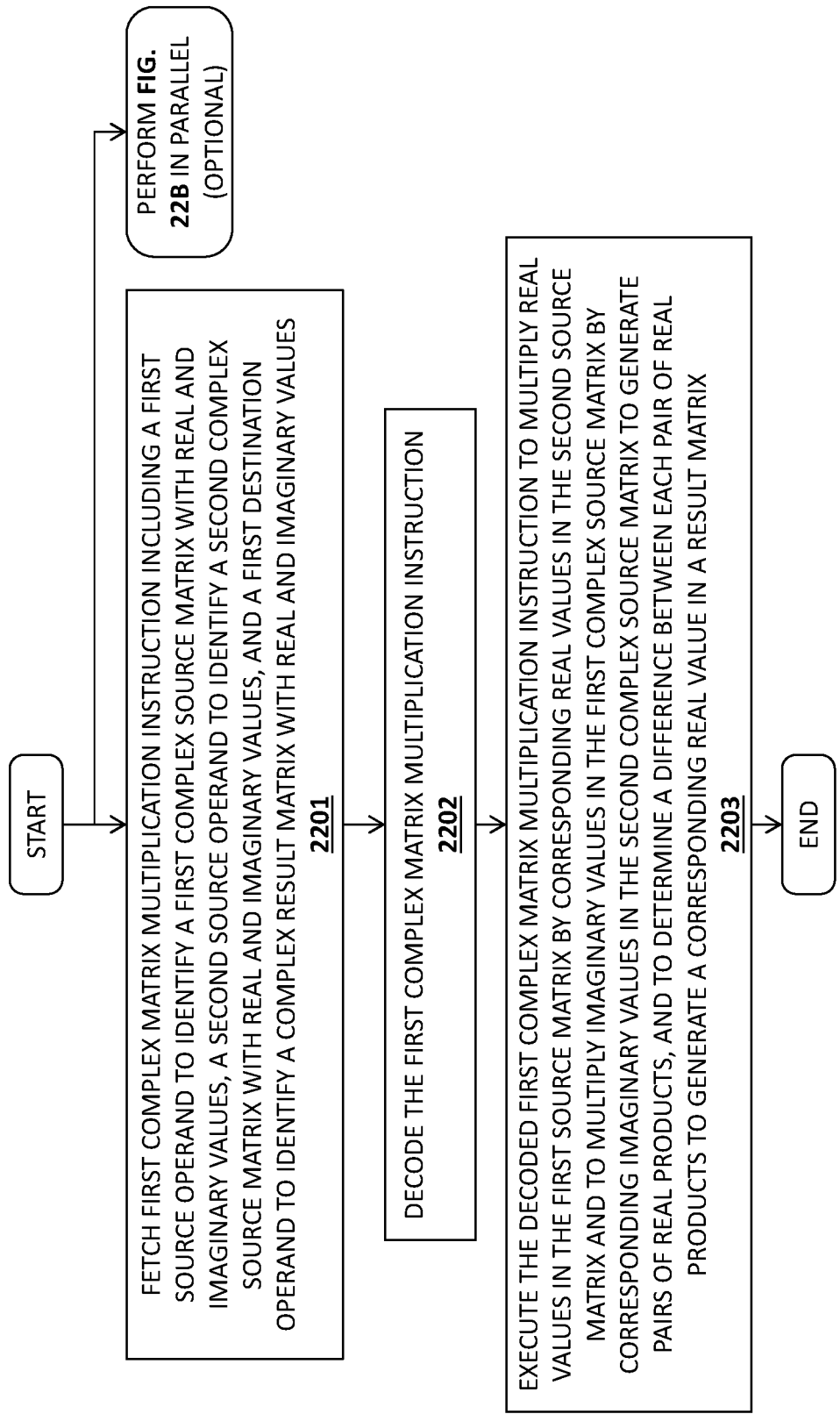
FIGS. 22A-B illustrate methods for performing a complex matrix multiplication.

A method for generating real values of a destination matrix in accordance with one embodiment is illustrated in FIG. 22A. The method may be implemented using the various architectures described above, but is not limited to any particular architecture.

At 2201, a first complex matrix multiplication instruction is fetched including a first source operand to identify a first source matrix with real and imaginary values, a second source operand to identify a second source matrix with real and imaginary values, and a first destination operand to identify a result matrix with real and imaginary values.

At 2202, the first complex matrix multiplication instruction is decoded. In some embodiments, decoding the instruction includes identifying the locations of the first and second source matrices and generating a sequence of microoperations to be executed by the execution circuitry.

At 2203, the decoded first complex matrix multiplication instruction is executed to multiply real values in the first source matrix by corresponding real values in the second source matrix and to multiply imaginary values in the first source matrix by corresponding imaginary values in the second source matrix to generate pairs of real products, with each pair comprising one of the real-real multiplications and a corresponding one of the imaginary-imaginary multiplications. In one embodiment, the difference between each pair of real products is then determined to generate a corresponding real value in the result matrix. In one embodiment, within a pair of real products, each product calculated by multiplying two imaginary values is subtracted from each product calculated by multiplying two real values.

Figure 22B:
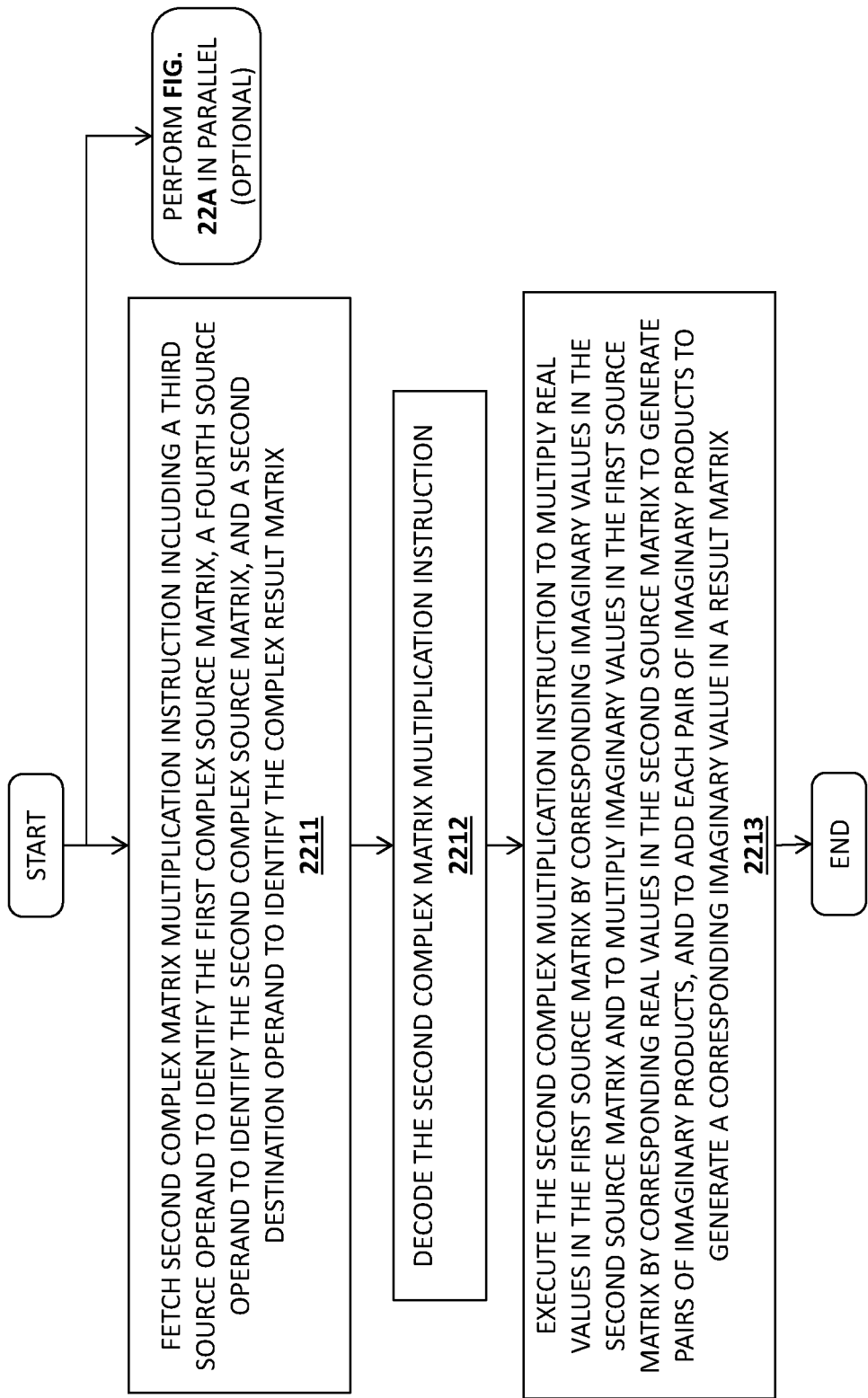

A method for generating imaginary values of a destination matrix in accordance with one embodiment is illustrated in FIG. 22B. As indicated, the methods in FIGS. 22A-B may (or may not) be performed in parallel. These methods may be implemented using the various architectures described above, but are not limited to any particular architecture.

At 2211, a second complex matrix multiplication instruction is fetched including a third source operand to identify the first source matrix with real and imaginary values, a fourth source operand to identify the second source matrix with real and imaginary values, and a second destination operand to identify a result matrix with real and imaginary values.

At 2212, the second complex matrix multiplication instruction is decoded. In some embodiments, decoding the instruction includes identifying the locations of the first and second source matrices and generating a sequence of microoperations to be executed by the execution circuitry.

At 2213, the decoded second complex matrix multiplication instruction is executed to multiply real values in the first source matrix by corresponding imaginary values in the second source matrix and to multiply imaginary values in the first source matrix by corresponding real values in the second source matrix to generate pairs of imaginary products. In one embodiment, the pairs of imaginary products are then added to generate a corresponding imaginary values in the result matrix.

Although not shown in FIGS. 22A-B, in one embodiment, the real components produced by the first complex matrix multiplication instruction in FIG. 22A may be combined with the imaginary components produced by the second complex matrix multiplication instruction in FIG. 22B to produce the complex result Matrix C. Alternatively, the real and imaginary values may be stored in separate result matrices $C_R$ 2103A and $C_I$ 2103B, respectively.

B. Apparatus and Method for Complex Matrix Transpose and Multiplication

One embodiment of the invention includes two instructions to perform complex matrix transpose and multiplication of two tile sources. The first instruction calculates the real part of the result the second instruction calculates the imaginary part. Alternatively, or in addition, a single instruction may determine both the real and imaginary parts and/or may determine either the real or the imaginary part based on an immediate of the instruction (or other instruction control field).

As in the above-described embodiment, the tile sources may contain complex numbers in the format of FP16 pairs of real and imaginary parts. Each element in the source tiles are 32-bit wide complex numbers where the lower 16 bits represent the real part in FP16 format and the higher 16 bits represent the imaginary part in FP16 format. The results may be accumulated into FP32 real or imaginary values (depending on the instruction).

In one embodiment, the first instruction for computing the real part performs the computation: real(C)+=real($A^T$)*real(B)−imag($A^T$)*imag(B) where A represents Matrix A, B represents Matrix B, and $A^T$ is a transposed version of Matrix A. In one embodiment, the real result matrix $C_R$ includes 32-bit real values.

In one embodiment, the second instruction for computing the imaginary result matrix $C_I$ based on the computation: imag(C)+=real($A^T$)*imag(B)+imag($A^T$)*real(B) where A represents Matrix A, B represents Matrix B, and $A^T$ is a transposed version of Matrix A. In one embodiment, the imaginary result matrix $C_I$ includes 32-bit imaginary values.

In an alternate embodiment, the real values produced by the first instruction and the imaginary values produced by the second instruction are stored in a single complex matrix C which includes both the real and imaginary components. For example, a 64-bit data element may store both the 32-bit real and imaginary components.

Figure 23:
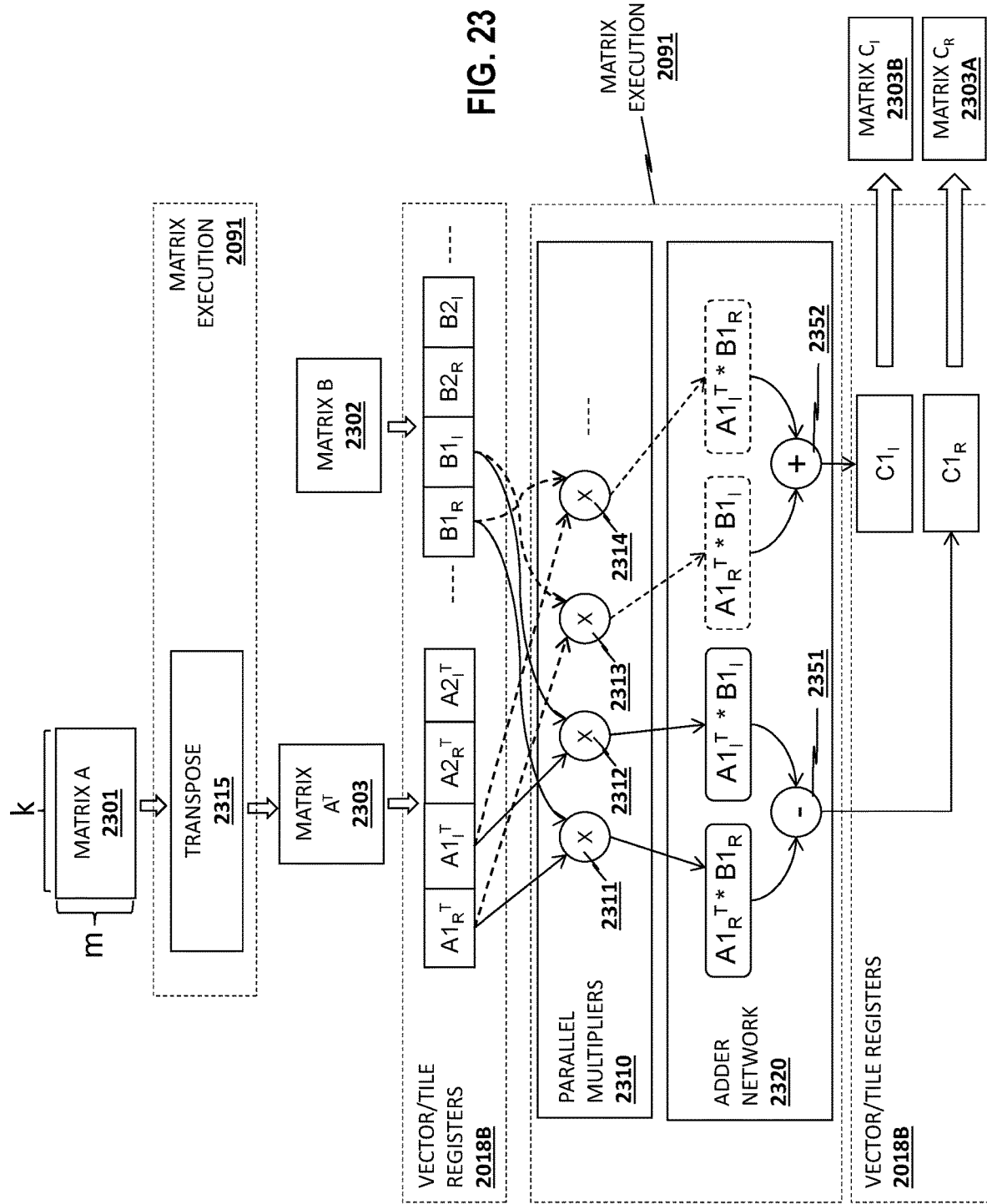
FIG. 23 illustrates an architecture for executing complex matrix transpose and multiplication instructions.

As illustrated in FIG. 23, one embodiment of the matrix execution circuitry 2091 comprises parallel multiplication circuitry 2310 (e.g., a plurality of parallel multipliers) and adder circuitry 2020 to perform parallel multiplications and additions/subtractions using complex data elements from source Matrix A 2301 and source matrix B 2302 to generate the real and imaginary data elements of result matrices $C_R$ 2303A and $C_I$ 2303B, respectively. Only a small portion of the complex data elements from Matrix A 2301 and Matrix B 2302 are shown for the purpose of illustration. It should be noted, however, that the operations performed on these complex data elements may be performed in parallel on other complex data elements from each respective matrix.

In the illustrated implementation, transpose hardware logic 2315 performs a matrix transpose operation on Matrix A to generate transposed Matrix $A^T$. For example, transpose hardware logic 2315 may switch the row and column indices of Matrix A to produce transposed complex Matrix $A^T$. The values stored in transposed Matrix $A^T$ are then used for the multiply-accumulate operations with Matrix B 2302.

In particular, the illustrated operations are performed on complex data element $A1^T$ comprising real component $A1_R^T$ and imaginary component $A1_I^T$ and complex data element B1 comprising real component $B1_R^T$ and imaginary component $B1_I$. A first multiplier 2311 multiplies the real component of $A1^T$ and the real component of B1 (i.e., $A1_R^T*B1_R$) while a second multiplier 2312 multiplies the imaginary component of $A1^T$ and the imaginary component of B1 (i.e., $A1_I^T*B1_I$) to generate first and second real products $A1_R^T*B1_R$ and $A1_I^T*B1_I$, respectively.

Similarly, a third multiplier 2313 multiplies the real component of $A1^T$ and the imaginary component of B1 (i.e., $A1_R^T*B1_I$) while a fourth multiplier 2314 multiplies the imaginary component of $A1^T$ and the real component of B1 (i.e., $A1_I^T*B1_R$) to generate first and second imaginary products $A1_R^T*B1_I$ and $A1_I^T*B1_R$, respectively.

A first addition/subtraction unit 2351 of adder circuitry 2320 subtracts the second real product $A1_I^T*B1_I$ from the first real product $A1_R^T*B1_R$ to generate the real result value $C1_R = A1_R^T*B1_R - A1_I^T*B1_I$. In one embodiment, $C1_R$ is a 32-bit real value in matrix $C_R$ 2303. Similarly, a second addition/subtraction unit 2352 of adder circuitry 2320 adds the first imaginary product $A1_R^T*B1_I$ and the second imaginary product $A1_I^T*B1_R$ to generate the imaginary result value $C1_I = A1_I^T*B1_R + A1_R^T*B1_I$. The real and imaginary data elements $C1_R$ and $C1_I$ may be stored in result matrices $C_R$ 2303A and $C_I$ 2303B, respectively.

In summary, the execution circuitry performs the operations $C1_R = A1_R^T*B1_R - A1_I^T*B1_I$ and $C1_I = A1_R^T*B1_I + A1_I^T*B1_R$ to generate the real and complex components, respectively, of one complex result value in Matrix C 2303. As mentioned, in one embodiment, a first instruction is executed to generate the real components and a second instruction is executed to generate the imaginary components. In this embodiment, both the first and second instructions include first and second source operand fields to identify the individual real and imaginary components of the complex source values in Matrices $A^T$ and B (e.g., $A1_R^T$, $B1_R$, $A1_I^T$, and $B1_I$ for the first result data element) and a destination operand field to indicate the location of the resulting real and imaginary matrices $C1_R$ and $C1_I$.

The first and second instructions may perform the described operations in parallel for matrices of various sizes, depending on the parallel processing capabilities of the matrix execution circuitry 2091. For example, the same set of operations as described above may be performed in parallel using additional multipliers of the parallel multiplication circuitry 2310 and additional adders within the adder network 2320 to generate all of the real and imaginary data elements.

In one implementation, the first instruction operates in accordance with the following pseudocode:

```
TTCMMIMFP16PS tsrcdest , tsrc1 , tsrc2
// C = M × N (tsrcdest), A = K × M (tsrc1), B = K × N (tsrc2)
# src1 and src2 elements are pairs of fp16
elements_dest := tsrcdest.colsb/4
elements_temp := tsrcdest.colsb/2 //count is in fp16 prior to horizontal
for m in 0 ... tsrcdest.rows-1:
  temp1 [0 ... elements_temp-1 := 0
  for k in 0 ... tsrc1.rows-1:
    for n in 0 ... elements_dest-1:
      s1e := cvt_fp16_to_fp32(tsrc1.row [k].fp16[2*m+0])
      s2e := cvt_fp16_to_fp32 (tsrc2.row[k]. fp16 [2*n+0])
      s1o := cvt_fp16_to_fp32(tsrc1.row[k].fp16[2*m+1])
      s2o := cvt_fp16_to_fp32(tsrc2.row[k].fp16[2*n+1])
      // FP32 FMA with DAZ=FTZ=1, RNE rounding. MXCSR is
      // neither consulted nor updated. No exceptions raised or
      // denoted.
      temp1.fp32[2*n+0] = fma32(temp1.fp32[2*n+0], s1e,
        s2e, daz=1, ftz=1, sae=1, rc=RNE)
      temp1.fp32[2*n+1] = fma32(temp1.fp32[2*n+1], s1o,
        s2o, daz=1, ftz=1, sae=1, rc=RNE)
  for n in 0 ... Elements_dest-1:
    // FP32 FMA with DAZ=FTZ=1, RNE rounding. MXCSR is neither
    // consulted nor updated. No exceptions raised or denoted.
    tmpf32 := temp1.fp32[2*n+0] - temp1.fp32[2*n+1]
    tsrcdest.row[m].fp32[n] := tsrcdest.row[m].fp32[n] + tmpf32
  write_row_and_zero(tsrcdest , m, tsrcdest.row [m], tsrcdest.colsb)
zero_upper_rows(tsrcdest , tsrcdest.rows)
zero_tileconfig_start ( )
```

In one embodiment, the second instruction (for computing the imaginary part of Matrix C) performs the computation: imag(C)+=real($A^T$)*imag(B)+imag($A^T$)*real(B) where A represents Matrix A, B represents Matrix B, and $A^T$ is a transposed version of Matrix A.

In one embodiment, the second instruction operates in accordance with the following pseudocode:

```
TTCMMIMFP16PS tsrcdest , tsrc1 , tsrc2
// C = M × N (tsrcdest), A = K × M(tsrc1), B = K × N (tsrc2)
# src1 and src2 elements are pairs of fp16
elements dest := tsrcdest.colsb/4
elements_temp := tsrcdest.colsb/2 //count is in fp16 prior to horizontal
for m in 0 ... tsrcdest.rows-1:
  temp1[0 ... elements_temp-1] := 0
  for k in 0 ... tsrc1.rows-1:
```

```
    for n in 0 ... elements_dest-1:
        s1e = cvt_fp16_to_fp32(tsrc1.row[k].fp16[2*m+0] )
        s2o = cvt_fp16_to_fp32(tsrc2.row[k].fp16[2*n+1] )
        s1o = cvt_fp16_to_fp32(tsrc1.row[k].fp16[2*m+1] )
        s2e = cvt_fp16_to_fp32(tsrc2.row[k].fp16[2*n+0] )
        // FP32 FMA with DAZ=FTZ=1, RNE rounding. MXCSR is
        // neither consulted nor updated. No exceptions raised or
        // denoted.
        temp1.fp32[2*n+0] = fma32(temp1.fp32[2*n+0], s1e,
            s2o, daz=1, ftz=1, sae=1, rc=RNE)
        temp1.fp32[2*n+1] = fma32(temp1.fp32[2*n+1], s1o,
            s2e, daz=1, ftz=1 , sae=1 , rc=RNE)
    for n in 0 ... Elements_dest-1:
        // FP32 FMA with DAZ=FTZ=1, RNE rounding. MXCSR is neither
        // consulted nor updated. No exceptions raised or denoted.
        tmpf32 : = temp1.fp32[2*n+0] + temp1.fp32[2*n+1]
        tsrcdest.row[m].fp32[n] := tsrcdest.row[m].fp32[n] + tmpf32
    write_row_and_zero(tsrcdest, m, tsrcdest.row[m], tsrcdest.colsb)
zero_upper_rows(tsrcdest, tsrcdest.rows)
zero_tileconfig_start ( )
```

A method for generating real values of a destination matrix in accordance with one embodiment is illustrated in FIG. 24A. The method may be implemented using the various architectures described above, but is not limited to any particular architecture.

At 2401, a first complex matrix transpose and multiply instruction is fetched including a first source operand to identify a first source matrix with real and imaginary values, a second source operand to identify a second source matrix with real and imaginary values, and a first destination operand to identify a result matrix with real and imaginary values.

At 2402, the first complex matrix transpose and multiply instruction is decoded. In some embodiments, decoding the instruction includes identifying the locations of the first and second source matrices and generating a sequence of microoperations to be executed by the execution circuitry.

At 2403, the decoded first complex matrix transpose and multiply instruction is executed. The first complex matrix (Matrix A) is transposed to generate transposed complex Matrix $A^T$. For example, the row and column indices of Matrix A may be switched to produce the transposed complex source Matrix $A^T$.

In one embodiment, real values in the transposed complex source matrix are multiplied by corresponding real values in the second complex source matrix and imaginary values in the transposed complex source matrix are multiplied by corresponding imaginary values in the second complex source matrix to generate pairs of real products, with each pair comprising one of the real-real multiplications and a corresponding one of the imaginary-imaginary multiplications. In one embodiment, the difference between each pair of real products is then determined to generate a corresponding real value in a result matrix (e.g., Matrix $C1_R$). In one embodiment, each product comprising the multiplication of two imaginary values is subtracted from the product comprising the multiplication of two corresponding real values.

Figure 24B:
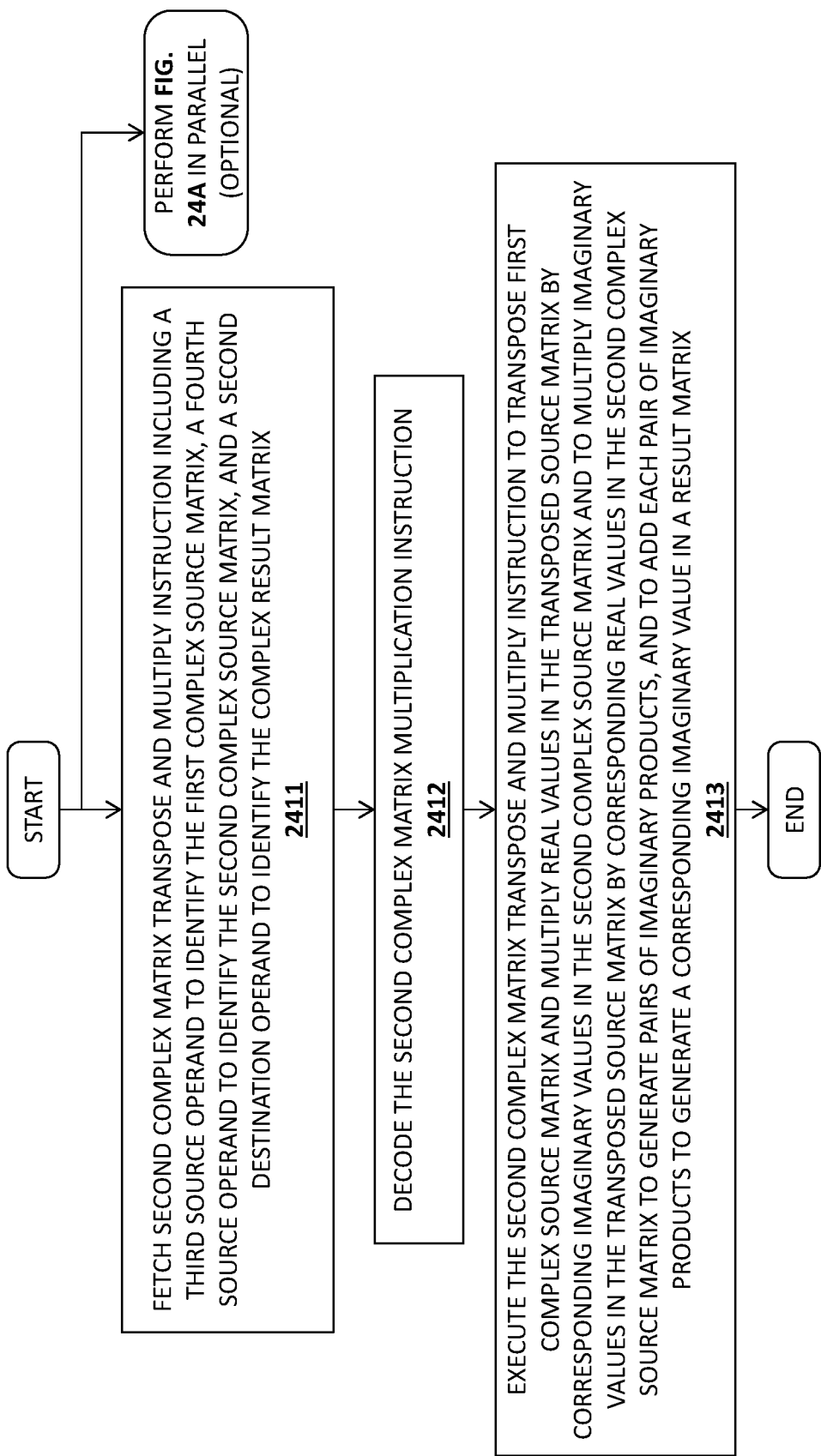

A method for generating imaginary values of a destination matrix in accordance with one embodiment is illustrated in FIG. 24B. As indicated, the methods in FIGS. 24A-B may (or may not) be performed in parallel. These methods may be implemented using the various architectures described above, but are not limited to any particular architecture.

At 2411, a second complex matrix transpose and multiply instruction is fetched including a third source operand to identify the first complex source matrix with real and imaginary values, a fourth source operand to identify the second complex source matrix with real and imaginary values, and a second destination operand to identify the complex result matrix.

At 2412, the second complex matrix transpose and multiply instruction is decoded. In some embodiments, decoding the instruction includes identifying the locations of the first and second source matrices and generating a sequence of microoperations to be executed by the execution circuitry.

At 2413, the decoded second complex matrix transpose and multiply instruction is executed. If the transposed complex source Matrix $A^T$ has not already been generated, then the first complex source Matrix A is transposed to produce transposed complex source Matrix $A^T$. The real values in the transposed complex source matrix are multiplied by corresponding imaginary values in the second source matrix and the imaginary values in the transposed complex source matrix are multiplied by corresponding real values in the second source matrix to generate pairs of imaginary products. In one embodiment, the pairs of imaginary products are then added to generate a corresponding imaginary values in a result matrix (e.g., Matrix $C1_I$).

Although not shown in FIGS. 24A-B, in one embodiment, the real components produced by the first complex matrix multiplication instruction in FIG. 24A may be stored in a real result matrix $C1_R$ and the imaginary components produced by the second complex matrix multiplication instruction in FIG. 24B may be stored in an imaginary result matrix $C1_I$.

C. Apparatus and Method for Complex Matrix Conjugate Transpose

One embodiment of the invention includes an instruction to perform complex matrix conjugate transpose. The complex conjugate of a complex value is determined by reversing the sign of the imaginary component. Thus, for example, the complex conjugate of the complex value a+ib is a−ib. A complex matrix conjugation performs this operation on each complex data element in the source matrix. The resulting conjugate source matrix is then transposed to generate the result data elements.

In one embodiment, the source matrix contains complex numbers in the format of FP16 pairs of real and imaginary parts. Each element in the source tile/matrix is 32-bit wide complex number where the lower 16 bits represent the real part in FP16 format and the higher 16 bits represent the imaginary part in FP16 format.

Figure 25:
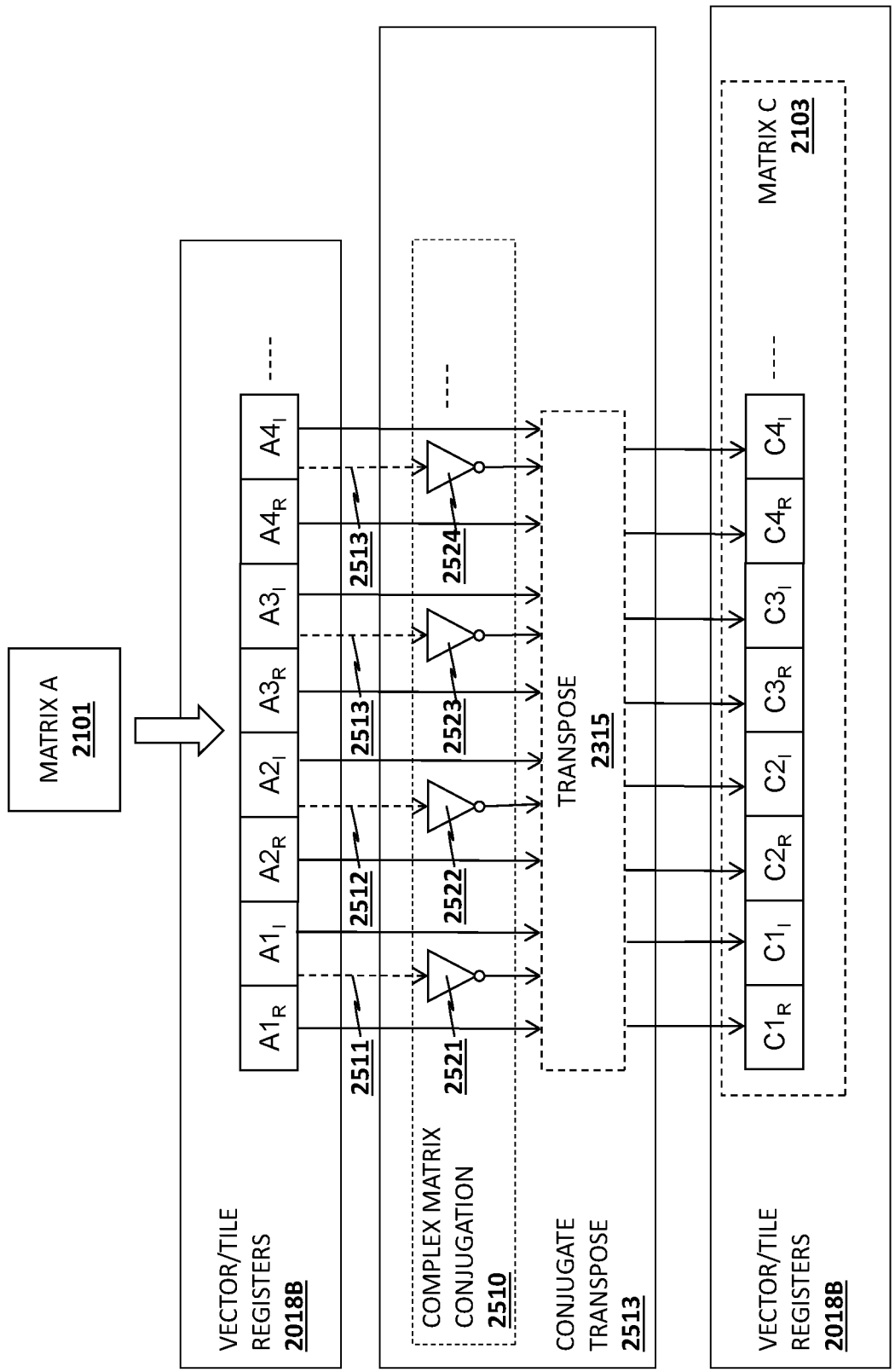
FIG. 25 illustrates an architecture for executing a complex matrix conjugation instruction.

FIG. 25 illustrates one embodiment including conjugate transpose hardware logic 2513 for executing the complex matrix conjugate transpose instruction using Matrix A 2101 as a complex source matrix. The complex source matrix 2101 includes complex data elements A1, A2, A3, A4, etc, comprising real components $A1_R$, $A2_R$, $A3_R$, $A4_R$, and imaginary components $A1_I$, $A2_I$, $A3_I$, $A4_I$, etc, respectively. Complex matrix conjugation hardware logic 2510, in response to the complex matrix conjugation instruction, passes each real component $A1_R$, $A2_R$, $A3_R$, $A4_R$, etc, through and includes a plurality of inverters 2521-2522 (e.g., NOT gates) to invert the sign bits 2511-2513, respectively, of each imaginary value, $A1_I$, $A2_I$, $A3_I$, $A4_I$, etc, of Matrix A 2701 to generate imaginary values $-A1_I$, $-A2_I$, $-A3_I$, $-A4_I$, etc. Matrix transpose hardware logic 2315 then transposes the conjugate matrix with the sign-reversed imaginary values $-A1_I$, $-A2_I$, $-A3_I$, $-A4_I$, etc, and real values $A1_R$, $A2_R$, $A3_R$, $A4_R$, etc, to generate the result matrix C 2103, which is a conjugate transpose of the source matrix A 2101.

Figure 26:
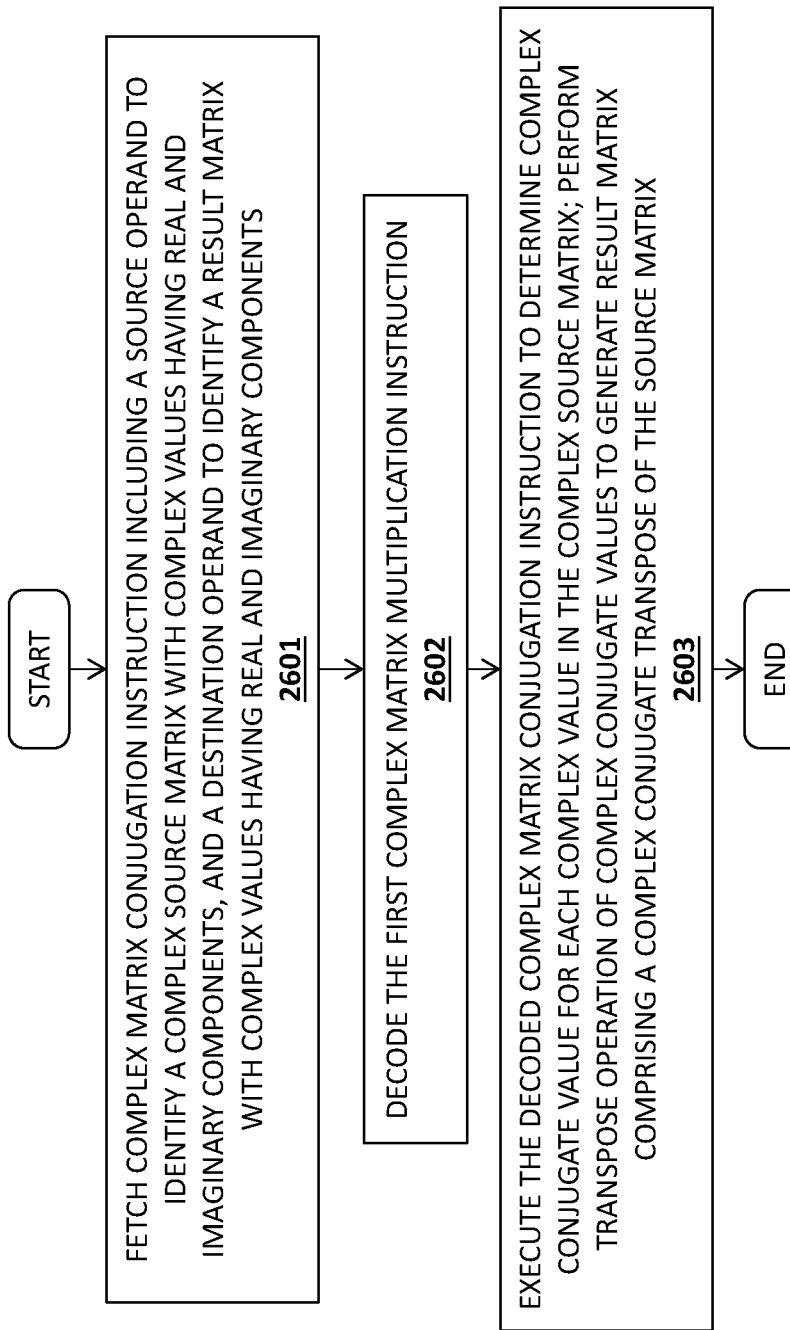
FIG. 26 illustrates a method for performing a complex matrix conjugation operation.

A method in accordance with one embodiment of the invention is illustrated in FIG. 26. The method may be implemented on the architectures described above but is not limited to any particular processor or system architecture.

At 2601 a complex matrix conjugation instruction is fetched. A source operand of the complex matrix conjugation instruction identifies a complex source matrix (e.g., identifying the set of registers or other storage locations where the complex data elements are stored) and a destination operand identifies a complex result matrix (e.g., the set of registers or other storage locations for storing the complex result data elements). Both the complex source matrix and the complex result matrix comprise a plurality of complex matrix data elements, each of which includes a real component and an imaginary component.

At 2602, the complex matrix conjugation instruction is decoded. In some embodiments, decoding the instruction includes identifying the locations of the first and second source matrices and generating a sequence of microoperations to be executed by the execution circuitry.

At 2603, the decoded complex matrix conjugation instruction is executed to determine complex conjugate values corresponding to each of the complex values in the complex source matrix. In one embodiment, the sign of each imaginary component in the complex source matrix is inverted. The result is then transposed to generate the complex conjugate transpose result matrix C.

One embodiment of the complex matrix conjugation instruction performs complex matrix conjugation into a destination tile/vector register according to the following pseudocode:

```
TCONJFP16 tdest, tsrc
for i in 0 ... tdest.rows-1:
    for j in 0 ... tdest.colsb/4 - 1 :
        tmp.dword[j].fp16[0] := tsrc.row [j].dword[i].fp16[0]
        tmp.dword[j].fp16[1] : = -tsrc.row[j].dword[i].fp16[1]
    write_row_and_zero(tdest, i ,tmp, tdest.colsb]
zero_upper_rows(tdest, tdest.rows)
```

In the above code, tmp.dword[j].fp16[0]:=tsrc.row[j].dword[i].fp16[0] sets the next real value in the complex result matrix to the corresponding real value in the complex source matrix and tmp.dword[j].fp16[1]:=−tsrc.row[j].dword[i].fp16[1] sets the next imaginary value in the complex result matrix to the inverse of the corresponding imaginary value in the complex source matrix. The matrix transpose is performed as each column of the result matrix is populated with values from a specified row of the source matrix.

D. Apparatus and Method for Conjugate Transpose and Multiplication

One embodiment of the invention includes an instruction to perform a complex matrix conjugate and multiplication of first and second complex source matrices stored in tile/vector registers. One implementation of the complex matrix conjugate transpose and multiplication instruction determines the imaginary components of the complex result matrix. The complex source matrices contain complex numbers in the format of FP16 pairs of real and imaginary components. Each data element in the first and second source matrices is a 32-bit wide complex number where the lower 16 bits represent the real component in FP16 format and the higher 16 bits represent the imaginary component in FP16 format. One embodiment accumulates the result into an FP32 value.

One embodiment of the complex matrix conjugate transpose and multiplication instruction performs the operations imag(C)+=real($A^{554}$)*imag(B)+imag($A^\dagger$)*real(B) using the real and imaginary values from complex source matrices A and B. The real and imaginary results are stored in complex result matrix C.

Figure 27:
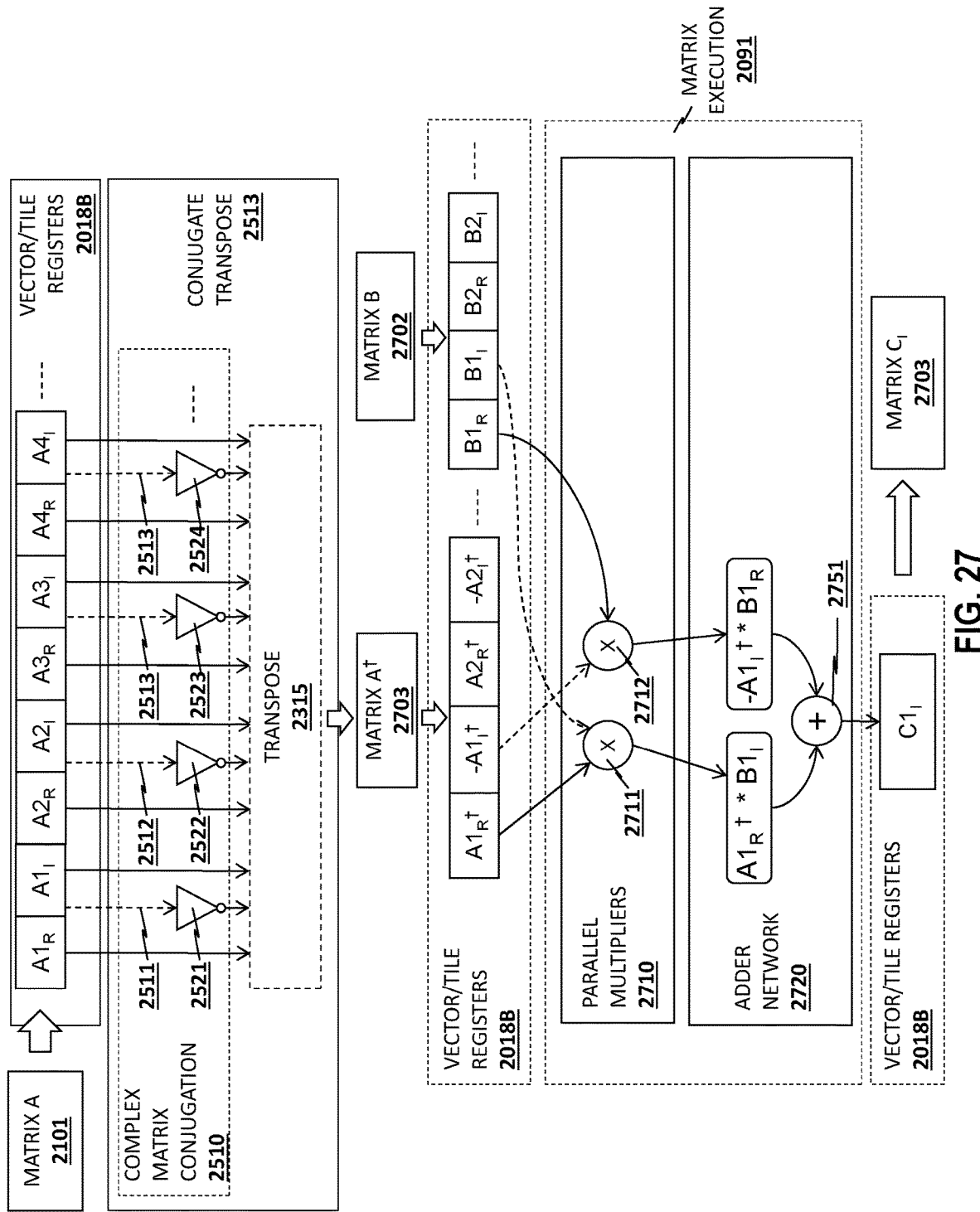
FIG. 27 illustrates an architecture for executing complex matrix conjugation and multiplication instructions.

As illustrated in FIG. 27, one embodiment of the matrix execution circuitry 2091 comprises complex matrix conjugate transpose hardware logic 2513 to produce a conjugate transpose of the source matrix 2101, parallel multiplication circuitry 2710 (e.g., a plurality of parallel multipliers) to perform parallel multiplications of real and complex data elements, and adder circuitry 2020 to perform additions/subtractions with the products. Only a small portion of the complex data elements from source Matrix A 2701, source Matrix B 2702, and result Matrix C 2703 are shown for the purpose of illustration. It should be noted, however, that the operations performed on these complex data elements may be performed in parallel on other complex data elements of each respective matrix.

In the illustrated implementation, conjugate transpose hardware logic 2510 includes a plurality of inverters 2521-2522 (e.g., NOT gates) to invert the sign bits 2511-2513, respectively, of each imaginary value, $A1_I$, $A2_I$, $A3_I$, $A4_I$, etc, of Matrix A 2701 to generate imaginary values $-A1_I$, $-A2_I$, $-A3_I$, $-A4_I$, etc, using the inverted sign bits and real values $A1_R$, $A2_R$, $A3_R$, $A4_R$, etc.

Transpose hardware logic 2315 performs a matrix transpose operation using these values to generate conjugate transpose matrix $A^\dagger$ 2703. In one embodiment, the parallel multipliers 2710 multiply each real data element of conjugate transpose matrix $A^\dagger$ 2703 with a corresponding imaginary data element of complex matrix B 2702 and each imaginary data element of conjugate matrix $A^\dagger$ 2703 with a corresponding real data element of complex matrix B 2702 (i.e., real($A^\dagger$)*imag(B)+imag($A^\dagger$)*real(B)).

In FIG. 27, for example, multiplier 2711 performs the operation $A1_R^\dagger * B1_I$ and multiplier 2712 performs the operation $-A1_I^\dagger * B1_R$. An adder 2751 of the adder network 2720 adds the two values to generate the imaginary component $C1_I$ of the corresponding complex data element in the result matrix C 2703.

One embodiment of the complex matrix conjugate transpose and multiplication instruction operates in accordance with the following pseudocode to generate the imaginary component of each data element in the result matrix:

```
TCONJCMMIMFP16PS tsrcdest, tsrc1, tsrc2
// C = M x N (tsrcdest), A = K x M (tsrc1), B = K x N (tsrc2)
# src1 and src2 elements are pairs of fp16
elements_dest:= tsrcdest.colsb/4
elements_temp := tsrcdest.colsb/2
//count is in fp16 prior to horizontal
for m in 0 . . . tsrcdest.rows-1 :
    temp1[0 . . . elements temp- 1] := 0
    for k in 0 . . . tsrc1.rows-1 :
        for n in 0 . . . elements_dest-1 :
            s1e = cvt_fp16_to_fp32(tsrc1.row[k].fp16[2*m+0])
            s2o = cvt_fp16_to_fp32(tsrc2.row[k].fp16[2*n+1])
            s1o = cvt_fp16_to_fp32(-tsrc1.row[k].fp16[2*m+1])
            s2e = cvt_fp16_to_fp32(tsrc2.row[k].fp16[2*n+0])
            // FP32 FMA with DAZ=FTZ=1, RNE rounding.
            // MXCSR is neither consulted nor updated. No
            // exceptions raised or denoted.
            temp1.fp32[2*n+0] = fma(temp1.fp32[2*n+0],
            s1e, s2o, daz=1, ftz=1, sae = 1 , rc=RNE)
            temp1.fp32[2*n+1] = fma32(temp1.fp32[2*n+1],
            s1o, s2e, daz=1 , ftz=1, sae=1, rc=RNE)
    for n in 0 ... Elements_dest-1 :
        // FP32 FMA with DAZ=FTZ=1, RNE rounding. MXCSR is
        // neither consulted nor updated. No exceptions raised or
        // denoted.
        tmpf32 := temp1.fp32[2*n+0] + temp1.fp32[2*n+1]
```

-continued

```
        tsrcdest.row[m].fp32[n] := tsrcdest.row[m].fp32[n] +
          tmpf32
        write_row_and_zero(tsrcdest, m, tsrcdest.row[m],
          tsrcdest.colsb)
zero_upper_rows(tsrcdest, tsrcdest.rows)
zero_tileconfig_start ( )
```

In the above code, s1e and s1o are the real and imaginary values, respectively, of a complex data element of the first source matrix (e.g., Matrix A) and s2e and s2o are the real and imaginary values of a complex data element of the second source matrix (e.g., Matrix B). The 'e' and 'o' designate even and odd data element locations within rows or columns of each matrix. The sign of each imaginary value of the first complex source matrix is inverted by s1o=cvt_fp16_to_fp32(-tsrc1.row[k].fp16[2*m+1]). The transpose operation is performed by reading rows of the source matrix into columns of the result matrix. A fused multiply-add/accumulate (FMA) operation is performed as shown in FIG. 27 for a single complex data element.

embodiment, the order of the complex conjugation and transpose operations are reversed from what is shown in FIG. 27. In this embodiment, the transpose hardware logic 2315 transposes the first complex source matrix A 2101 to generate a transposed matrix. The complex matrix conjugation hardware logic 2510 then determines complex conjugate values for the complex values in the transposed matrix to generate the conjugate transpose matrix.

Figure 28:
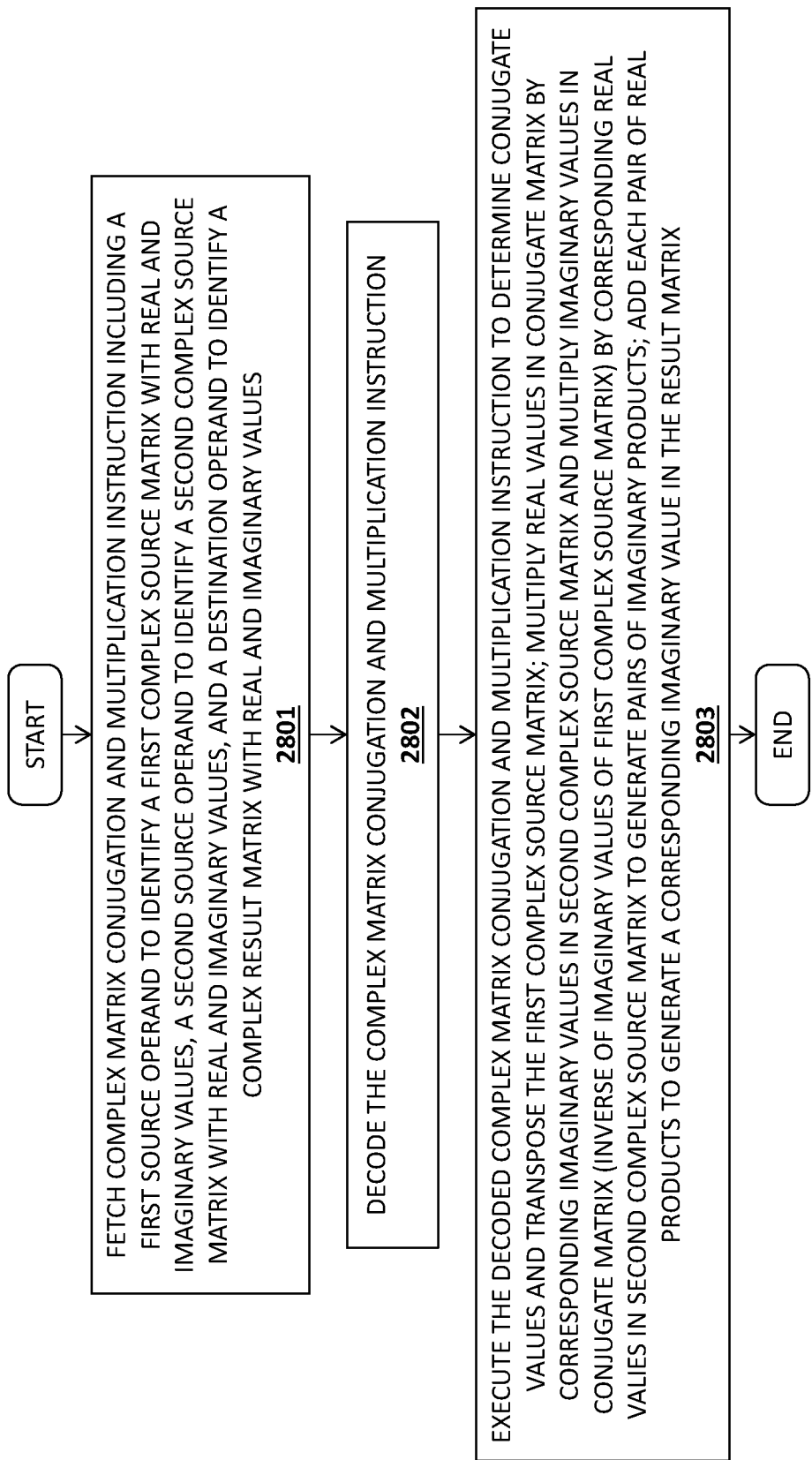
FIG. 28 illustrates a method for performing a complex matrix conjugation and multiplication.

A method for a matrix conjugate transpose and multiplication instruction in accordance with one embodiment is illustrated in FIG. 28. The method may be implemented on the architectures described above but is not limited to any particular processor or system architecture.

At 2801 a matrix conjugate transpose and multiplication instruction is fetched. The matrix conjugate transpose and multiplication instruction includes a first source operand to identify a first complex source matrix and a second source operand to identify a second complex source matrix. For example, as in prior embodiments, the first and second operands may identify registers in which values corresponding to the operands or stored, or memory/cache locations of the values. A destination operand identifies a complex result matrix (e.g., the set of registers or other storage locations for storing the complex result data elements). Both the first and second complex source matrices and the complex result matrix comprise a plurality of complex matrix data elements, each of which includes a real component and an imaginary component.

At 2802, the matrix conjugate transpose and multiplication instruction is decoded. In some embodiments, decoding the instruction includes identifying the locations of the first and second source matrices and generating a sequence of microoperations to be executed by the execution circuitry.

At 2803, the decoded matrix conjugate transpose and multiplication instruction is executed to determine the conjugate matrix of the first complex source matrix. In one embodiment, the sign of each imaginary component in the first complex source matrix is inverted and combined with the corresponding real component in the conjugate matrix.

Each real value in the conjugate matrix is then multiplied by a corresponding imaginary value in the second complex source matrix and each imaginary value in the conjugate matrix (i.e., the inverse of the imaginary value from the first complex source matrix) is multiplied by a corresponding real value in the second complex source matrix to generate pairs of imaginary products. The imaginary products of each pair are added to generate a corresponding imaginary value in the complex result matrix.

The conjugated first source matrix the last parenthetical References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

EXAMPLES

The following are example implementations of different embodiments of the invention.

Example 1. A processor comprising: a decoder to decode a complex matrix conjugation and multiplication instruction including a first source operand to identify a first complex source matrix comprising a first plurality of complex values, a second source operand to identify a second complex source matrix comprising a second plurality of complex values, and a first destination operand to identify a result matrix; execution circuitry to execute the complex matrix conjugation and multiplication instruction, the execution circuitry comprising: matrix conjugation hardware logic to determine a plurality of complex conjugate values corresponding to the first plurality of complex values; transpose hardware logic to transpose the plurality of complex conjugate values to generate a conjugate transpose matrix comprising the complex conjugate values; parallel multiplication circuitry to: multiply real values from the plurality of complex conjugate values of the conjugate transpose matrix with corresponding imaginary values from the second plurality of complex values to generate a first plurality of imaginary products, and multiply imaginary values from the plurality of complex conjugate values of the conjugate transpose matrix with corresponding real values from the second plurality of complex values to generate a second plurality of imaginary products; and addition/subtraction circuitry to add each imaginary product in the first plurality of imaginary products to a corresponding imaginary product in the second plurality of imaginary products to produce a corresponding imaginary component in the result matrix.

Example 2. The processor of example 1 wherein the complex matrix conjugation hardware logic comprises a plurality of inverters, each inverter to alter a sign of a corresponding imaginary component of the first plurality of complex values to generate a plurality of converted imaginary components.

Example 3. The processor of example 2 wherein each of the plurality of complex conjugate values comprise a real component of one of the first plurality of complex values and a corresponding converted imaginary component.

Example 4. The processor of example 3 wherein the complex values in the first plurality of complex values and the second plurality of complex values comprise 32-bit floating-point values, each with a 16-bit real component and a 16-bit imaginary component.

Example 5. The processor of example 4 wherein the first source matrix comprises an k×m matrix with k rows and m columns of complex data elements, the conjugate transpose matrix comprises a m×k matrix with m rows and k columns of complex data elements, and the second source matrix comprises a k×n matrix with k rows and n columns of complex data elements.

Example 6. The processor of example 5 wherein the parallel multiplication circuitry comprises a plurality of multipliers to perform a first plurality of parallel multiplications of at least a portion of the real and imaginary values in the conjugate transpose matrix with the corresponding imaginary and real values, respectively, in the second source matrix to generate the first and second plurality of imaginary products.

Example 7. The processor of example 3 wherein transposing the plurality of complex conjugate values comprises switching indices of the rows and columns of the first complex source matrix.

Example 8. A processor comprising: a decoder to decode a complex matrix conjugation and multiplication instruction including a first source operand to identify a first complex source matrix comprising a first plurality of complex values, a second source operand to identify a second complex source matrix comprising a second plurality of complex values, and a first destination operand to identify a result matrix; execution circuitry to execute the complex matrix conjugation and multiplication instruction, the execution circuitry comprising: transpose hardware logic to transpose the first complex source matrix to generate a transposed complex source matrix comprising the first plurality of complex values; matrix conjugation hardware logic to determine a plurality of complex conjugate values corresponding to the first plurality of complex values in the transposed complex source matrix to generate a conjugate transpose matrix; parallel multiplication circuitry to: multiply real values from the plurality of complex conjugate values of the conjugate transpose matrix with corresponding imaginary values from the second plurality of complex values to generate a first plurality of imaginary products, and multiply imaginary values from the plurality of complex conjugate values of the conjugate transpose matrix with corresponding real values from the second plurality of complex values to generate a second plurality of imaginary products; and addition/subtraction circuitry to add each imaginary product in the first plurality of imaginary products to a corresponding imaginary product in the second plurality of imaginary products to produce a corresponding imaginary component in the result matrix.

Example 9. A method comprising: decoding a complex matrix conjugation and multiplication instruction including a first source operand to identify a first complex source matrix comprising a first plurality of complex values, a second source operand to identify a second complex source matrix comprising a second plurality of complex values, and a first destination operand to identify a result matrix; executing the complex matrix conjugation and multiplication instruction with execution circuitry, to perform the operations: determining, by matrix conjugation hardware logic of the execution circuitry, a plurality of complex conjugate values corresponding to the first plurality of complex values; transposing, by transpose hardware logic of the execution circuitry, the plurality of complex conjugate values to generate a conjugate transpose matrix comprising the complex conjugate values; multiplying real values from the plurality of complex conjugate values of the conjugate transpose matrix with corresponding imaginary values from the second plurality of complex values to generate a first plurality of imaginary products, and multiplying imaginary values from the plurality of complex conjugate values of the conjugate transpose matrix with corresponding real values from the second plurality of complex values to generate a second plurality of imaginary products; and adding each imaginary product in the first plurality of imaginary products to a corresponding imaginary product in the second plurality of imaginary products to produce a corresponding imaginary component in the result matrix.

Example 10. The method of example 9 wherein the complex matrix conjugation hardware logic comprises a plurality of inverters, each inverter to alter a sign of a corresponding imaginary component of the first plurality of complex values to generate a plurality of converted imaginary components.

Example 11. The method of example 10 wherein each of the plurality of complex conjugate values comprise a real component of one of the first plurality of complex values and a corresponding converted imaginary component.

Example 12. The method of example 11 wherein the complex values in the first plurality of complex values and the second plurality of complex values comprise 32-bit floating-point values, each with a 16-bit real component and a 16-bit imaginary component.

Example 13. The method of example 12 wherein the first source matrix comprises an k×m matrix with k rows and m columns of complex data elements, the conjugate transpose matrix comprises a m×k matrix with m rows and k columns of complex data elements, and the second source matrix comprises a k×n matrix with k rows and n columns of complex data elements.

Example 14. The method of example 13 wherein the parallel multiplication circuitry comprises a plurality of multipliers to perform a first plurality of parallel multiplications of at least a portion of the real and imaginary values in the conjugate transpose matrix with the corresponding imaginary and real values, respectively, in the second source matrix to generate the first and second plurality of imaginary products.

Example 15. The method of example 11 wherein transposing the plurality of complex conjugate values comprises switching indices of the rows and columns of the first complex source matrix.

Example 16. A machine-readable medium having program code stored thereon which, when executed by a machine, causes the machine to perform the operations of: decoding a complex matrix conjugation and multiplication instruction including a first source operand to identify a first complex source matrix comprising a first plurality of complex values, a second source operand to identify a second complex source matrix comprising a second plurality of complex values, and a first destination operand to identify a result matrix; executing the complex matrix conjugation and multiplication instruction with execution circuitry, to perform the operations: determining, by matrix conjugation hardware logic of the execution circuitry, a plurality of complex conjugate values corresponding to the first plurality of complex values; transposing, by transpose hardware logic of the execution circuitry, the plurality of complex conjugate values to generate a conjugate transpose matrix comprising the complex conjugate values; multiplying real values from the plurality of complex conjugate values of the conjugate transpose matrix with corresponding imaginary values from the second plurality of complex values to generate a first plurality of imaginary products, and multiplying imaginary values from the plurality of complex conjugate values of the conjugate transpose matrix with corresponding real values from the second plurality of complex values to generate a second plurality of imaginary products; and adding each imaginary product in the first plurality of imaginary products to a corresponding imaginary product in the second plurality of imaginary products to produce a corresponding imaginary component in the result matrix.

Example 17. The machine-readable medium of example 16 wherein the complex matrix conjugation hardware logic comprises a plurality of inverters, each inverter to alter a sign of a corresponding imaginary component of the first plurality of complex values to generate a plurality of converted imaginary components.

Example 18. The machine-readable medium of example 17 wherein each of the plurality of complex conjugate values comprise a real component of one of the first plurality of complex values and a corresponding converted imaginary component.

Example 19. The machine-readable medium of example 18 wherein the complex values in the first plurality of complex values and the second plurality of complex values comprise 32-bit floating-point values, each with a 16-bit real component and a 16-bit imaginary component.

Example 20. The machine-readable medium of example 19 wherein the first source matrix comprises an k×m matrix with k rows and m columns of complex data elements, the conjugate transpose matrix comprises a m×k matrix with m rows and k columns of complex data elements, and the second source matrix comprises a k×n matrix with k rows and n columns of complex data elements.

Example 21. The machine-readable medium of example 20 wherein the parallel multiplication circuitry comprises a plurality of multipliers to perform a first plurality of parallel multiplications of at least a portion of the real and imaginary values in the conjugate transpose matrix with the corresponding imaginary and real values, respectively, in the second source matrix to generate the first and second plurality of imaginary products.

Example 22. The machine-readable medium of example 18 wherein transposing the plurality of complex conjugate values comprises switching indices of the rows and columns of the first complex source matrix.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   a decoder to decode a single complex matrix conjugation and multiplication instruction including a first source operand to identify a first complex source matrix comprising a first plurality of complex values including a corresponding first plurality of real values and a corresponding first plurality of imaginary values, a second source operand to identify a second complex source matrix comprising a second plurality of complex values including a corresponding second plurality of real values and a corresponding second plurality of imaginary values, a first destination operand to identify an imaginary result matrix, and an opcode to indicate a combined complex matrix conjugation and multiplication operation using the first plurality of complex values and the second plurality of complex values to generate the imaginary result matrix;
   execution circuitry to execute the single complex matrix conjugation and multiplication instruction, the execution circuitry comprising:
     matrix conjugation hardware logic comprising inversion circuitry to determine a plurality of complex conjugate values corresponding to the first plurality of complex values by inverting sign values of the corresponding first plurality of imaginary values to generate a corresponding plurality of sign-inverted imaginary values;
     transpose hardware logic to transpose the plurality of complex conjugate values to generate a conjugate transpose matrix comprising the plurality of complex conjugate values including the corresponding plurality of sign-inverted imaginary values;
     parallel multiplication circuitry to:
       multiply real values from the plurality of complex conjugate values of the conjugate transpose matrix with corresponding imaginary values from the second plurality of complex values to generate a first plurality of imaginary products, and
       multiply the sign-inverted imaginary values from the plurality of complex conjugate values of the conjugate transpose matrix with corresponding real values from the second plurality of complex values to generate a second plurality of imaginary products; and
     addition/subtraction circuitry to add each imaginary product in the first plurality of imaginary products to a corresponding imaginary product in the second plurality of imaginary products to produce a corresponding imaginary value of the imaginary result matrix.

2. The processor of claim 1 wherein each of the plurality of complex conjugate values comprise a real value and a corresponding sign-inverted imaginary value of the plurality of sign-inverted imaginary values.

3. The processor of claim 2, wherein the complex values in the first plurality of complex values and the second plurality of complex values comprise 32-bit floating-point values, each with a 16-bit real component and a 16-bit imaginary component.

4. The processor of claim 3, wherein the first complex source matrix comprises an k×m matrix with k rows and m columns of complex data elements, the conjugate transpose matrix comprises a m×k matrix with m rows and k columns of complex data elements, and the second complex source matrix comprises a k×n matrix with k rows and n columns of complex data elements.

5. The processor of claim 4 wherein the parallel multiplication circuitry comprises a plurality of multipliers to perform a first plurality of parallel multiplications of at least a portion of the real values and sign-inverted imaginary values in the conjugate transpose matrix with the corresponding imaginary and real values, respectively, in the second complex source matrix to generate the first and second plurality of imaginary products.

6. The processor of claim 2, wherein transposing the plurality of complex conjugate values comprises switching indices of the rows and columns of the first complex source matrix.

7. A processor comprising:
a decoder to decode a single complex matrix conjugation and multiplication instruction including a first source operand to identify a first complex source matrix comprising a first plurality of complex values including a corresponding first plurality of real values and a corresponding first plurality of imaginary values, a second source operand to identify a second complex source matrix comprising a second plurality of complex values including a corresponding second plurality of real values and a corresponding second plurality of imaginary values, a first destination operand to identify an imaginary result matrix, and an opcode to indicate a combined complex matrix conjugation and multiplication operation using the first plurality of complex values and the second plurality of complex values to generate the imaginary result matrix;
execution circuitry to execute the single complex matrix conjugation and multiplication instruction, the execution circuitry comprising:
transpose hardware logic to transpose the first complex source matrix to generate a transposed complex source matrix comprising the first plurality of complex values;
matrix conjugation hardware logic comprising inversion circuitry to determine a plurality of complex conjugate values corresponding to the first plurality of complex values in the transposed complex source matrix by inverting sign values of the corresponding first plurality of imaginary values to generate a corresponding plurality of sign-inverted imaginary values to generate a conjugate transpose matrix;
parallel multiplication circuitry to:
multiply real values from the plurality of complex conjugate values of the conjugate transpose matrix with corresponding imaginary values from the second plurality of complex values to generate a first plurality of imaginary products, and
multiply the sign-inverted imaginary values from the plurality of complex conjugate values of the conjugate transpose matrix with corresponding real values from the second plurality of complex values to generate a second plurality of imaginary products; and
addition/subtraction circuitry to add each imaginary product in the first plurality of imaginary products to a corresponding imaginary product in the second plurality of imaginary products to produce a corresponding imaginary value of the imaginary result matrix.

8. A method comprising:
decoding by a decoder, a single complex matrix conjugation and multiplication instruction including a first source operand to identify a first complex source matrix comprising a first plurality of complex values including a corresponding first plurality of real values and a corresponding first plurality of imaginary values, a second source operand to identify a second complex source matrix comprising a second plurality of complex values including a corresponding second plurality of real values and a corresponding second plurality of imaginary values, a first destination operand to identify an imaginary result matrix, and an opcode to indicate a combined complex matrix conjugation and multiplication operation using the first plurality of complex values and the second plurality of complex values to generate the imaginary result matrix;
executing, by execution circuitry, the single complex matrix conjugation and multiplication instruction with execution circuitry, to perform the operations:
determining, by matrix conjugation hardware logic of the execution circuitry, a plurality of complex conjugate values corresponding to the first plurality of complex values, the matrix conjugation hardware logic including inversion circuitry to determine a plurality of complex conjugate values corresponding to the first plurality of complex values by inverting sign values of the corresponding first plurality of imaginary values to generate a corresponding plurality of sign-inverted imaginary values;
transposing, by transpose hardware logic of the execution circuitry, the plurality of complex conjugate values to generate a conjugate transpose matrix comprising the plurality of complex conjugate values including the corresponding plurality of sign-inverted imaginary values;
multiplying, by parallel multiplication circuitry of the execution circuitry, real values from the plurality of complex conjugate values of the conjugate transpose matrix with corresponding imaginary values from the second plurality of complex values to generate a first plurality of imaginary products, and
multiplying, by the parallel multiplication circuitry of the execution circuitry, the sign-inverted imaginary values from the plurality of complex conjugate values of the conjugate transpose matrix with corresponding real values from the second plurality of complex values to generate a second plurality of imaginary products; and
adding each imaginary product in the first plurality of imaginary products to a corresponding imaginary product in the second plurality of imaginary products to produce a corresponding imaginary value of the imaginary result matrix.

9. The method of claim 8, wherein each of the plurality of complex conjugate values comprise a real value and a corresponding sign-inverted imaginary value of the plurality of sign-inverted imaginary values.

10. The method of claim 9, wherein the complex values in the first plurality of complex values and the second plurality of complex values comprise 32-bit floating-point values, each with a 16-bit real component and a 16-bit imaginary component.

11. The method of claim 10, wherein the first complex source matrix comprises an k×m matrix with k rows and m columns of complex data elements, the conjugate transpose matrix comprises a m×k matrix with m rows and k columns of complex data elements, and the second complex source matrix comprises a k×n matrix with k rows and n columns of complex data elements.

12. The method of claim 11, wherein the parallel multiplication circuitry comprises a plurality of multipliers to perform a first plurality of parallel multiplications of at least a portion of the real values and sign-inverted imaginary values in the conjugate transpose matrix with the corresponding imaginary and real values, respectively, in the second complex source matrix to generate the first and second plurality of imaginary products.

13. The method of claim 9, wherein transposing the plurality of complex conjugate values comprises switching indices of the rows and columns of the first complex source matrix.

14. A non-transitory machine-readable medium having program code stored thereon which, when executed by a machine, causes the machine to perform the operations of:
decoding by a decoder, a single complex matrix conjugation and multiplication instruction including a first source operand to identify a first complex source matrix comprising a first plurality of complex values including a corresponding first plurality of real values and a corresponding first plurality of imaginary values, a second source operand to identify a second complex source matrix comprising a second plurality of complex values including a corresponding second plurality of real values and a corresponding second plurality of imaginary values, a first destination operand to identify an imaginary result matrix, and an opcode to indicate a combined complex matrix conjugation and multiplication operation using the first plurality of complex values and the second plurality of complex values to generate the imaginary result matrix;
executing, by execution circuitry, the single complex matrix conjugation and multiplication instruction to perform the operations:
determining, by matrix conjugation hardware logic of the execution circuitry, a plurality of complex conjugate values corresponding to the first plurality of complex values, the matrix conjugation hardware logic including inversion circuitry to determine a plurality of complex conjugate values corresponding to the first plurality of complex values by inverting sign values of the corresponding first plurality of imaginary values to generate a corresponding plurality of sign-inverted imaginary values;
transposing, by transpose hardware logic of the execution circuitry, the plurality of complex conjugate values to generate a conjugate transpose matrix comprising the plurality of complex conjugate values including the corresponding plurality of sign-inverted imaginary values;
multiplying, by parallel multiplication circuitry of the execution circuitry, real values from the plurality of complex conjugate values of the conjugate transpose matrix with corresponding imaginary values from the second plurality of complex values to generate a first plurality of imaginary products, and
multiplying, by the parallel multiplication circuitry of the execution circuitry, the sign-inverted imaginary values from the plurality of complex conjugate values of the conjugate transpose matrix with corresponding real values from the second plurality of complex values to generate a second plurality of imaginary products; and
adding each imaginary product in the first plurality of imaginary products to a corresponding imaginary product in the second plurality of imaginary products to produce a corresponding imaginary value of the imaginary result matrix.

15. The non-transitory machine-readable medium of claim 14, wherein each of the plurality of complex conjugate values comprise a real value and a corresponding sign-inverted imaginary value of the plurality of sign-inverted imaginary values.

16. The non-transitory machine-readable medium of claim 15, wherein the complex values in the first plurality of complex values and the second plurality of complex values comprise 32-bit floating-point values, each with a 16-bit real component and a 16-bit imaginary component.

17. The non-transitory machine-readable medium of claim 16, wherein the first complex source matrix comprises an k×m matrix with k rows and m columns of complex data elements, the conjugate transpose matrix comprises a m×k matrix with m rows and k columns of complex data elements, and the second complex source matrix comprises a k×n matrix with k rows and n columns of complex data elements.

18. The non-transitory machine-readable medium of claim 17, wherein the parallel multiplication circuitry comprises a plurality of multipliers to perform a first plurality of parallel multiplications of at least a portion of the real values and sign-inverted imaginary values in the conjugate transpose matrix with the corresponding imaginary and real values, respectively, in the second complex source matrix to generate the first and second plurality of imaginary products.

19. The non-transitory machine-readable medium of claim 15, wherein transposing the plurality of complex conjugate values comprises switching indices of the rows and columns of the first complex source matrix.

* * * * *